(12) United States Patent (10) Patent No.: US 9,600,241 B2
Shankar et al. (45) Date of Patent: Mar. 21, 2017

(54) UNIFIED STATE TRANSITION TABLE DESCRIBING A STATE MACHINE MODEL

(71) Applicant: The MathWorks, Inc., Natick, MA (US)

(72) Inventors: Siddhartha Shankar, Chicago, IL (US); Srinath Avadhanula, Sudbury, MA (US); Vijaya Raghavan, Brookline, MA (US); Ebrahim Mehran Mestchian, Newton, MA (US); Yao Ren, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/768,565

(22) Filed: Feb. 15, 2013

(65) Prior Publication Data

US 2013/0290925 A1 Oct. 31, 2013

Related U.S. Application Data

(60) Provisional application No. 61/599,311, filed on Feb. 15, 2012.

(51) Int. Cl.
*G06F 9/44* (2006.01)

(52) U.S. Cl.
CPC .................. *G06F 8/00* (2013.01); *G06F 8/10* (2013.01); *G06F 8/35* (2013.01); *G06F 9/444* (2013.01);
(Continued)

(58) Field of Classification Search
CPC ............. G06F 8/10–8/78; G06F 9/44–9/5094
See application file for complete search history.

(56) References Cited

U.S. PATENT DOCUMENTS 5,485,600 A * 1/1996 Joseph et al. .................... 703/13
5,870,590 A 2/1999 Kita et al.
(Continued)

FOREIGN PATENT DOCUMENTS

EP 0597316 A2 5/1994
JP 02-206861 A 8/1990
(Continued)

OTHER PUBLICATIONS

Harel, David, et al., "Executable Object Modeling with Statecharts", 1996, pp. 246-257.*
(Continued)

*Primary Examiner* — Tuan Q. Dam
*Assistant Examiner* — Christopher Franco
(74) *Attorney, Agent, or Firm* — Cesari and McKenna, LLP; Michael R. Reinemann

(57) ABSTRACT

A computer-readable memory device may include instructions to store data describing a state machine model including source states and destination states. The device may also include instructions to store, for each of the source states, a condition field identifying a condition upon which, when satisfied, the state machine model transitions from the source state to one of the destination states. The device may also include instructions to store, for each of source states, a destination field identifying the one of the destination states. Each of at least two of the source states may identify an identical destination state in the corresponding destination field. Each of at least two of the source states may identify an identical condition in the corresponding condition field.

39 Claims, 45 Drawing Sheets

(52) U.S. Cl.
CPC ............. *G06F 9/4438* (2013.01); *G06F 8/22* (2013.01); *G06F 8/313* (2013.01)

(56) References Cited

U.S. PATENT DOCUMENTS

| | | | |
|---|---|---|---|
| 5,920,718 A | 7/1999 | Uczekaj et al. | |
| 7,010,778 B2* | 3/2006 | Cook | G06F 8/36 717/117 |
| 7,694,273 B2 | 4/2010 | Kodosky et al. | |
| 7,720,656 B2* | 5/2010 | Raghavan | G06F 8/34 717/109 |
| 7,840,913 B1* | 11/2010 | Agrawal | G06F 8/35 717/104 |
| 7,948,495 B1* | 5/2011 | Nordquist | G06T 1/00 345/522 |
| 7,958,454 B2 | 6/2011 | Gaudette | |
| 7,987,448 B2 | 7/2011 | Kodosky et al. | |
| 8,266,584 B2 | 9/2012 | Hartadinata et al. | |
| 8,479,151 B2 | 7/2013 | Merriman et al. | |
| 8,843,879 B2* | 9/2014 | Howard | G06F 8/20 717/104 |
| 8,856,667 B2 | 10/2014 | Gaudette | |
| 2002/0083413 A1* | 6/2002 | Kodosky | G06F 8/10 717/109 |
| 2003/0052919 A1* | 3/2003 | Tlaskal | G06F 9/4443 715/764 |
| 2003/0093239 A1* | 5/2003 | Schmit | 702/127 |
| 2004/0205703 A1* | 10/2004 | Harel | G06F 8/10 717/109 |
| 2005/0055695 A1* | 3/2005 | Law et al. | 718/100 |
| 2005/0235254 A1* | 10/2005 | Audfray et al. | 717/105 |
| 2006/0156032 A1* | 7/2006 | Panjwani | G06F 21/85 713/191 |
| 2006/0175413 A1* | 8/2006 | Longacre et al. | 235/462.07 |
| 2006/0235548 A1* | 10/2006 | Gaudette | G06F 8/34 700/83 |
| 2006/0294493 A1* | 12/2006 | Melby | G06F 9/4425 717/114 |
| 2007/0198923 A1* | 8/2007 | Kodosky | G06F 8/34 715/234 |
| 2007/0266329 A1* | 11/2007 | Gaudette | G06F 8/34 715/763 |
| 2008/0059621 A1 | 3/2008 | Raghavan et al. | |
| 2008/0080653 A1* | 4/2008 | Hajimiri et al. | 375/359 |
| 2008/0147580 A1 | 6/2008 | Pannese | |
| 2008/0243470 A1* | 10/2008 | Iwashita | G06F 9/444 703/27 |
| 2008/0263512 A1 | 10/2008 | Dellas et al. | |
| 2008/0263516 A1* | 10/2008 | Hartadinata | G06F 8/34 717/109 |
| 2009/0013307 A1 | 1/2009 | Raghavan | |
| 2009/0044171 A1* | 2/2009 | Avadhanula | 717/105 |
| 2009/0204940 A1* | 8/2009 | Kodosky | G06F 8/10 717/106 |
| 2010/0131917 A1* | 5/2010 | Iwamasa | 717/104 |
| 2011/0060707 A1* | 3/2011 | Suzuki | G06N 99/005 706/12 |
| 2011/0093694 A1* | 4/2011 | Nedbal et al. | 713/150 |
| 2011/0137634 A1 | 6/2011 | Avadhanula et al. | |
| 2011/0161926 A1* | 6/2011 | Cruise | G06F 8/35 717/113 |
| 2011/0246962 A1* | 10/2011 | Meijer et al. | 717/106 |
| 2011/0283254 A1* | 11/2011 | Merriman | G06F 8/51 717/105 |
| 2011/0288830 A1 | 11/2011 | Garg et al. | |
| 2013/0117042 A1* | 5/2013 | Tajima | G01N 35/0092 705/2 |

FOREIGN PATENT DOCUMENTS

| | | |
|---|---|---|
| JP | 04-152473 A | 5/1992 |
| JP | 06-035890 A | 2/1994 |
| JP | 2010-134721 A | 6/2010 |
| WO | 2007006869 A1 | 1/2007 |
| WO | 2008027598 A2 | 3/2008 |
| WO | WO-2011/071016 A | 6/2011 |

OTHER PUBLICATIONS

Wagenhals, Lee W., et al., "Synthesizing Executable Models of Object Oriented Architectures", 2003, pp. 266-300.*
Booch, Grady, et al., "The Unified Modeling Language User Guide", 1999, pp. 1-391.*
Corbett, James C., et al., "Bandera: extracting finite-state models from Java source code", 2000, pp. 439-448.*
Liu, Songqing, et al., "Generating Test Cases via Model-based Simulation", 2012, pp. 17-24.*
d'Amorim, Marcelo, et al., "Delta Execution for Efficient State-Space Exploration of Object-Oriented Programs", 2007, pp. 50-60.*
Xie, Fei, et al., "Model Checking for an Executable Subset of UML" 2001, pp. 333-336.*
Korel, Bogdan, et al., "Slicing of State-Based Models", 2003, pp. 1-10.*
Merseguer, Jose, et al., "A Compositional Semantics for UML State Machines Aimed at Performance Evaluation", 2002, pp. 1-8.*
Angelov, Christo, et al., "Design Models for Reusable and Reconfigurable State Machines", 2005, pp. 152-163.*
Gvero, Tihomir, et al., "State Extensions for Java Path Finder", 2008, pp. 863-866.*
Raghunathan, Bhooma, et al., "The Automated Transformation of Statecharts from a Formal Specification to Object-Oriented Software", 2005, pp. 319-322.*
"State Transition Table", Wikipedia, Dec. 6, 2011. URL: http://en.wikipedia.org/w/index.php?title=State_transition_table&oldid=464362898.
International Search Report and Written Opinion dated Jun. 17, 2013, issued in corresponding PCT Application No. PCT/US2013/026410, 11 pages.
International Search Report dated Jun. 17, 2013, issued in corresponding PCT application PCT/US2013/023407, pp. 1-9.

* cited by examiner

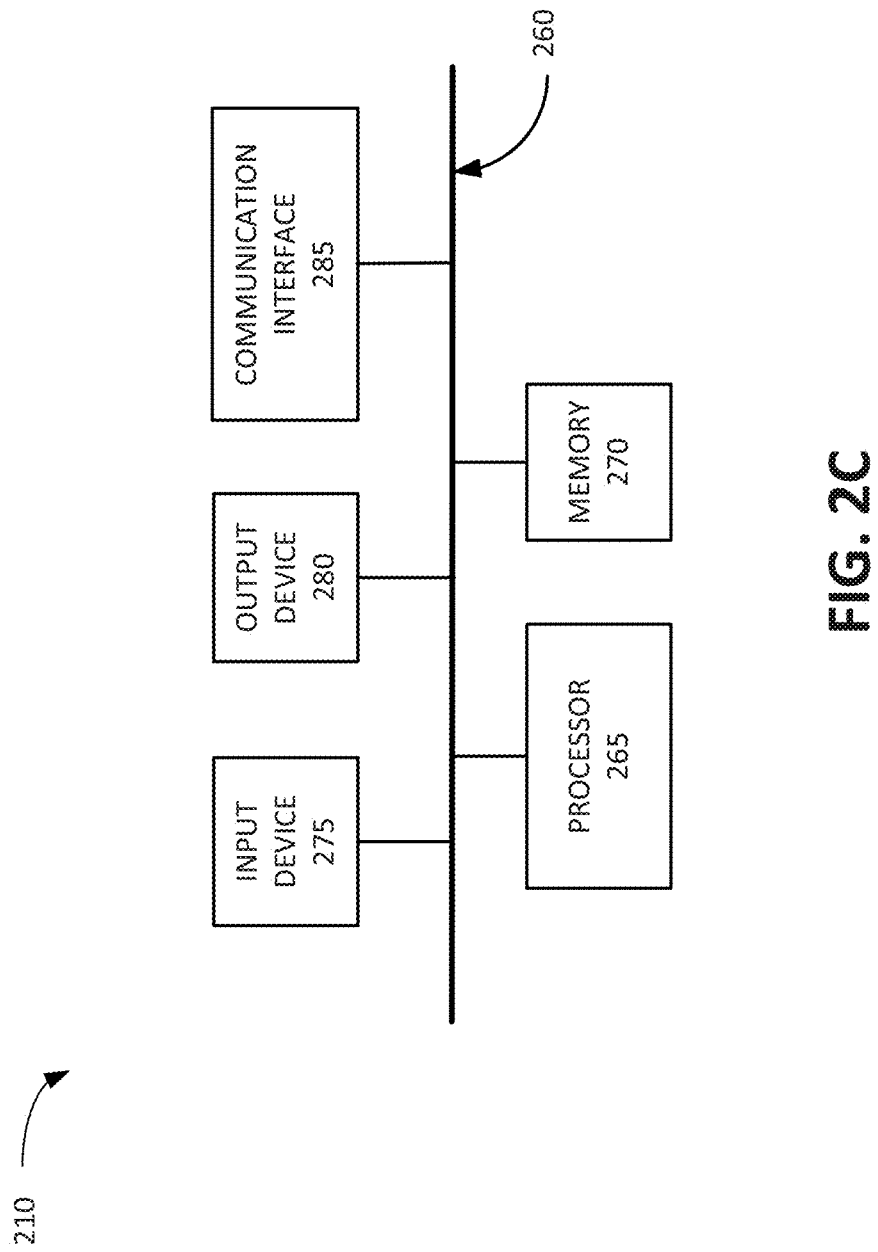

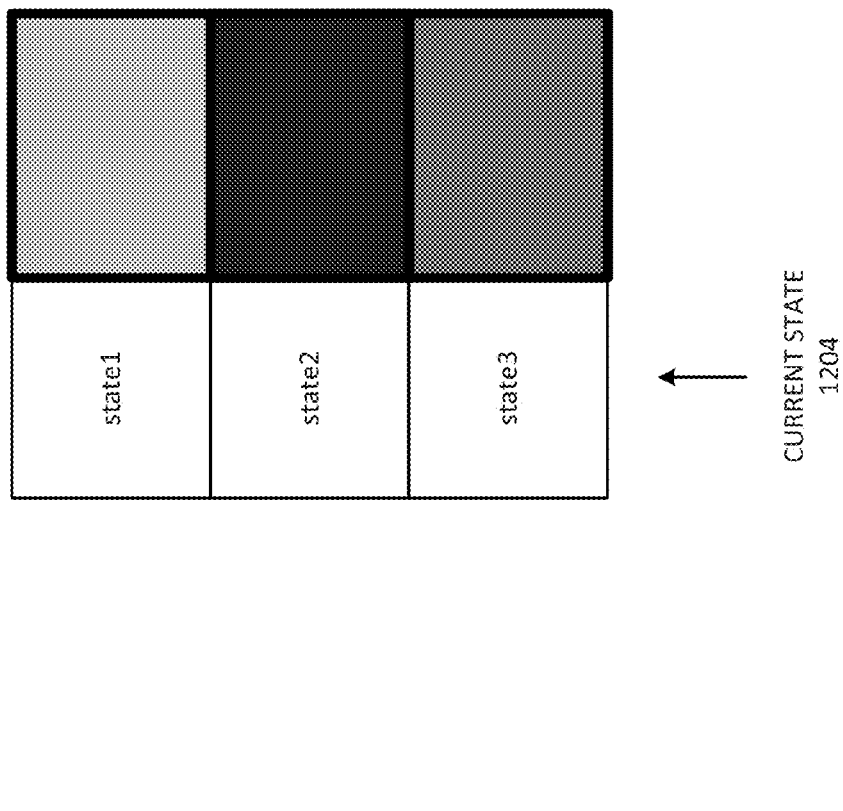

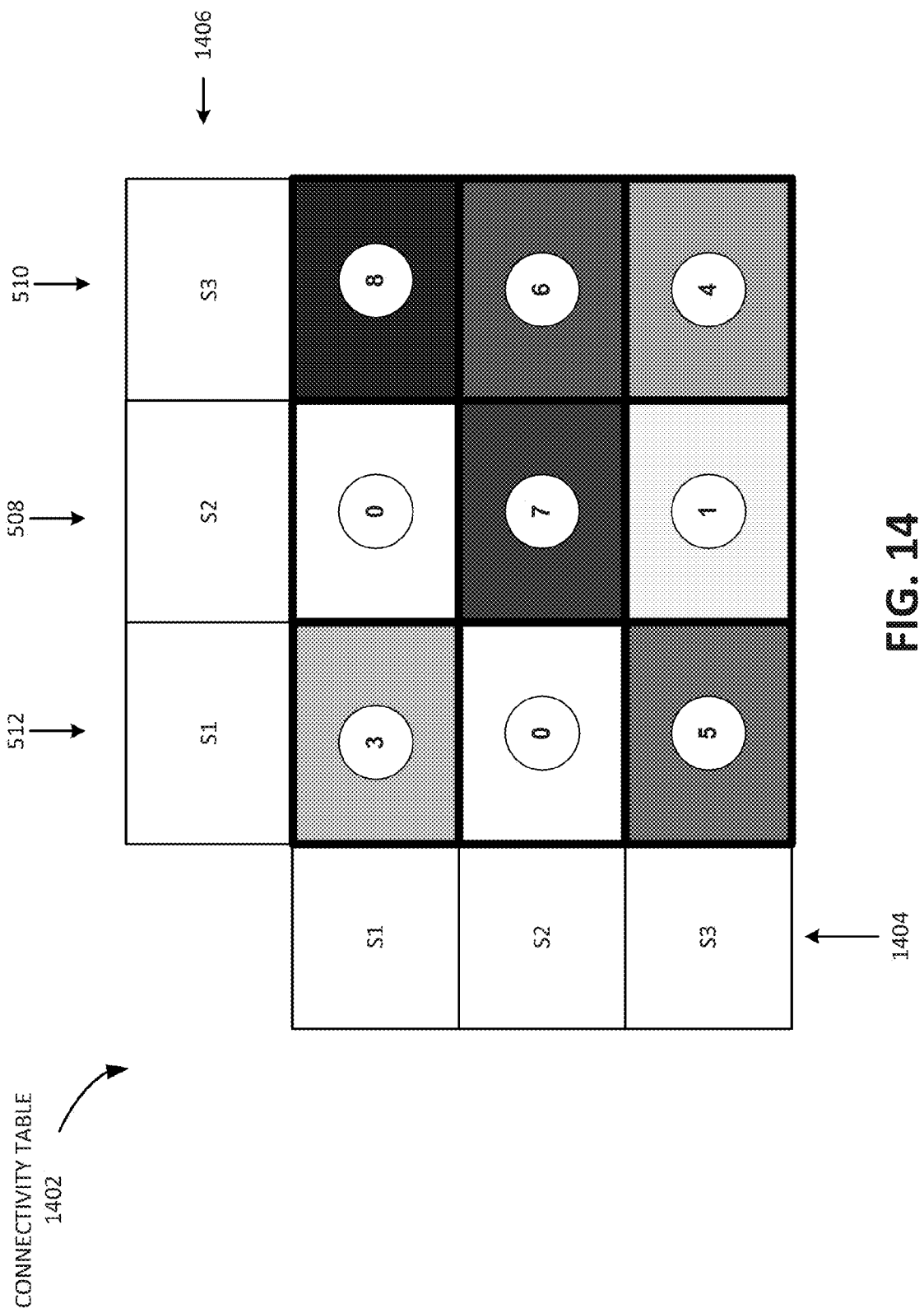

UNIFIED STATE TRANSITION TABLE DESCRIBING A STATE MACHINE MODEL

RELATED APPLICATIONS

This application claims the benefit of U.S. Provisional Patent Application No. 61/599,311, filed Feb. 15, 2012, which is incorporated herein by reference.

BACKGROUND

A finite-state machine (FSM), or simply a state machine, is a mathematical model used to design computer programs and digital logic circuits, among other things. A state machine can change or transition from one state to another when a condition is satisfied.

BRIEF DESCRIPTION OF THE DRAWINGS

FIG. 2C is a diagram illustrating exemplary components of computer device according to one embodiment;

FIG. 12F illustrates the animation of the current state during execution of a state machine model;

FIG. 14 illustrates a table showing the connectivity between states in a state machine model.

DETAILED DESCRIPTION

Figures 1A, 1B:
FIG. 1A illustrates a data structure describing a state-state transition table for a state machine model.
FIG. 1B illustrates a data structure describing a state-event or state-condition transition table for a state machine model.

FIG. 1A illustrates a data structure describing a state-state transition table 102 for a state machine model. Table 102 includes a vertical column of fields 104 (e.g., along the left side of table 102) that stores the source states (e.g., the names of states, labels associated with states, annotations associated with states, etc.) of the state machine model (e.g., S1 and S2). Here, "S1" is the name of a state or a label associated with a state. Likewise, "S2" is the name of another state or a label associated with another state.

Table 102 also includes a horizontal row of fields 106 (e.g., along the top of table 102) that stores the destination states of the state machine model (e.g., S1 and S2). As mentioned above, "S1" is the name of a state and "S2" is the name of another state. At the intersection of a row identified by one of the source states and a column identified by one of the destination states, are condition fields that store conditions (or events) (e.g., conditions C11 through C22) upon which the state machine model transitions from the corresponding source state to the corresponding destination state. According to table 102, for example, if the state machine is currently in source state S1, then when condition C12 is satisfied, the state machine may transition to state S2. Conditions C11 through C22 may include Boolean conditions, for example.

Along with conditions, table 102 includes action fields to store actions (e.g., A11 through A22) for the state machine to take (or execute) when the corresponding condition is satisfied and/or when the state machine model transitions from a corresponding source state to a corresponding destination state. According to table 102, for example, if the state machine is currently in source state S1 and condition C12 is satisfied, then the state machine takes action A12 at the time it transitions to state S2. Actions A11 through A22 may assign a value to a variable, generate an event, etc. In one embodiment, table 102 may exclude action fields, condition fields, and/or destination fields, for example. Further, in one embodiment, one or more cells in table 102 may exclude an action field, a condition field, and/or a destination field. For example, table 102 may specify an action that is taken when a condition is satisfied but the state machine model does not transition to a different state.

As mentioned, at the intersection of a row (e.g., identified by the name of a source state) and a column (e.g., identified by the name of a destination state) is a condition field and, possibly, an action field. For convenience, the condition field and its corresponding action field may be considered a "cell" that corresponds to the source state and the destination state. As described above, the cell may or may not include an action field, a condition field, or even a destination field.

The text below describes columns as vertical and rows as horizontal. These terms ("column," "row," "vertical," "horizontal") are intended to denote the relative relationship of sets of fields (e.g., orthogonal) and not necessarily the particular vertical and/or horizontal aspects. Therefore, an embodiment that describes and/or displays a first set of fields in a horizontal row and a second set of fields in a vertical column is also understood to disclose an embodiment that describes and/or displays the first set of fields in a vertical column and the second set of fields in a horizontal row. Likewise, the text herein describes lines as vertical or lines as horizontal. These terms ("lines," "vertical," "horizontal") are intended to denote the relative relationship of the lines (e.g., orthogonal) and not necessarily the particular vertical and/or horizontal aspects. Therefore, an embodiment that describes and/or displays a first horizontal line and a second vertical line is also understood to disclose an embodiment that describes and/or displays the first line as vertical and the second line as horizontal.

FIG. 1B illustrates a data structure describing a state-condition (or state-event) table 112 for a state machine model. Like table 102, table 112 includes a vertical column of fields 114 (e.g., along the left of table 112) that stores the source states (e.g., the names of states, labels associated with states, or annotations associated with states) of the state machine model. Unlike table 102, table 112 includes a horizontal row of fields 116 (e.g., along the top of table 112) that stores conditions or events. At the intersection of a row identified by one of the source states and a column identified by one of the conditions, are destination fields that store destination states to which the state machine may transition when the corresponding condition is satisfied (or when the corresponding event occurs, or when the corresponding event occurs and condition is satisfied). According to table 112, for example, if the state machine is currently in source state S1, and condition C2 is satisfied, then the state machine may transitions to state S2. As with table 102, conditions C1 and C2 may include Boolean conditions, for example.

Along with conditions, table 112 includes action fields storing actions (e.g., A11 through A22) for the state machine to take (or execute) when in a corresponding source state when the corresponding condition is satisfied, when the corresponding event occurs, or when the corresponding event occurs and condition is satisfied (e.g., when the state machine model transitions to a corresponding destination state). According to table 112, for example, if the state machine is currently in source state S1 and condition C2 is satisfied, then the state machine takes action A12 (e.g., at the time it transitions to state S2). Actions A11 through A22 may redefine a variable, etc. In one embodiment, table 112 may exclude action fields, condition fields, and/or destination fields, for example. Further, in one embodiment, one or more cells in table 112 may exclude an action field, a condition field, and/or a destination field.

As mentioned, at the intersection of a row (i.e., identified by a source state) and a column (i.e., identified by a condition) is a destination field and, possibly, an action field. For convenience, the destination field and its corresponding action field may be considered a "cell" that corresponds to the source state and the condition. The cell may or may not include an action field, a condition field, or even a destination field.

Depending upon the system being modeled by the state machine, a user may select to describe the state machine by a state-state transition table or a state-condition transition table. That is, in some instances, it may be more convenient to choose a state-state transition table and in other instances it may be more convenient to choose a state-condition transition table.

In addition to a state machine model being stored in the manner described above, the state machine model may also be presented (e.g., displayed) as shown in FIGS. 1A and 1B. That is, the user may view the state machine model as state-state transition table 102 on a display or as state-condition transition table 112 on a display.

Exemplary Modeling Environment

Figure 2A:
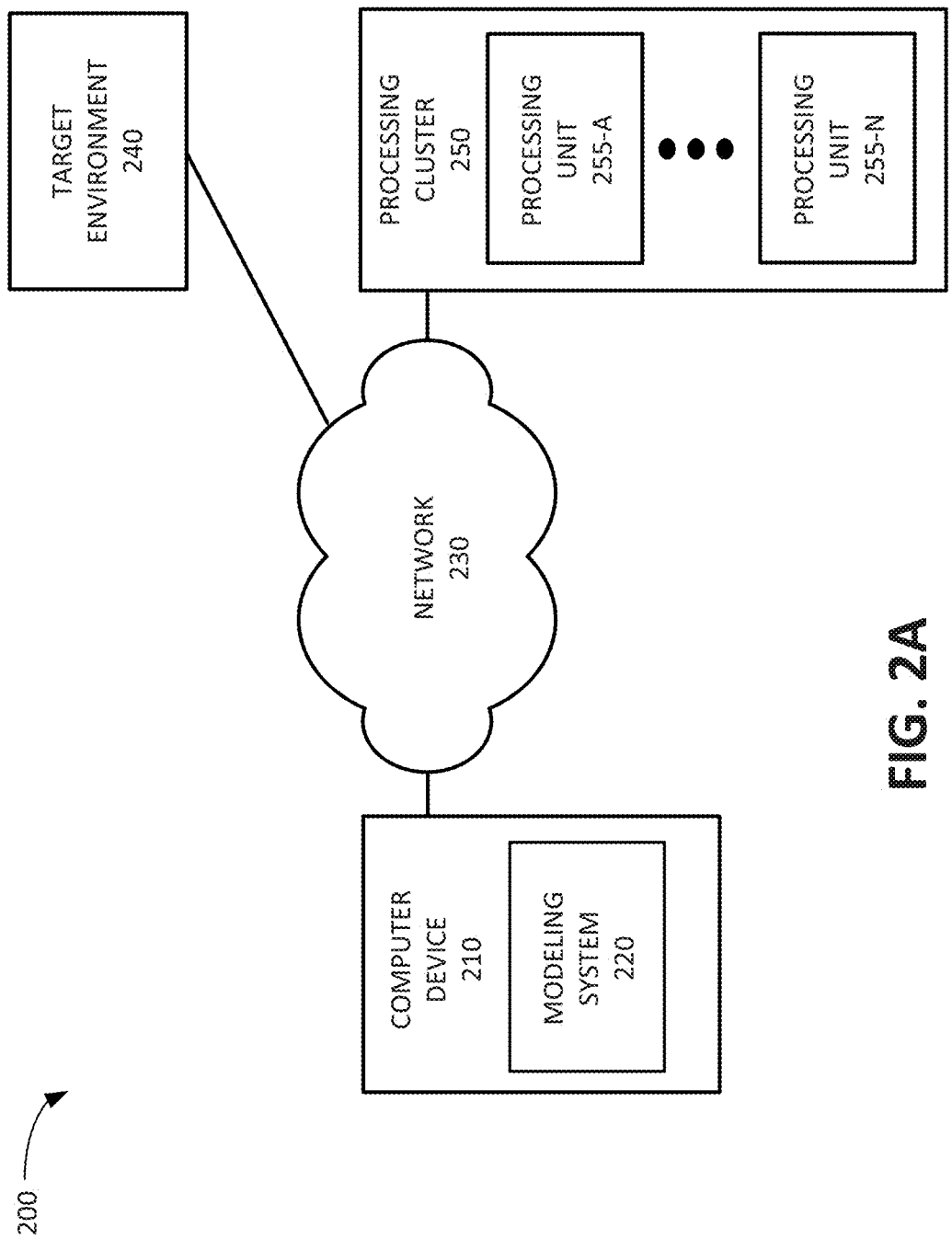
FIG. 2A is a diagram of an exemplary environment 200 for implementing methods and systems for generating state diagrams, for example.

FIG. 2A is a diagram of an exemplary environment 200 for implementing methods and systems for generating state diagrams, for example. As shown in FIG. 2A, environment 200 may include a computer device 210, a network 230, a target environment 240, and a processing cluster 250.

Computer device 210 may include one or more computer devices, such as a personal computer, a workstation, a server device, a blade server, a mainframe, a personal digital assistant (PDA), a desktop computer, a laptop, a tablet, or another type of computation or communication device such as one that executes instructions to perform one or more activities and/or to generate one or more results. Computer device 210 may include a device that performs processing operations, display operations, communication operations, etc. For example, computer device 210 may include logic, such as one or more processing or storage devices, that can be used to perform and/or support processing activities on behalf of a user.

Figure 2B:
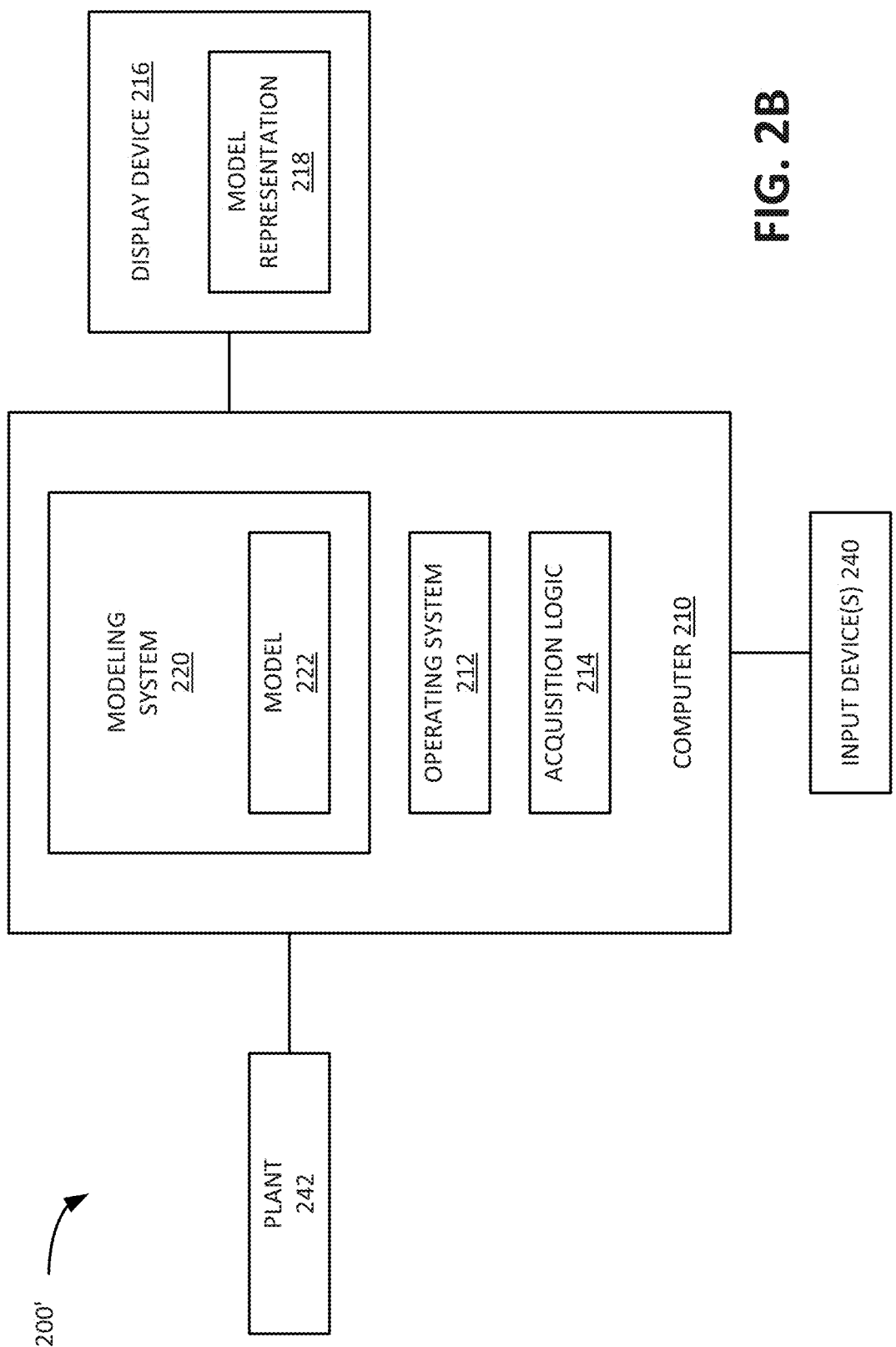
FIG. 2B illustrates an alternative exemplary system for implementing embodiments and techniques of the invention.

Computer device 210 may further perform communication operations by sending data to or receiving data from another device (not shown in FIG. 2B). Data may refer to any type of machine-readable information having substantially any format that may be adapted for use in one or more networks and/or with one or more devices. Data may include digital information or analog information. Data may further be packetized and/or non-packetized. Analog data may be digitized.

Computer device 210 may include a modeling system 220. Modeling system 220 may include a development tool (e.g., a software application) that enables creation, modification, design, and/or simulation of graphical models representing dynamic systems. Furthermore, modeling system 220 may enable the automatic generation of executable code based on a graphical model. Modeling system 220 may include functionality for providing framework 100 for solving trajectory optimization problems defined by a dynamics model and a costs and constraints model.

Network 230 may enable computer device 210 to communicate with other components of environment 200, such as target environment 240 and/or processing cluster 250. Network 220 may include one or more wired and/or wireless networks. For example, network 220 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a Wi-Fi network, an Ethernet network, a combination of the above networks, and/or another type of wireless network. Additionally, or alternatively, network 230 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

Target environment 240 may include one or more devices that may be associated with a dynamic system that is represented by a graphical model in modeling system 220. For example, target environment 240 may include a set of sensors and/or a set of controllers corresponding to a dynamic system. Modeling system 220 may receive data from target environment 240 and use the received data as input to the graphical model. Furthermore, target environment 240 may receive executable code from modeling system 220. The received executable code may enable target environment 240 to perform one or more operations on the dynamic system associated with target environment 240. Target environment 240 may include, for example, an embedded processing device.

Processing cluster 250 may include processing resources which may be used by modeling system 220 in connection with a graphical model. For example, processing cluster 250 may include processing units 255-A to 255-N (referred to herein collectively as "processing units 255" and individually as "processing unit 255"). Processing units 255 may perform operations on behalf of computer device 210. For example, processing units 255 may perform parallel processing in a graphical model in modeling system 220. Modeling system 220 may provide an operation to be performed to processing cluster 250, processing cluster 250 may divide tasks associated with the operation among processing units 255, processing cluster 250 may receive results of the performed tasks from processing units 255, and may generate a result of the operation and provide the result of the operation to modeling system 220.

In one implementation, processing unit 255 may include a graphic processing unit (GPU). A GPU may include one or more devices that include specialized circuits for performing operations relating to graphics processing (e.g., block image transfer operations, simultaneous per-pixel operations, etc.) and/or for performing a large number of operations in parallel. In another example, processing unit 255 may correspond to a single core of a multi-core processor. In yet another example, processing unit 255 may include a computer device that is part of a cluster of computer devices, e.g., computing devices operating as part of a computing cloud.

Although FIG. 2A shows exemplary components of environment 200, in other implementations, environment 200 may include fewer components, different components, differently arranged components, and/or additional components than those depicted in FIG. 2A. Alternatively, or additionally, one or more components of environment 200 may perform one or more tasks described as being performed by one or more other components of environment 200.

FIG. 2B illustrates an alternative exemplary environment 200' for practicing an embodiment. Environment 200' may be used to construct a model (e.g., a state machine model) that includes one or more entities, to design and implement a controller for the model, and/or to generate code from the model, e.g., to generate code for the controller. Environment 200' may include computer device 210, acquisition logic 214, operating system 212, modeling system 220, model 222, input device 240, display device 216, model representation 218, and plant 242. The system in FIG. 2B is illustrative and other embodiments of environment 200' can include fewer devices, more devices, and/or devices in configurations that differ from the configuration of FIG. 2B.

Computer 210 (in FIG. 2B) may be substantially as described above with reference to FIG. 2A. Acquisition logic 214 may acquire data from devices external to computer device 210 and may make the data available to computer device 210. For example, acquisition logic 214 may include analog-to-digital converters, digital-to-analog converters, filters, multiplexers, etc., which are used to make data available to computer device 210. Computer device 210 may use acquired data to perform modeling operations, controller design activities, etc.

Operating system 212 may manage hardware and/or software resources associated with computer device 210. For example, operating system 212 may manage tasks associated with receiving user inputs, operating computing environment device 210, allocating memory, prioritizing system requests, etc. In an embodiment, operating system 212 may be a virtual operating system. Embodiments of operating system 212 may include Linux, Mac OS, Microsoft Windows, Solaris, UNIX, etc. Operating system 212 may further run on a virtual machine, which can be provided by computer device 210.

Modeling system 220 may provide a computing environment that allows users to perform simulation or modeling tasks related to disciplines, such as, but not limited to, mathematics, science, engineering, medicine, business, etc. Modeling system 220 may support one or more applications that execute instructions to allow a user to construct a model having executable semantics. For example, in an embodiment, modeling system 220 may allow users to create free-form models (e.g., first, second, third, fourth, fifth, etc., order models) having executable semantics. Modeling system 220 may further support time-based, event-based, etc., modeling activities.

Model 222 may include information for executable textual or graphical models. For example, model 222 may include information for textual models or graphical models that can be time-based models, event-based models, state transition models, data flow models, component diagrams, entity flow diagrams, equation based language diagrams, etc. Graphical embodiments of model 222 may include entities (e.g., blocks, icons, etc.) that represent executable code for performing operations. Code for the entities may be executed to perform a simulation using the model. Entities may be connected together using lines that represent pathways for sharing data between one entity and another in the model.

Input device 240 may receive user inputs. For example, input device 240 may transform a user motion or action into a signal or message that can be interpreted by computer device 210. Input device 240 can include, but is not limited to, keyboards, pointing devices, biometric devices, accelerometers, microphones, cameras, haptic devices, etc.

Display device 216 may display information to a user. Display device 216 may include a cathode ray tube (CRT), plasma display device, light emitting diode (LED) display device, liquid crystal display (LCD) device, etc. Embodiments of display device 216 may be configured to receive user inputs (e.g., via a touch sensitive screen) if desired. In an embodiment, display device 216 can display one or more graphical user interfaces (GUIs) to a user. The GUIs may include model 240 and/or other types of information.

Model representation 218 may include a visual representation of model 222 and/or a visual representation provided by model 222, e.g., a plot window. For example, model representation 218 may be displayed to a user and may include a number of entities connected by lines.

Plant 242 may include one or more devices that provide data to computer device 210. For example, plant 242 may include an engine system that is monitored using sensors, such as accelerometers, thermocouples, opto-electric transceivers, strain gauges, etc. In an embodiment, acquisition logic 214 may receive signals from plant 242 in analog or digital form and may transform the signals into a form suitable for use in computer device 210.

Exemplary Computer Device

FIG. 2C is a diagram illustrating exemplary components of computer device 210 according to one embodiment. As shown in FIG. 2C, computer device 210 may include a bus 260, a processor 265, a memory 270, an input device 275, an output device 280, and a communication interface 285.

Bus 260 may include a path that permits communication among the components of computer device 210. Processor 265 may include one or more single-core and/or or multi-core processors, microprocessors, and/or processing logic (e.g., application specific integrated circuits (ASICs), field programmable gate arrays (FPGAs), ARM processors, etc.) that may interpret and execute instructions. Memory 270 may include a random access memory (RAM) device or another type of dynamic storage device that may store information and instructions for execution by processor 265, a read only memory (ROM) device or another type of static storage device that may store static information and instructions for use by processor 265, a magnetic and/or optical recording memory device and its corresponding drive, and/or a removable form of memory, such as a flash memory.

Input device 275 may include a mechanism that permits an operator to input information to computer device 210, such as a keypad, a keyboard, a button, or an input jack for an input device such as a keypad or a keyboard, a camera, an analog to digital (ADC) converter, a pulse-width modulation (PWM) input, etc. Output device 280 may include a mechanism that outputs information to the operator, including one or more light indicators, a speaker, a digital to analog (DAC) converter, a PWM output, etc.

Output device 280 may include a display device that displays information to a user. The display device may include a cathode ray tube (CRT), plasma display device, light emitting diode (LED) display device, liquid crystal display (LCD) device, etc. The display device may be configured to receive user inputs (e.g., via a touch sensitive screen) if desired. In an embodiment, the display device may display one or more graphical user interfaces (GUIs) to a user. The display device may display a representation of a model, including a state machine model (e.g., a state-state transition table, a state-condition transition table, a state-event transition table, a unified state transition table, and/or state diagram). The model representation may also include a number of entities connected by lines.

Communication interface 285 may include a transceiver that enables computer device 210 to communicate with other devices and/or systems. For example, communication interface 285 may include a modem, a network interface card, and/or a wireless interface card.

As described in detail below, computer device 210 may perform certain operations relating to a framework for generating a solution to a trajectory optimization problem. Computer device 210 may perform these operations in response to processor 265 executing software instructions stored in a computer-readable medium, such as memory 270. A computer-readable medium may be defined as a non-transitory memory device. A memory device may include memory space within a single physical memory device or spread across multiple physical memory devices.

The software instructions may be read into memory 270 from another computer-readable medium, or from another device via communication interface 285. The software instructions contained in memory 270 may cause processor 265 to perform processes that described below. Alternatively, hardwired circuitry may be used in place of or in combination with software instructions to implement processes described herein. Thus, implementations described herein are not limited to any specific combination of hardware circuitry and software.

Although FIG. 2C shows exemplary components of computer device 210, in other implementations, computer device 210 may include fewer components, different components, additional components, or differently arranged components than depicted in FIG. 2C. Additionally or alternatively, one or more components of computer device 210 may perform one or more tasks described as being performed by one or more other components of computer device 210.

Exemplary Modeling System

Figure 3:
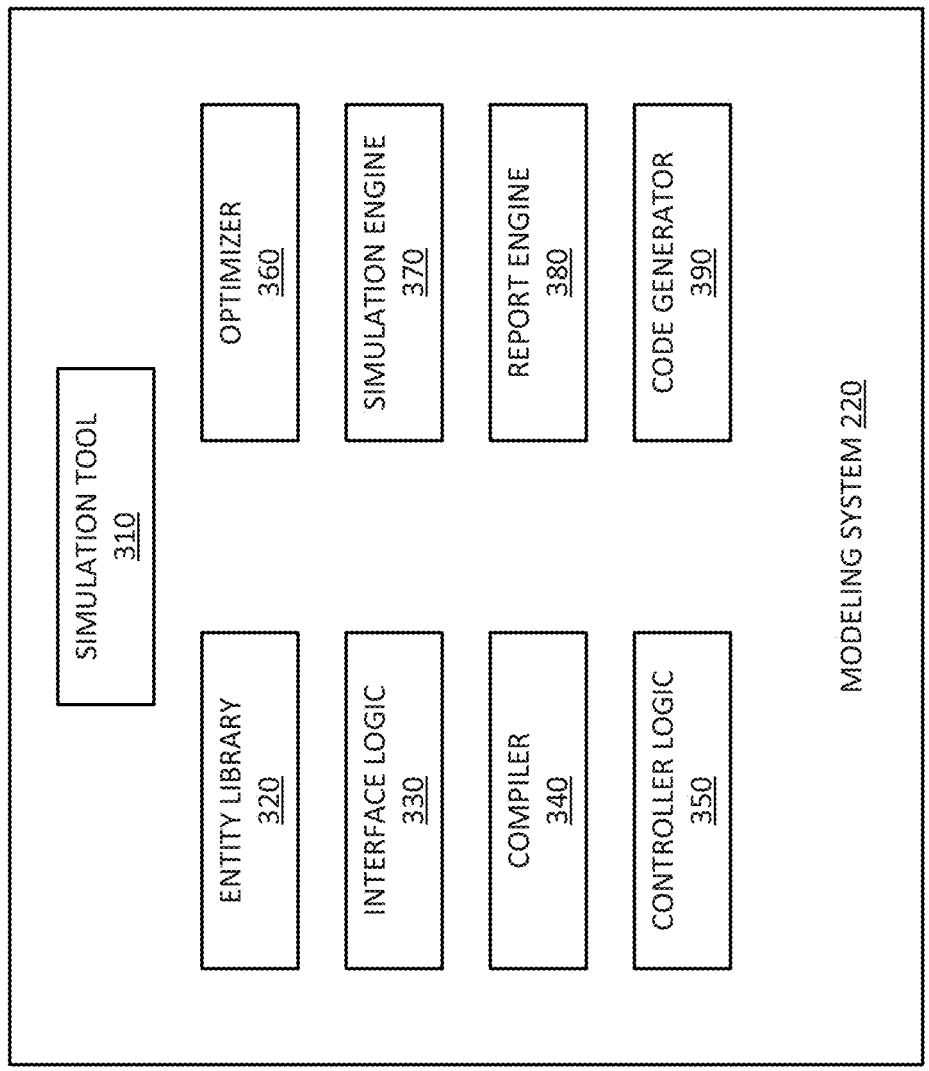
FIG. 3 illustrates an exemplary implementation of a modeling environment that can be used for implementing aspects of the invention.

FIG. 3 is a diagram of exemplary components of modeling system 220 that may be included in computer device 210. Modeling system 220 may include a development tool that enables existing software components to be used in the creation of a model and that may enable generation of executable code based on the model. For example, the development tool may include a graphical modeling tool or application that provides a user interface for a numerical computing environment. Additionally, or alternatively, the development tool may include a graphical modeling tool and/or application that provides a user interface for modeling and simulating (e.g., by executing a model) a dynamic system (e.g., based on differential equations, difference equations, algebraic equations, discrete events, discrete states, stochastic relations, etc.).

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities my include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks such as function calls), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., X=2Y) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may consist of determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations $X=2Y+U$ and $Y=3X-2U$ may be symbolically processed into one equation $5Y=-U$. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally consistent signal flow between blocks, in other implementations, the interactions between blocks may not necessarily be directionally specific or consistent.

In an embodiment, connector lines in a model may represent related variables that are shared between two connected blocks. The variables may be related such that their combination may represent power. For example, connector lines may represent voltage, and current, power, etc. Additionally, or alternatively, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Events may be generated when the continuous-time behavior exhibits specific characteristics. For example, when an inequality changes its truth value between two discrete steps of the numerical solver that approximates the continuous-time behavior, an event may be generated. The time of the event may be assigned the time of either of the two discrete steps, or a value in between the two discrete steps may be obtained that is closest to the time where the truth value changes. This time in between the two discrete time steps may be computed based on a root-finding numerical algorithm that may account for a specified numerical accuracy. An event may also be related to a function call. That is, a function-call may be an event may "wake up" a model for evaluation of, for example, a condition.

Alternatively, or additionally, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

As another example, an executable graphical model may include a state machine model (e.g., a graphical state machine model). The state machine model may include an executable time-based model. The state machine model may include a discrete-state transition system that evaluates its transitions at certain points in time. The points in time may be based on a periodic (and discrete) sample time or the points in time may be based on the change of truth value of an expression (e.g., an inequality). An evaluation of the transition system may be associated with the occurrence of an event and the evaluation may consist of evaluating whether a transition out of a state is enabled. A transition may be enabled when the associated event(s) occur and when the associated condition(s) are satisfied. The state transition system may have input and output variables that may be obtained from and provided to other entities in the graphical model. As noted above, the graphical entities may represent time-based dynamic systems such as differential equation systems and difference equation systems. In another embodiment, the graphical model and the graphical entities may represent a multi-domain dynamic system. The domains may include execution domains or behaviors such as, for example, continuous time, discrete time, discrete event, state transition systems, and/or a model of computation. The model of computation may be based on differential equations, difference equations, algebraic equations, discrete events, discrete states, stochastic relations, data flows, synchronous data flows, control flows, process networks, and/or state machines.

Modeling system 220 may implement a technical computing environment (TCE). A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Java, etc.

In one implementation, the TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, etc.). In another implementation, the TCE may provide these functions as block sets. In still another implementation, the TCE may provide these functions in another way, such as via a library, etc. The TCE may be implemented as a text based environment, a graphically based environment, or another type of environment, such as a hybrid environment that is both text and graphically based.

The TCE may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dassault Systèmes.

An alternative embodiment may implement a TCE in a graphically-based TCE using products such as, but not limited to, Simulink®, Stateflow®, SimEvents®, etc., by The MathWorks, Inc.; VisSim by Visual Solutions; LabView® by National Instruments; Dymola by Dassault Systèmes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

A further alternative embodiment may be implemented in a language that is compatible with a product that includes a TCE, such as one or more of the above identified text-based or graphically-based TCEs. For example, MATLAB® (a text-based TCE) may use a first command to represent an array of data and a second command to transpose the array. Another product, that may or may not include a TCE, may be MATLAB®-compatible and may be able to use the array command, the array transpose command, or other MATLAB® commands. For example, the other product may use the MATLAB® commands to perform model checking.

Yet another alternative embodiment may be implemented in a hybrid TCE that combines features of a text-based and graphically-based TCE. In one implementation, one TCE may operate on top of the other TCE. For example, a text-based TCE (e.g., MATLAB®) may operate as a foundation and a graphically-based TCE (e.g., Simulink) may operate on top of MATLAB® and may take advantage of text-based features (e.g., commands) to provide a user with a graphical user interface and graphical outputs (e.g., graphical displays for data, dashboards, etc.).

As shown in FIG. 3, modeling system 220 may include a simulation tool 310, an entity library 320, interface logic 330, a compiler 340, a controller logic 350, an optimizer 360, a simulation engine 370, a report engine 380, and a code generator 390. The embodiment of modeling system 220 illustrated in FIG. 3 is illustrative and other embodiments of modeling system 220 can include more entities or fewer entities without departing from the spirit of the invention.

Simulation tool 310 may include an application for building a model. Simulation tool 310 can be used to build a textual model or a graphical model having executable semantics, such as dynamic system model 110 and/or costs and constraints model 120. In the case of graphical models, simulation tool 310 may allow users to create, display, modify, diagnose, annotate, delete, print, etc., model entities and/or connections. Simulation tool 310 may interact with other entities illustrated in FIG. 2 or 3 for receiving user inputs, executing a model (e.g., to obtain a simulation), displaying results, generating code, etc. Simulation tool 310 may provide a user with an editor for constructing or interacting with textual models and/or a GUI for creating or interacting with graphical models. The editor may be configured to allow a user to, for example, specify, edit, annotate, save, print, and/or publish a model. A textual interface may be provided to permit interaction with the editor. A user may write scripts that perform automatic editing operations on a model using the textual interface. For example, the textual interface may provide a set of windows that may act as a canvas for the model, and may permit user interaction with the model. A model may include one or more windows. A model that is partitioned into multiple hierarchical levels may show different hierarchical levels in separate windows.

Entity library 320 may include code modules or entities (e.g., blocks/icons) that a user can drag and drop into a display window that includes a graphical model (e.g., model representation 218), such as particular blocks added to dynamic system model 110 and/or costs and constraints model 120. In the case of graphical models, a user may further couple entities using connections to produce a graphical model of a system, such as target environment 140 and/or plant 242.

Interface logic 330 may allow modeling system 220 to send or receive data and/or information to/from devices (e.g., plant 242, target environment 240, processing cluster 250, etc.) or software modules (e.g., a function, an application program interface, etc.). In an embodiment, interface logic 330 may provide an interface between acquisition logic 310 and modeling system 220.

Compiler 340 may compile a model, such as dynamic system model 110, costs and constraints model 120, and/or interface model 130, into an executable format. Code generator 390 may generate code from the compiled model produced by compiler 340. The generated code may be executed on computer device 210 to produce a modeling result. In an embodiment, compiler 340 may also provide debugging capabilities for diagnosing errors associated with the model. Code generator 390 may generate executable code for a part of a graphical model. The executable code may then be automatically executed during execution of the model, so that a first part of the model executes as an interpreted execution and a second part of the model executes as a compiled execution.

Controller logic 350 may be used to create and implement controllers in a graphical model. For example, controller logic 350 may provide functionality for entities that represent types of controllers in the graphical model. When the graphical model executes, controller logic 350 may perform control operations on the model by interacting with entities in the graphical model. In an embodiment, controller logic 350 may include control algorithms that implement controllers in the graphical model, such as, for example, feedback control that includes the determined NOC gains associated with framework 100, 'proportional-integral-derivative' (PID) controls, gain scheduling controls, H-infinity controls, model predictive controls (MPC), dynamic inversion controls, bang/bang controls, sliding mode controls, deadbeat controls, and/or other another type of controls. Embodiments of controller logic 350 may be configured to operate in standalone or distributed implementations.

Optimizer 360 may optimize code, parameters, performance (e.g., execution speed and/or memory use), etc., for a model. For example, optimizer 360 may optimize code to cause the code to occupy less memory, to cause the code to execute more efficiently, to cause the code to execute faster, etc., than the code would execute if the code were not optimized. Optimizer 360 may also perform optimizations for controller logic 350, e.g., to optimize parameters for a controller. In an embodiment, optimizer 360 may operate with or may be integrated into compiler 340, controller logic 350, code generator 390, etc. Embodiments of optimizer 360 may be implemented via software objects that interact with other object oriented software, e.g., for receiving data on which optimizer 360 operates.

Simulation engine 370 may perform operations for executing a model to simulate a system. Executing a model to simulate a system may be referred to as simulating a model. Simulation engine 370 may be configured to perform standalone or remote simulations based on user preferences or system preferences.

Report engine 380 may produce a report based on information in modeling system 220. For example, report engine 380 may produce a report indicating whether a controller satisfies design specifications, a report indicating whether a controller operates in a stable manner, a report indicating whether a model compiles properly, etc. Embodiments of report engine 380 can produce reports in an electronic format for display on a display (e.g., display device 216), in a hardcopy format, and/or a format adapted for storage in a storage device.

Code generator 390 can generate code from a compiled model produced by compiler 340. In an embodiment, code generator 390 may be configured to compile and link the generated code to produce an "in-memory executable" version of a model. The in-memory executable version of model may be used, for example, to simulate, verify, trim, and/or linearize the model. In another embodiment, code generator 390 can generate code from a model. In an embodiment, code generator 390 may receive code in a first format and may transform the code from the first format into a second format. In an embodiment, code generator 390 can generate source code, assembly language code, binary code, interface information, configuration information, performance information, task information, etc., from at least a portion of a model. For example, code generator 390 can generate C, C++, SystemC, Java, Structured Text, hardware description language (HDL), etc., code from the model.

Embodiments of code generator 390 can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Architecture Analysis and Design Language (AADL), Hardware Description Language (HDL), Automotive Open System Architecture (AUTOSAR), etc.). In an embodiment, optimizer 360 can interact with code generator 390 to generate code that is optimized according to a parameter (e.g., memory use, execution speed, multi-processing, etc.). Embodiments of modeling environments consistent with principles of the invention can further include components such as verification components, validation components, etc.

Embodiments of the invention may be used to interactively formulate and solve multivariable feedback control problems and to design controllers for use in non-linear models of substantially any order and/or delay. Embodiments can be configured to use exact linearization techniques to produce linear time invariant models that can represent at least a portion of a non-linear model. Although FIG. 3 shows exemplary components of modeling system 220, in other implementations, modeling system 220 may include fewer components, different components, differently arranged components, or additional components than depicted in FIG. 3. Additionally or alternatively, one or more components of modeling system 220 may perform one or more tasks described as being performed by one or more other components of modeling system 220.

Exemplary Data Structures

Figure 4A:
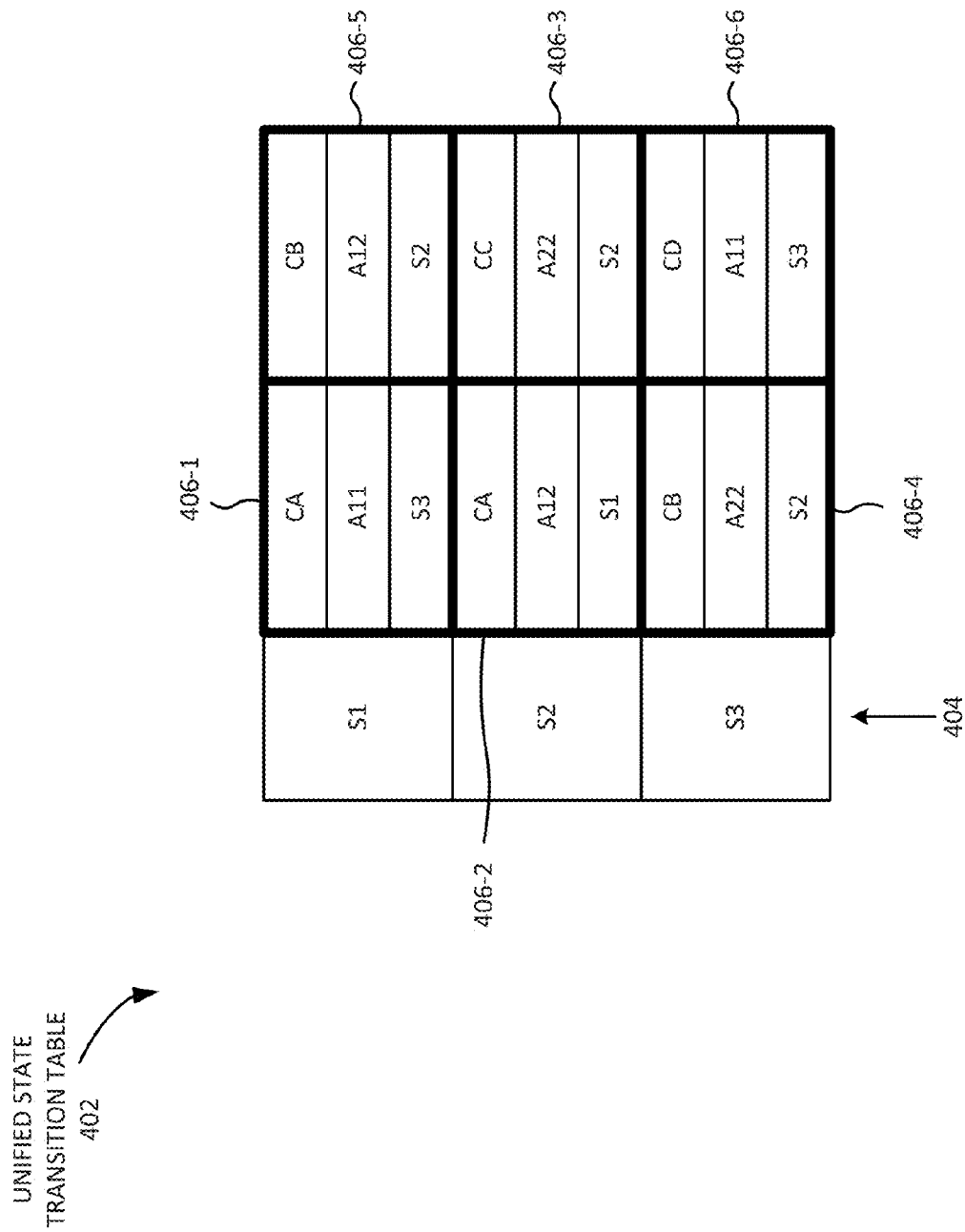
FIG. 4A illustrates a data structure describing a state machine transition table for a state machine model in one embodiment.

FIG. 4A illustrates an exemplary data structure 402 (or a unified state transition table 402) describing a state machine model in one embodiment. Table 402 includes a vertical column of fields 404 (e.g., along the left side of table 402) that stores the source states of the state machine model. For one or more of the source state fields, table 402 may also include one or more cells 406 (individually, "cell 406" or "cell 406-*x*"). Cell 406 may include a condition field identifying a condition upon which, when satisfied, the state machine model may transition from the corresponding source state to a destination state. In one embodiment, the condition field may also specify an event that, when it occurs, causes the conditions (e.g., in the same field) to be evaluated. An event may also be related to a function call. That is, a function-call may be an event may "wake up" a model for evaluation of, for example, a condition.

Cell 406 may also include a destination field identifying the destination state for the state machine model to transition to when the corresponding condition (e.g., in the same cell) is satisfied. Cell 406 may also include an action field identifying an action to be taken by the state machine model when the corresponding condition (e.g., in the same cell) is satisfied and the state machine model transitions to the corresponding destination state (e.g., in the same cell). In one embodiment, unified state transition table 402 may exclude action fields, condition fields, and/or destination fields, for example. Further, in one embodiment, one or more cells 406 in table 402 may exclude an action field, a condition field, and/or a destination field. In the embodiment in which the condition field specifies an event, the action field identifies the action to be taken by the state machine model when the corresponding event occurs and the corresponding condition is satisfied. For convenience and ease of understanding, in the example embodiment of FIG. 4A, condition fields in transition table 402 are considered not to include events. In the case where a destination field is omitted, a default transition may occur (e.g., the destination state of an adjacent cell, the destination state of a cell in a template row, etc.).

Unlike the cells in state-state transition table 102 and state-condition transition table 112, described above, a cell in table 402 includes both a condition field and a destination field. Exemplary table 402 shows three source states: S1, S2, and S3. Source state S1 is associated with a condition CA stored in a condition field (in cell 406-1). Thus, as described in table 402, cell 406-1, when the state machine model is in source state S1, and condition CA is satisfied, the state machine model transitions to state S3. As shown in table 402, source state S2 is associated with the same condition CA stored in a condition field in another cell (e.g., cell 406-2). Therefore, as described in table 402, cell 406-2, when the state machine model is in state S2, and condition CA is satisfied, the state machine model transitions to state S1. Thus, as shown in table 402, the condition field corresponding to source state S1 (in cell 406-2) has the identical condition (e.g., CA) as the condition field corresponding to source state S2. In other words, table 402 may store redundant condition information as compared to, for example, state-condition transition table 112. In one embodiment, rather than storing redundant condition information in cell 406-2, the condition field in cell 406-2 may reference (e.g., point to) the condition field in cell 406-1. For example, the condition field in cell 406-2 may reference $1$2 (e.g., row 1 and column 2, assuming that the column specifying the state is counted).

Further, as described in table 402, cell 406-3, source state S2 is associated with destination state S2 stored in a destination field and condition CC stored in a condition field. Thus, when the state machine model is in source state S2, and condition CC is satisfied, the state machine model transitions to state S2. As identified in cell 406-4, source state S3 is also associated with destination state S2 stored in a destination field. Thus, when the state machine model is in source state S3, and condition CB is satisfied, the state machine model transitions to state S2. Thus, as shown in table 402, the destination state field corresponding to source state S2 (in cell 406-3) has the identical destination state (e.g., S2) as the destination field (in cell 406-4) corresponding to source state S3. In other words, table 402 may store redundant destination state information as compared to, for example, state-state transition table 402. In fact, cell 406-5 also identifies a condition CB for destination state S2 (e.g., a redundant destination state). As identified in cell 406-5, when the state machine model is in source state S1 and condition CB is satisfied, the state machine model may transitions to destination state S2. In one embodiment, rather than storing redundant destination state information (e.g., in cell 406-4), a destination field (e.g., in cell 406-4) may reference (e.g., point to) the destination field in another cell (e.g., cell 406-3). For example, the destination field in cell 406-4 may reference $2$3 (e.g., row 2 and column 3).

As shown in transition table 402, state S2 is referenced multiple times as a destination state and can be considered a "multi-reference state" and the identification of the destination state S2 may be stored redundantly in table 402. Further, as shown in table 402, the condition CA is specified multiple times as a condition and can be considered a "multi-reference condition" and the identification of the condition CA may be stored redundantly in table 402.

Figure 4B:
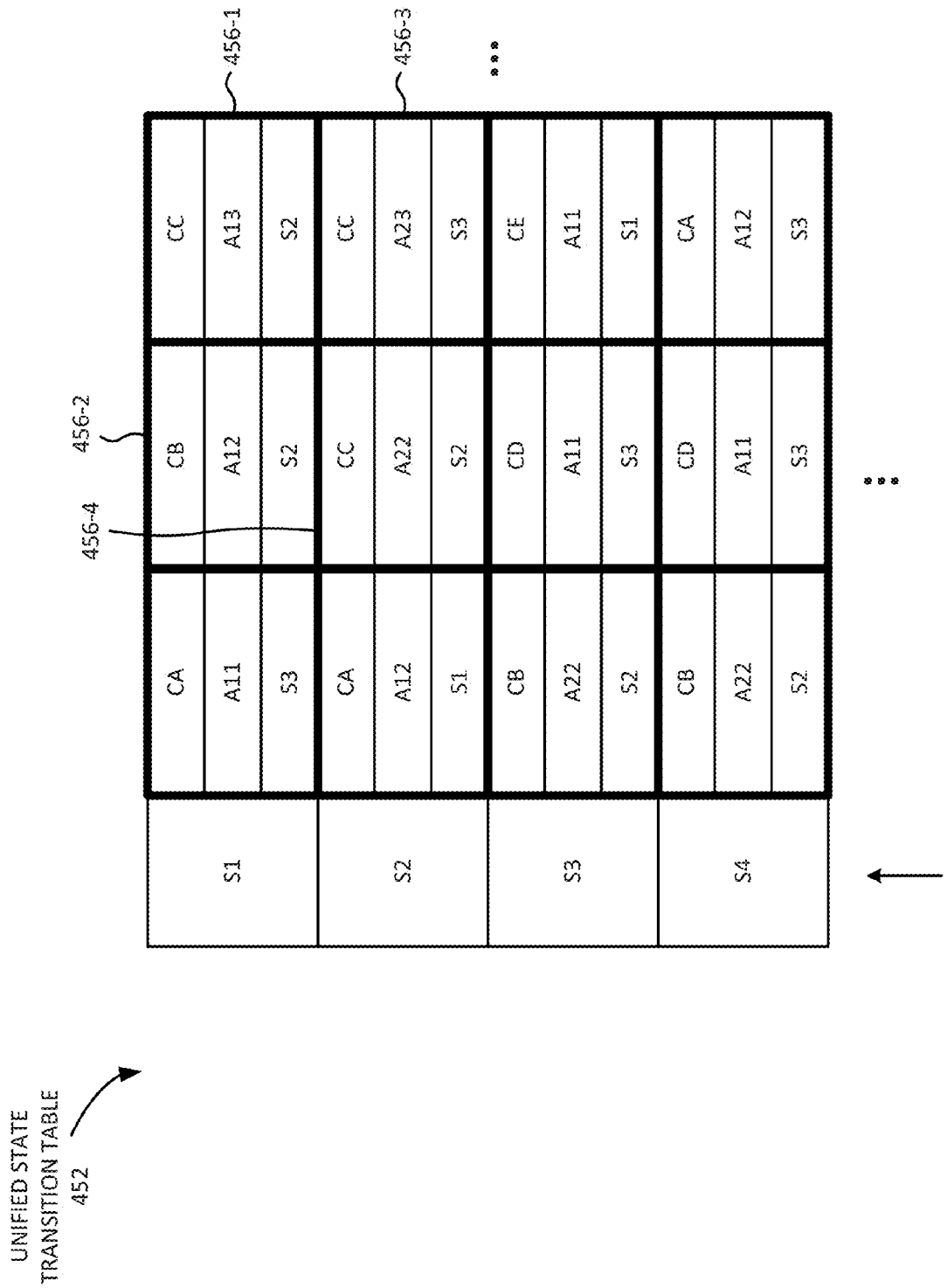
FIG. 4B illustrates a data structure describing a state machine transition table in another embodiment.

FIG. 4B illustrates an exemplary data structure 452 (or a unified state transition table 452) describing a state machine model in another embodiment. Table 452, like table 402, includes a vertical column of fields 454 that stores the source states of the state machine model. For one or more of the source state fields, table 452 may also include one or more cells 456. Cell 456 may include a condition field identifying a condition upon which, when satisfied, the state machine model transitions from the corresponding source state to a destination state; a destination field identifying the destination state for the state machine model to transition to when the corresponding condition is satisfied; and an action field identifying an action to be taken by the state machine model when the corresponding condition is satisfied.

Like cells in table 402, a cell 456 in table 452 includes both a condition field and a destination field. Exemplary table 452 shows four source states: S1, S2, S3, and S4. Many more source states are possible, but four are shown for convenience. Further, more (or less) than three cells 456 may be associated with each source state, but three cells 456 are shown for each source state for convenience. Source state S1 is associated with multiple cells 456 (e.g., cell 456-1 and cell 456-2) that identify the same destination state (e.g., destination state S2). In this case, if the state machine model is in source state S1, and condition CB (identified in cell 456-2) is satisfied or condition CC (identified in cell 456-1) is satisfied, then the state machine model transitions to state S2. As described above, in one embodiment, the destination state specified in one cell (e.g., cell 456-2) may reference another cell (e.g., cell 456-1) (e.g., specifying $1$3 in cell 456-2 in the destination field). Further, source state S2 is associated with multiple cells (e.g., cell 456-3 and cell 456-4) that identify the same condition (e.g., condition CC). In one embodiment, such a situation may be considered an error. In another embodiment, such a situation may result in the first condition (e.g., from left to right or the condition in cell 456-4) being considered without the second condition (e.g., the condition in cell 456-3) being considered. That is, if the state machine model is in source state S2 and condition CC is satisfied, then the state machine model transitions to destination state S2 as identified in cell 456-4. As described above, in one embodiment, the condition specified in one cell (e.g., cell 456-4) may reference another cell (e.g., cell 456-3) (e.g., specifying $2$3 in cell 456-2 in the destination field).

As shown in transition table 452, state S2 is referenced multiple times as a destination state and can be considered a "multi-reference state" and the identification of the destination state S2 may be stored redundantly in table 452. Further, as shown in table 452, the condition CC is specified multiple times as a condition and can be considered a "multi-reference condition" and the identification of the condition CC may be stored redundantly in table 452.

FIGS. 4A and 4B may also illustrate an exemplary display of the information in table 402. That is, table 402 or table 452 may be displayed on a screen of display device 216 substantially as shown in FIG. 4A. As described below, table 402 may also be displayed in other ways, such as in a state-state format, a state-condition format, a state-event format, or a combination of such formats.

Figure 4C:
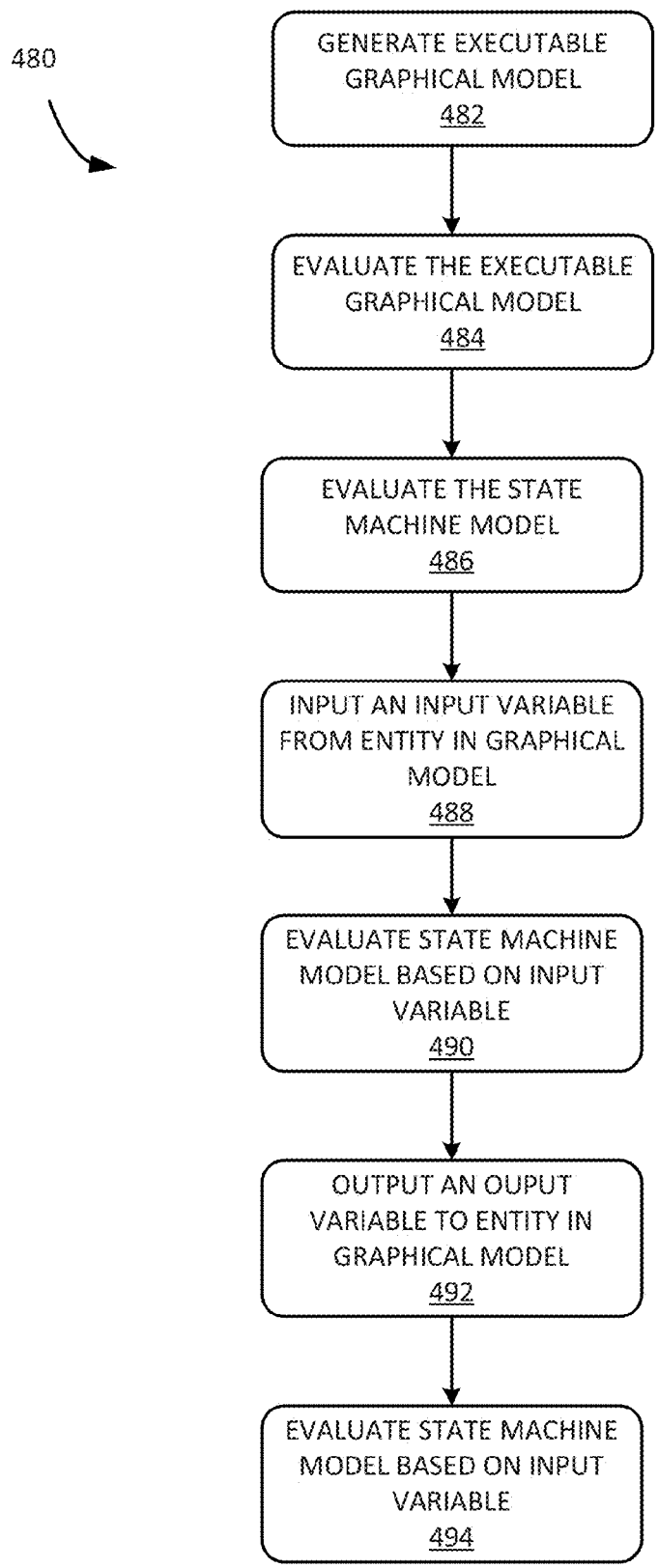
FIG. 4C is a flowchart of a process for generating and evaluating a graphical model including a state machine model in one embodiment.

FIG. 4C is a flowchart of a process for generating and evaluating a graphical model including a state machine model in one embodiment. Process 480 may be performed by computer device 210. Process 480 may begin with generating an executable graphical model representing a time-based dynamic system (block 482). As described above, the graphical model may include graphical entities with relationships between the graphical entities. The graphical model may includes a state machine model described by a state transition table, such as transition table 402 and/or transition table 452 (e.g., a time-based executable state machine having a plurality of discrete states).

The graphical model may be evaluated and/or simulated (block 484). Evaluating the executable graphical model may include evaluating the state machine model (block 486). As described above, evaluating the state machine may include evaluating whether to transition between states at points in time. The points in time may occur, for example, at periodic times, when the value of an expression changes, when an event occurs, or when a condition is satisfied. In one embodiment, evaluating whether to transition between states may includes evaluating the state transition table that includes a multi-reference state (e.g., a table that describes transitioning to an identical destination state from a more than one of the source states). In another embodiment, evaluating whether to transition between states may include evaluating the state transition table that includes a multi-reference condition (e.g., a table that describes an identical condition to transition from more than one of the source states).

In one embodiment, evaluating the state machine model may include inputting a variable (e.g., an input variable) from one of the graphical entities (block 488) and evaluating the state machine model based on the input variable (block 490). In another embodiment, evaluating the graphical model may include outputting a variable (e.g., an output variable) to one of the graphical entities from the state machine model (block 492) and evaluating the graphical model based on the output variable (block 494).

Figure 5A:
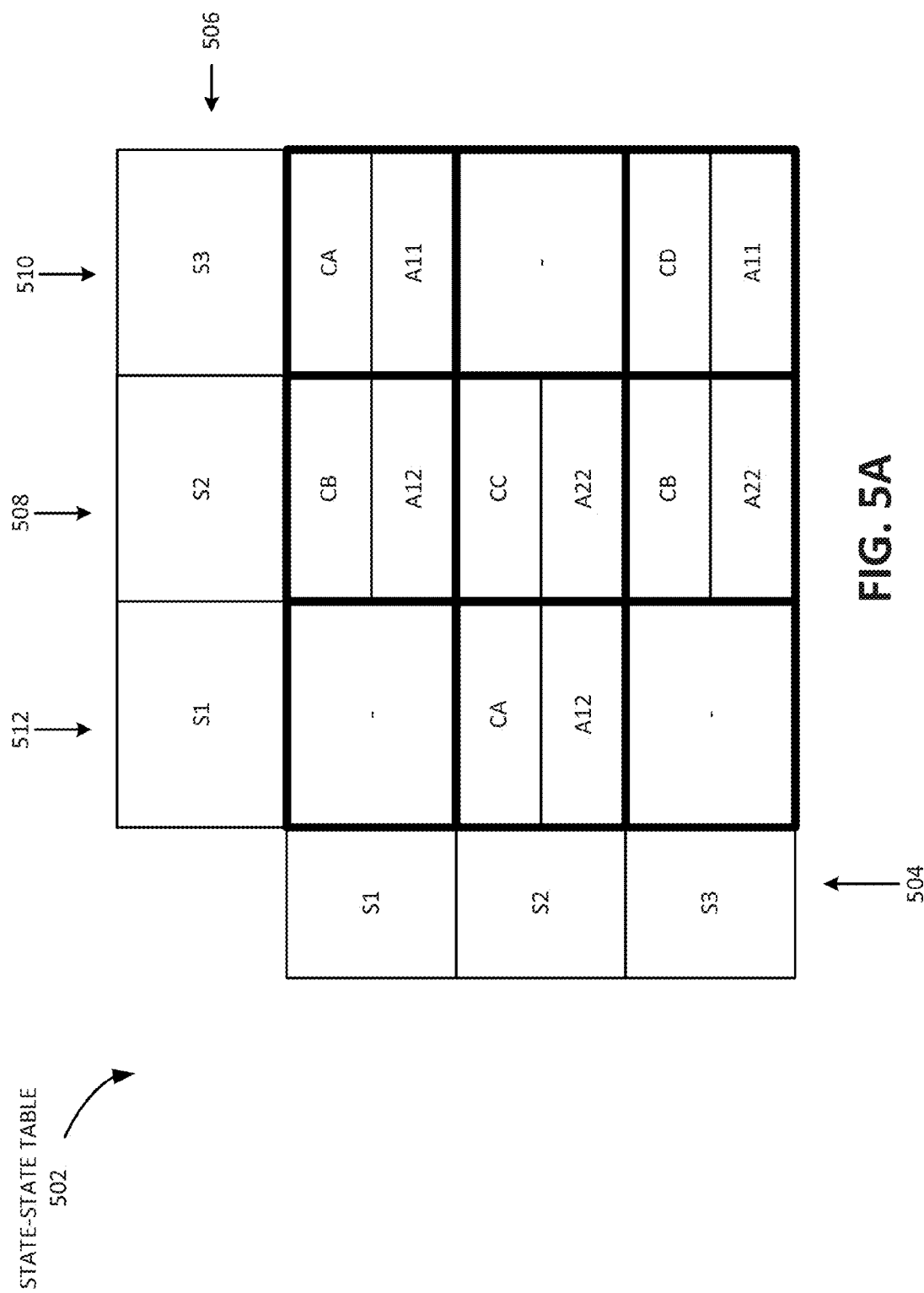
FIG. 5A illustrates a state-state transition table displaying the information stored in the unified state transition table of FIG. 4A.

For example, FIG. 5A illustrates the display of unified state transition table 402 in a state-state transition table format. Like state-state transition table 102, table 502 includes a vertical column of fields 504 that display the source states of the state machine model and a horizontal row of fields 406 that displays the destination states of the state machine model. At the intersection of a row identified by one of the source states and a column identified by one of the destination states, are condition fields that display conditions upon which the state machine model transitions from the corresponding source state to the corresponding destination state. Along with conditions, table 502 includes action fields to display actions for the state machine to take (or execute) when the corresponding condition is satisfied and/or when the state machine model transitions from a corresponding source state to a corresponding destination state.

The information stored in unified state transition table 402 may be organized and displayed as shown in table 502. FIG. 5D is a flowchart of a process 550 for organizing and displaying the information in a unified state transition table. In one embodiment, condition fields in table 402 associated with identical destination states may be grouped (block 552). For example, as shown in FIG. 4A, cell 406-4, cell 406-3, and cell 406-5 all include conditions (CB, CC, and CB, respectively) for transitioning to the identical destination state S2. These three conditions (CB, CC, and CB) may be grouped into a single column 508 of table 502, where column 508 includes destination state S2 at the top of the column. Likewise, as shown in FIG. 4A, cell 406-1 and cell 406-6 both can include conditions (CA and CD, respectively) for transitioning to destination state S3. These two conditions (CA and CD) may be grouped into a single column 510 of table 502, where column 510 includes destination state S3 at the top of the column.

Thus, after grouping condition fields associated with identical destination states, state-state transition table 502 may be displayed in a manner representing the state machine model (block 554), wherein the source states are displayed in column 504 of table 502, the destination states are displayed in row 506 of table 502, and the conditions are displayed, based on the grouping of condition fields, in such a way that the destination states are not repeated in row 506 displaying the destination states. From the perspective of the user, the state machine model is displayed as a state-state transition table (e.g., table 502) even though the data may be stored as a unified state transition table (e.g., table 402). In another embodiment, the conditions are displayed in such a way that the destination states may be repeated in row 506 displaying the destination states.

In one embodiment, the user may edit information displayed in table 502. That is, table 502 may serve as a user interface to receive changes, modifications, and updates to the state machine model stored in unified state transition table 402. Interface logic 330 may receive input from the user to edit one of the destination states displayed in row 506 (block 556), wherein an edited destination state is associated with two condition fields, with each condition field corresponding to a different source state.

Figure 5B:
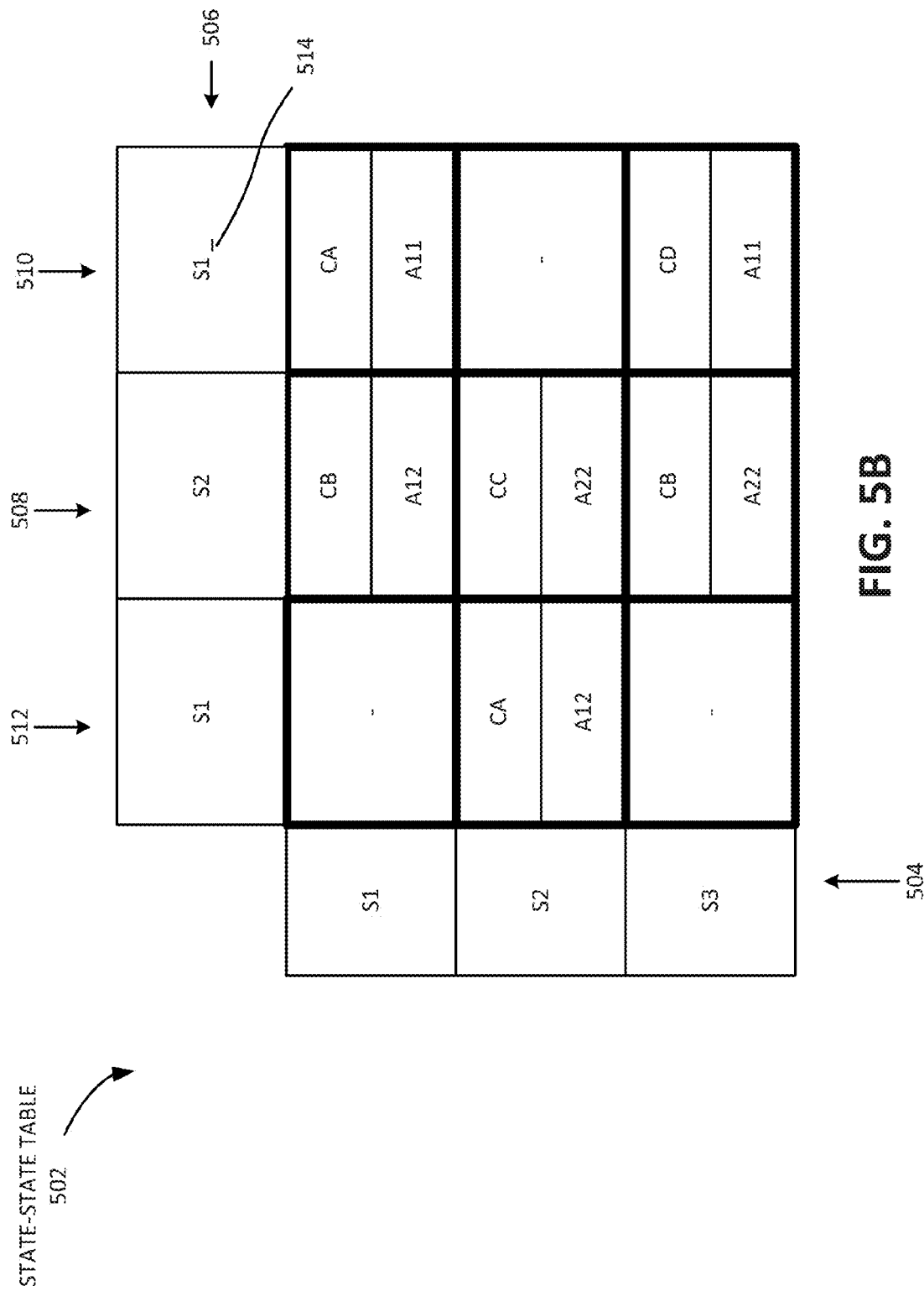
FIG. 5B illustrates editing the state-state transition table of FIG. 5A.
Figure 5C:
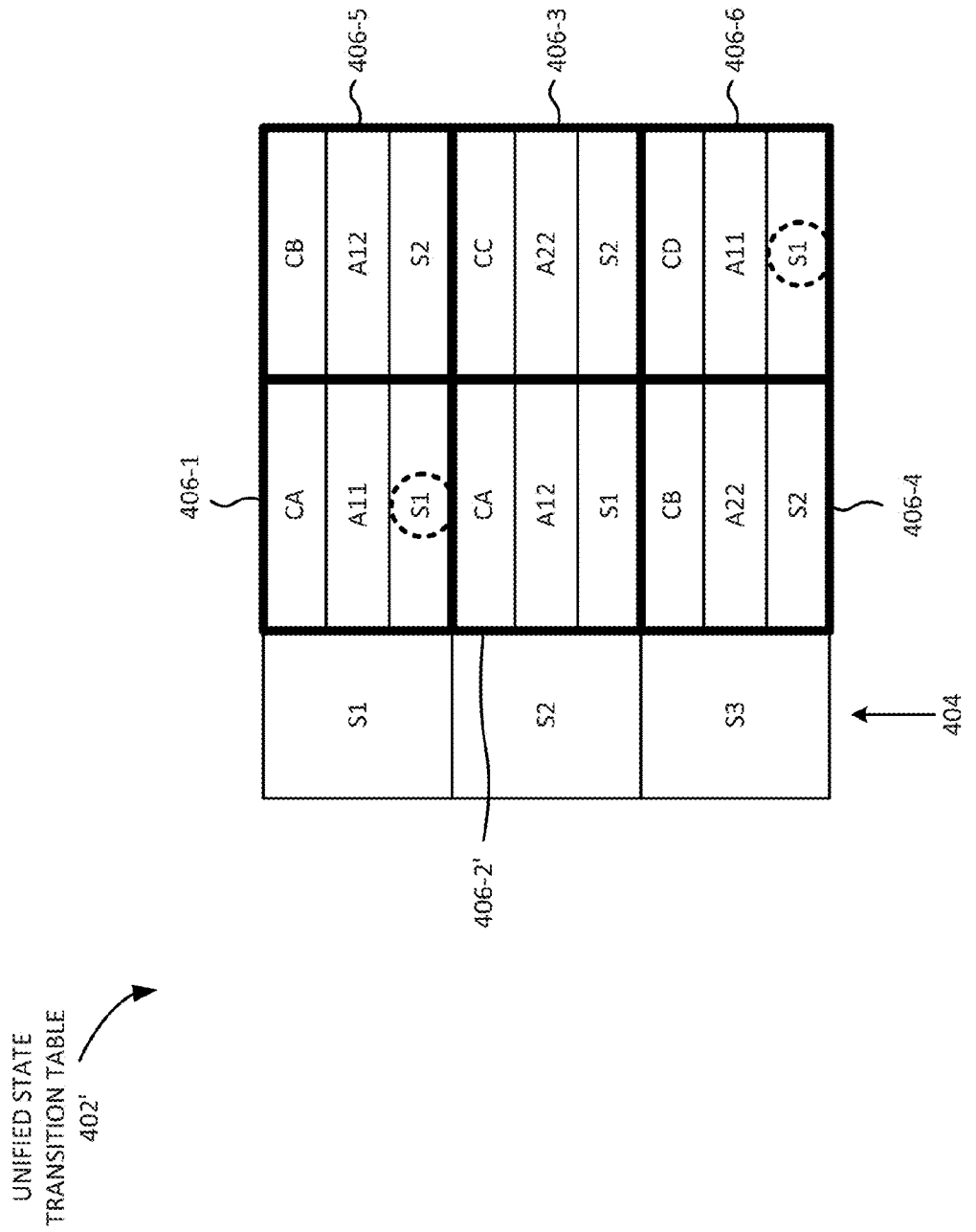
FIG. 5C illustrates the unified state transition table of FIG. 4A following the editing as shown in FIG. 5B.
Figure 5D:
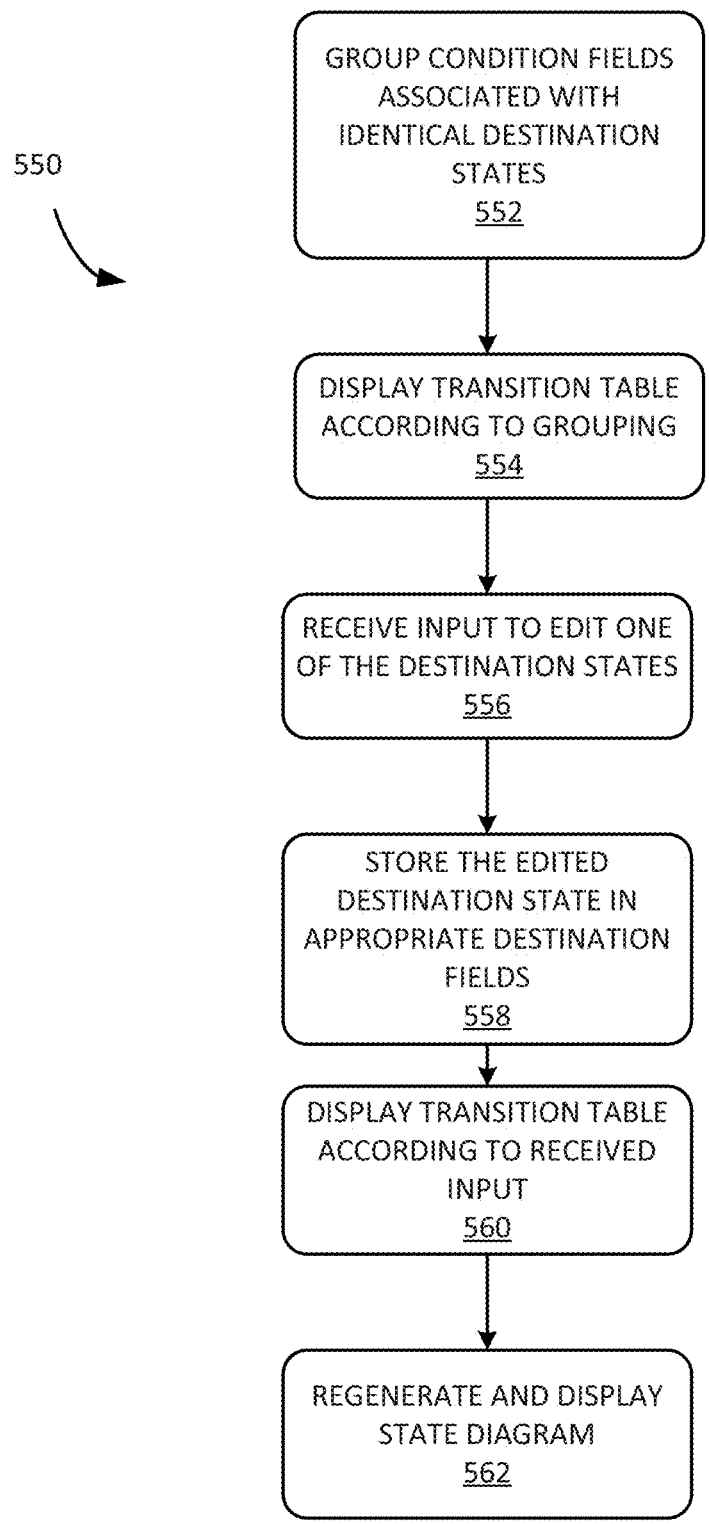
FIG. 5D is a flowchart of a process for organizing and displaying the information in a unified state transition table.

For example, as shown in FIG. 5B by a cursor 514, the user may edit the destination state stored in column 510 of table 502 to be "S1" (from being "S3"). When the user completes the edit, the edited destination state may be stored in the appropriate destination fields (block 558) in table 402 (e.g., in one or more fields associated with the conditions corresponding to the source states). Thus, the edited unified state transition table 402' in FIG. 5C shows destination state S1 in cells 406-1 and 406-6 (rather than "S3"). As described below, the state transition table may be re-displayed with the edited information (block 560) and/or a new state diagram may be regenerated and displayed from the edited information (block 562).

Figure 6A:
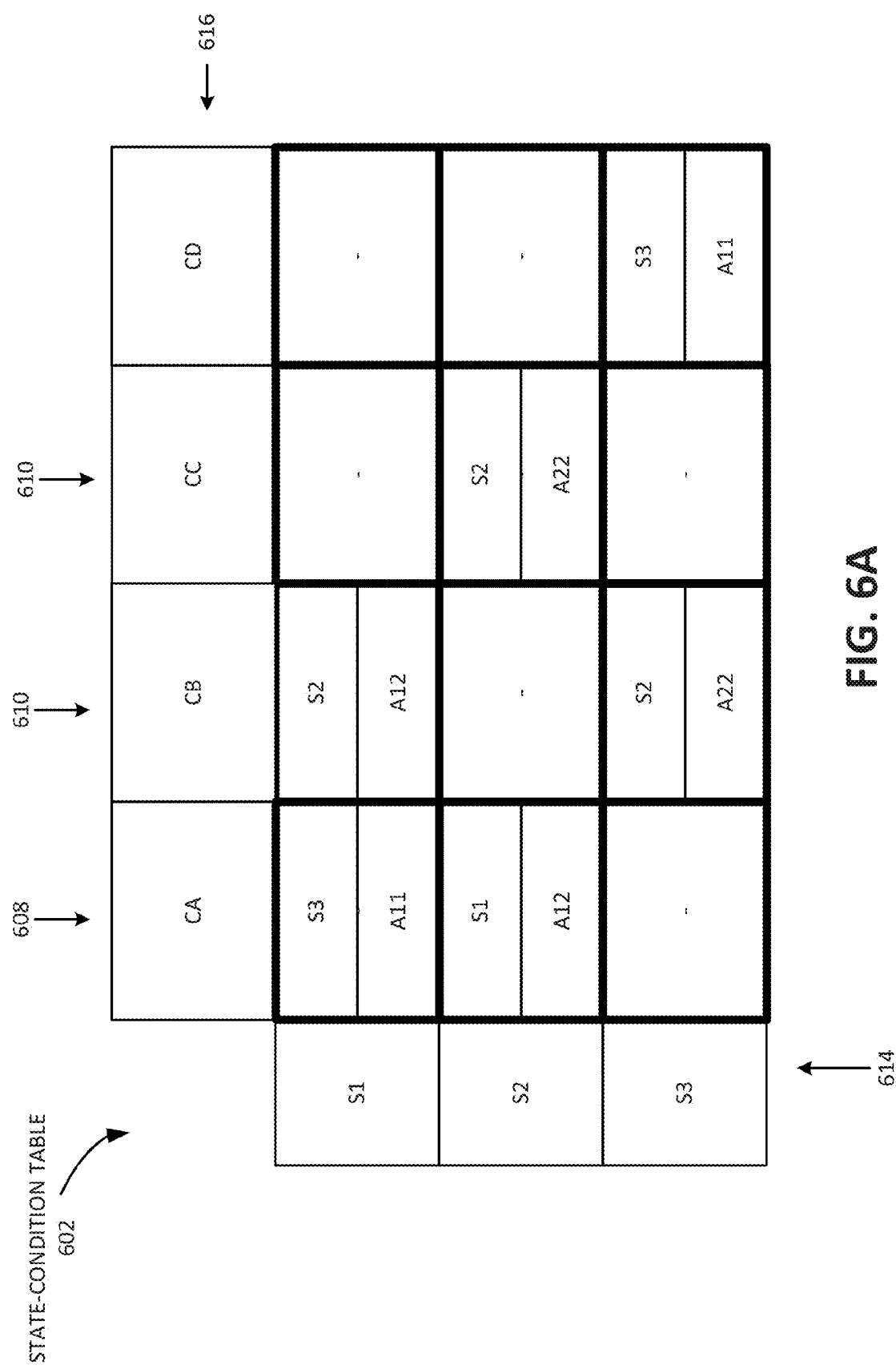
FIG. 6A illustrates a state-condition transition table displaying the information stored in the unified state transition table of FIG. 4A.

FIG. 6A illustrates the display of unified state transition table 402 in a state-condition transition table format 602. Like state-condition transition table 112, table 602 includes a vertical column of fields 614 that displays the source states of the state machine model and a horizontal row of fields 616 that displays conditions. At the intersection of a row identified by one of the source states and a column identified by one of the conditions, are destination fields that display destination states to which the state machine may transition when the corresponding condition is satisfied. Along with conditions, table 602 includes action fields displaying actions for the state machine to take (or execute) when in a corresponding source state when the corresponding condition is satisfied (e.g., when the state machine model transitions to a corresponding destination state).

Figure 6B:
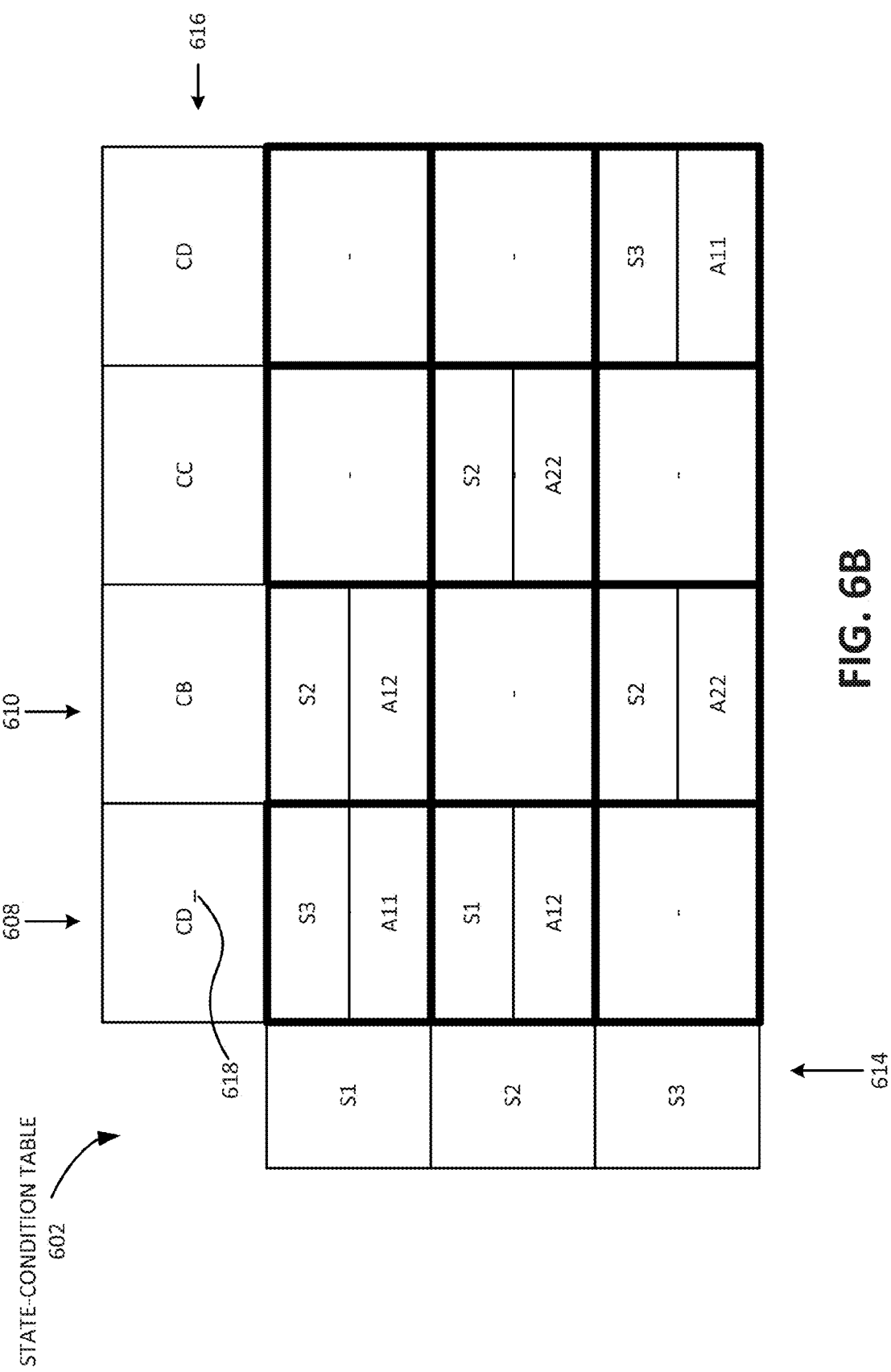
FIG. 6B illustrates editing of the state-condition transition table of FIG. 6A.
Figure 6C:
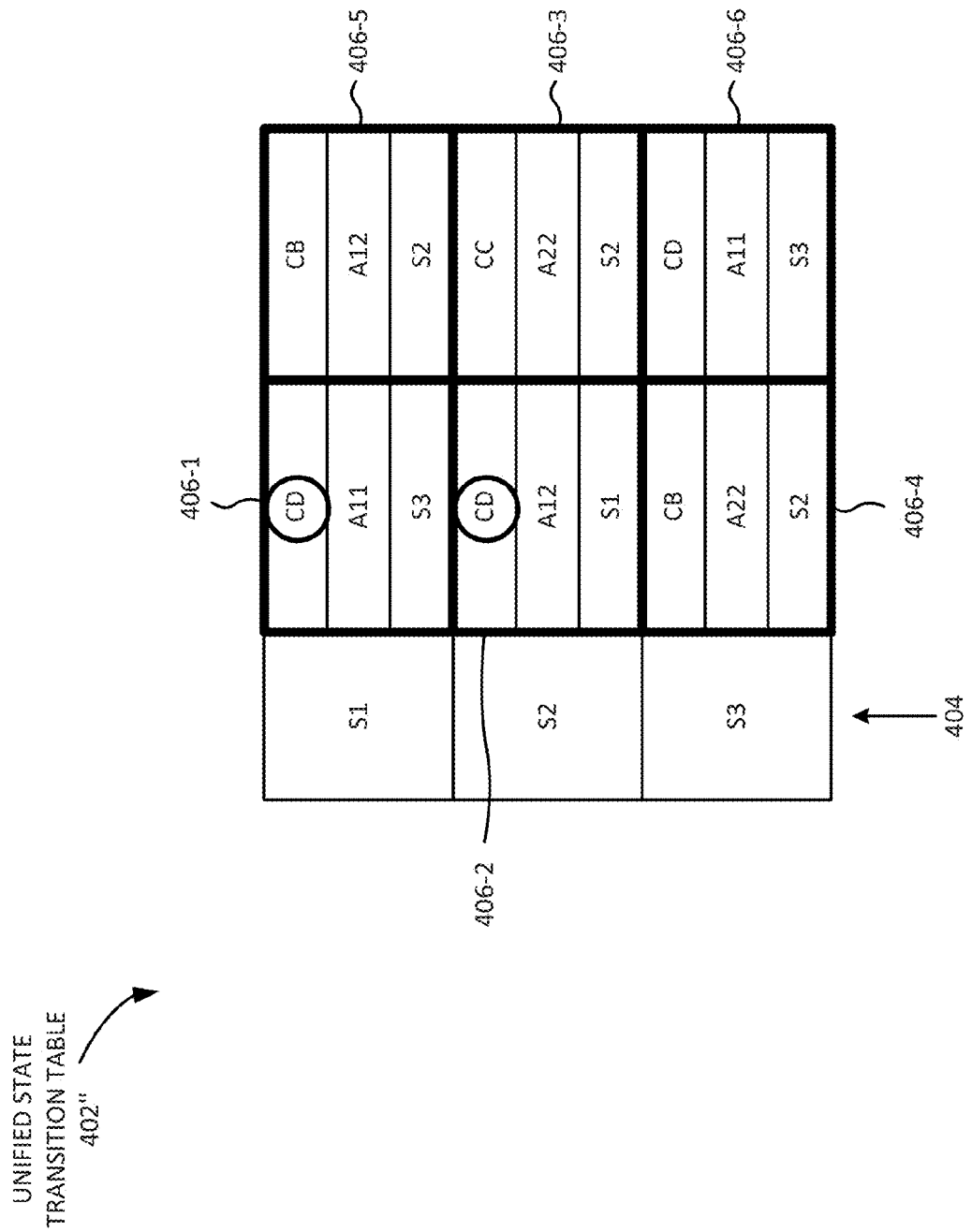
FIG. 6C illustrates the unified state transition table of FIG. 4A following the editing shown in FIG. 6B.
Figure 6D:
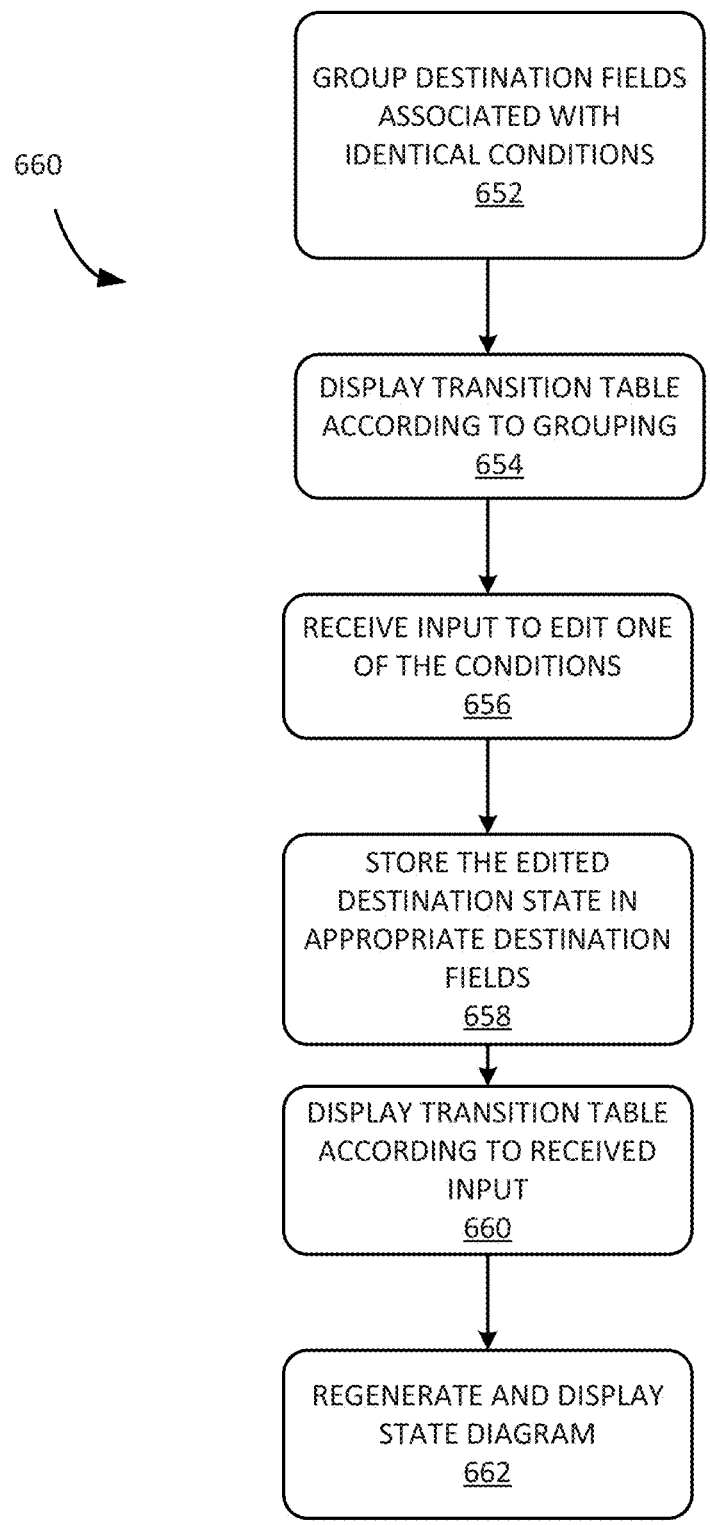
FIG. 6D is a flowchart of a process for organizing and displaying the information in a unified state transition table.

Thus, the information stored in unified state transition table 402 may be organized and displayed as shown in table 602. FIG. 6D is a flowchart of a process 650 for organizing and displaying the information in a unified state transition table. In one embodiment, destination fields associated with identical conditions may be grouped (block 652). For example, as shown in FIG. 4A, cell 406-1 and cell 406-2 include destination states (S3 and S1, respectively) that are associated with the identical condition CA. These two destination states (S3 and S1) may be grouped into a single column 608 of table 602, where column 608 includes condition CA at the top of the column. Likewise, as shown in FIG. 4A, cell 406-5 and cell 406-4 include a destination state (S2) that is associated with the identical condition CB. These destination state (S2) may be grouped into a single column 610 of table 602, where column 610 includes condition CB at the top of the column.

Therefore, after grouping destination state fields associated with identical conditions, state-condition transition table 602 may be displayed to represent the state machine model (block 654), wherein the source states are displayed in column 614 of table 602, the conditions are displayed in row 616 of table 602, and the destination states are displayed, based on the grouping of the destination states, in such a way that the conditions are not repeated in the row displaying the conditions. From the perspective of the user, the state machine model is displayed as a state-condition transition table (e.g., table 602) even though the data may be stored as a unified state transition table (e.g., table 402). In another embodiment, the destination states are displayed in such a way that the conditions may be repeated in the row displaying the conditions.

In one embodiment, the user may edit information displayed in table 602. That is, table 602 may be used as a user interface to receive changes, modifications, and updates to the state machine model stored in unified state transition table. Interface logic 330 may receive input from the user to edit one of the conditions displayed in row 616 (block 656), wherein the edited condition is associated with two destination state fields, each destination field corresponding to a different source state. For example, as shown by a cursor 618 in FIG. 6B, the user may edit the condition stored in column 608 of table 602 to be "CD" (from "CA"). When the user completes the edit, the edited condition is stored in the appropriate destination fields associated with the destinations corresponding to the source states (block 658). Thus, the edited unified state transition table 402" in FIG. 6C shows condition CD in cells 406-1 and 406-2 (rather than "CA").

As shown in FIG. 4A, unified state transition table 402 includes action fields for storing actions in cell 406. In particular, the action field in cell 406-5 stores the same action as the action field in cell 406-2 (e.g., A12). Further, the action field in cell 406-1 stores the same action as the action field in cell 406-6. And, the action field in cell 406-3 stores the same action as the action field in cell 406-4. As described below, the state transition table may be re-displayed with the edited information (block 660) and/or a new state diagram may be regenerated and displayed from the edited information (block 662).

Figure 7A:
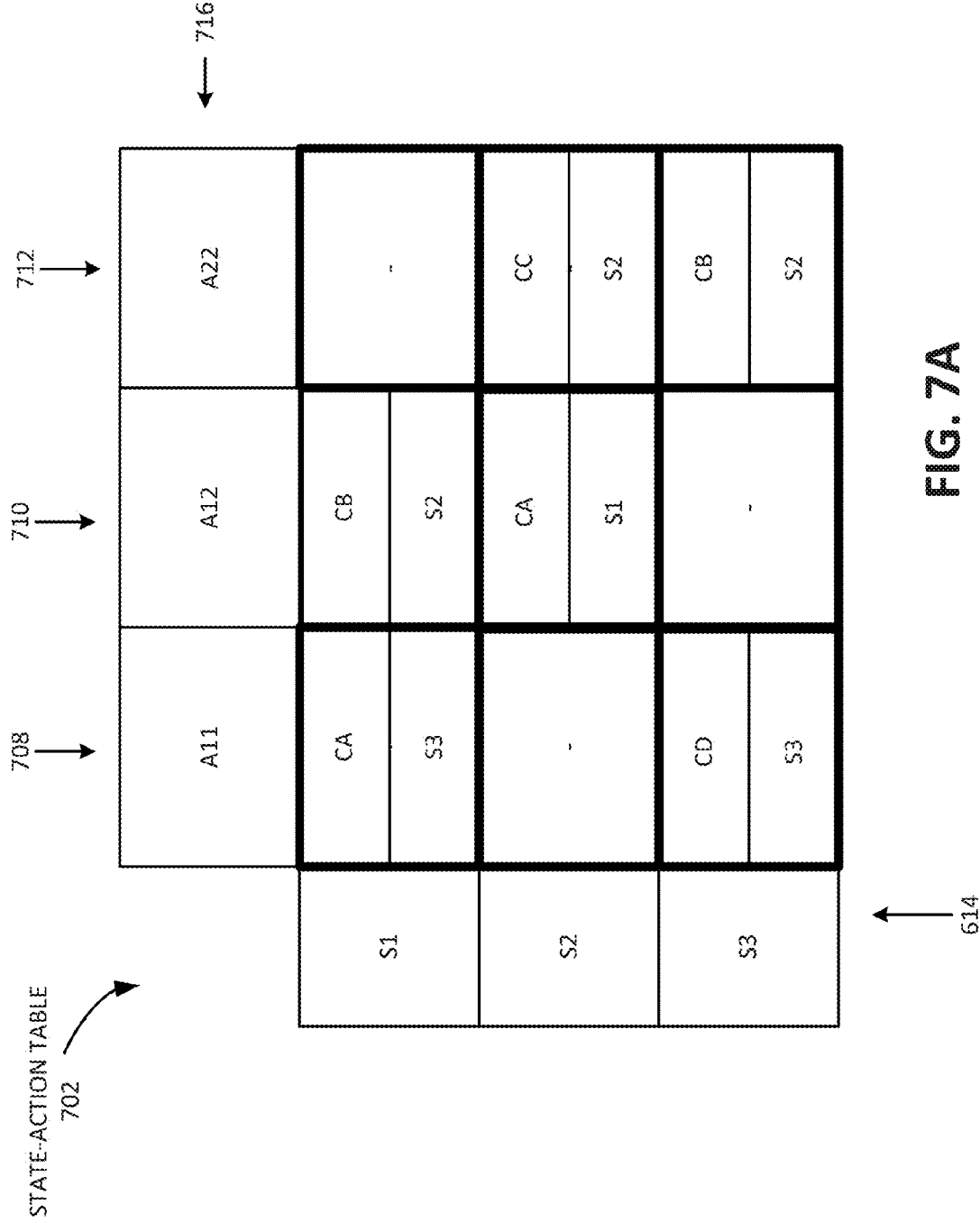
FIG. 7A illustrates a state-action transition table displaying the information stored in the unified state transition table of FIG. 4A.

FIG. 7A illustrates the display of unified state transition table 402 in a state-action transition table format 702. Like state-condition transition table 602, state-action transition table includes a vertical column of fields 714 that displays the source states of the state machine model and a horizontal row of fields 716 that displays actions. At the intersection of a row identified by one of the source states and a column identified by one of the conditions, are destination fields and condition fields that display destination states to which the state machine may transition when the corresponding condition is satisfied. The action fields displayed along the top of table 702 indicate actions for the state machine to take (or execute) when the state machine model is in a source state and the appropriate condition is satisfied (e.g., when the state machine model transitions to a corresponding destination state).

The information stored in unified state transition table 402 may be organized and displayed as shown in table 702. In one embodiment, condition fields and/or destination fields associated with identical action may be grouped. For example, as shown in FIG. 4A, cells 406-5 and 406-2 include conditions and destination states that are associated with the identical action A12. These two destination states and conditions may be grouped into a single column 710 of table 702, where column 710 includes action A12 at the top of the column. Likewise, as shown in FIG. 4A, cells 406-1 and 406-6 include destination states and conditions that are associated with the identical action A11. These destination states and conditions may be grouped into a single column 708 of table 702, where column 708 includes action A11 at the top of the column. Finally, as shown in FIG. 4A, cells 406-3 and 406-4 include destination state and conditions that are associated with the identical action A22. These destination states and conditions may be grouped into a single column 712 in table 702, where column 712 includes action A22 at the top of the column.

After grouping destination state fields associated with identical conditions, state-action transition table 702 may be displayed to represent the state machine model, wherein the source states are displayed in column 714 of table 702, the actions are displayed in row 716 of table 702, and the destination states and conditions are displayed, based on the grouping of the actions, in such a way that the actions are not repeated in the row displaying the actions. From the perspective of the user, the state machine model is displayed as a state-action transition table (e.g., table 702) even though the data may be stored as a unified state transition table (e.g., table 402). In another embodiment, the destination states and conditions are displayed in such a way that the actions may be repeated in the row displaying the actions.

Figure 7B:
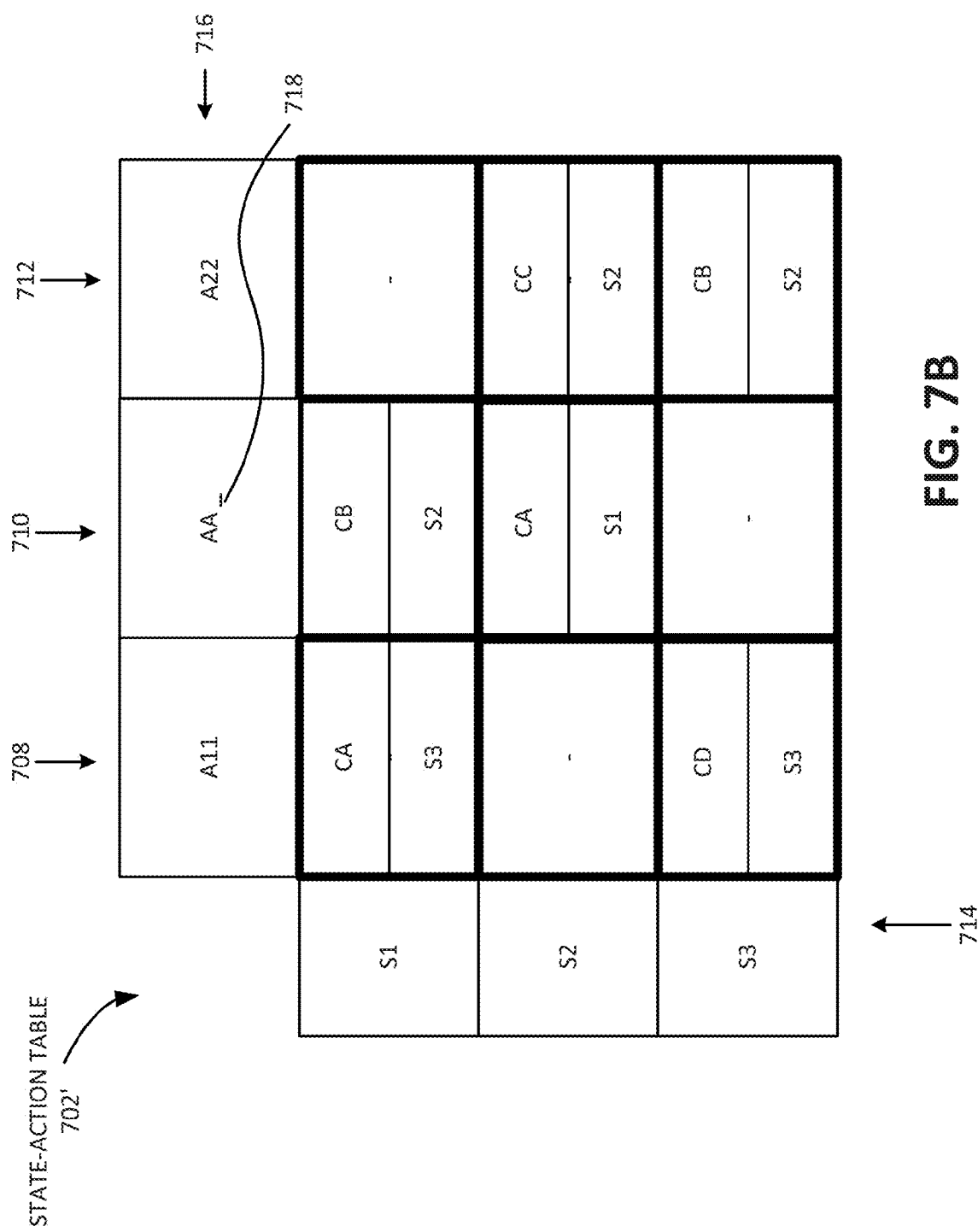
FIG. 7B illustrates editing of the state-action transition table of FIG. 7A.
Figure 7C:
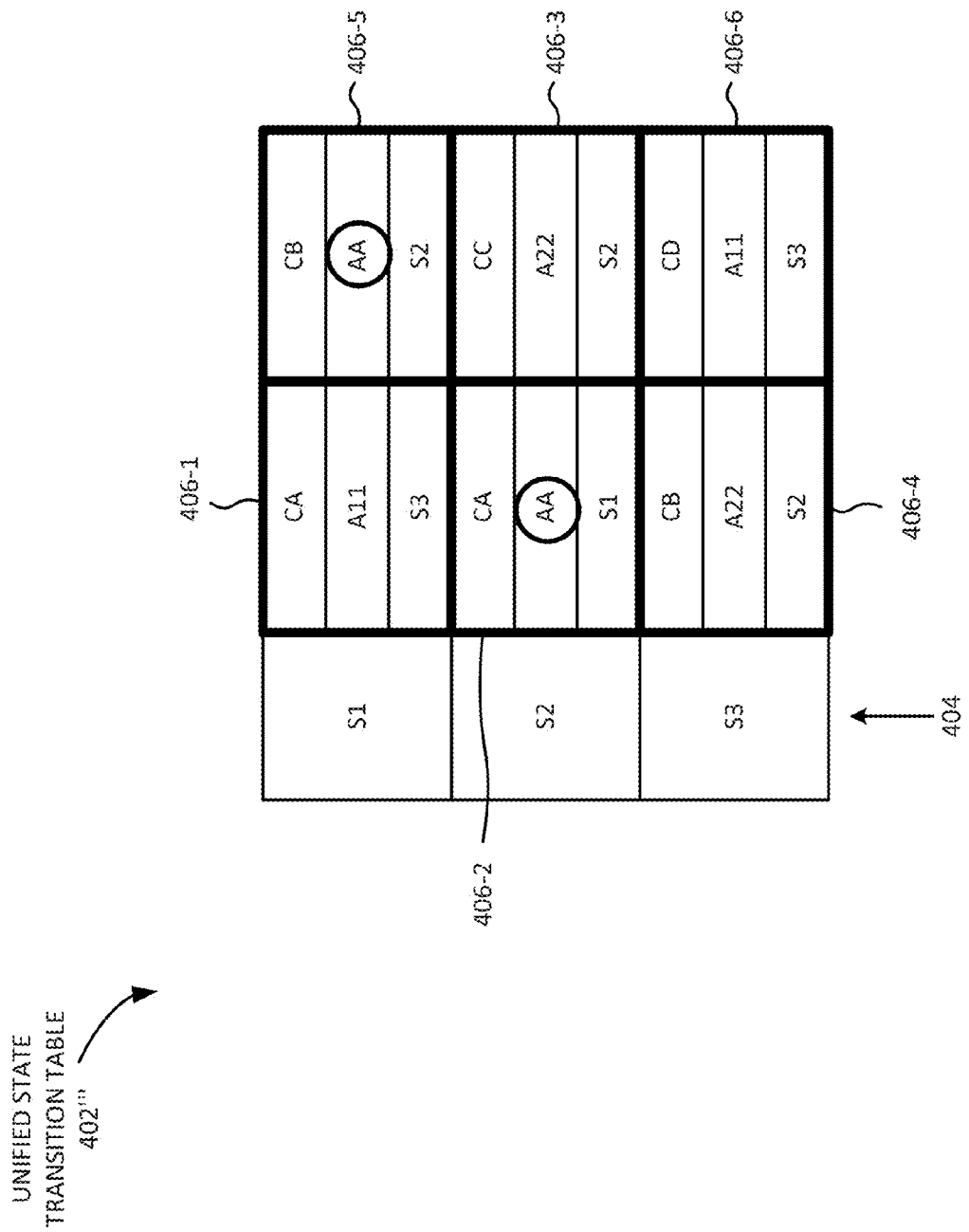
FIG. 7C illustrates the unified state transition table of FIG. 4A following the editing shown in FIG. 7B.

In one embodiment, the user may edit information displayed in table 702. That is, table 702 may be used as a user interface to receive changes, modifications, and updates to the state machine model stored in unified state transition table. Interface logic 330 may receive input from the user to edit one of the actions displayed in row 716, wherein the edited action is associated with two destination state fields and/or two condition fields, each destination field and/or condition field corresponding to a different source state. For example, as shown by a cursor 718 in FIG. 7B, the user may edit the action stored in column 710 of table 702 (e.g., "A12") to be "AA". In this example, the displayed state-action transition table may be as shown in FIG. 7B (i.e., table 702'). When the user completes the edit, the edited action is stored in the appropriate action fields associated with the destinations and/or conditions corresponding to the source states. Thus, the edited unified state transition table 402''' in FIG. 7C shows action "AA" in cells 406-5 and 406-2 (rather than "A12").

Figure 8A:
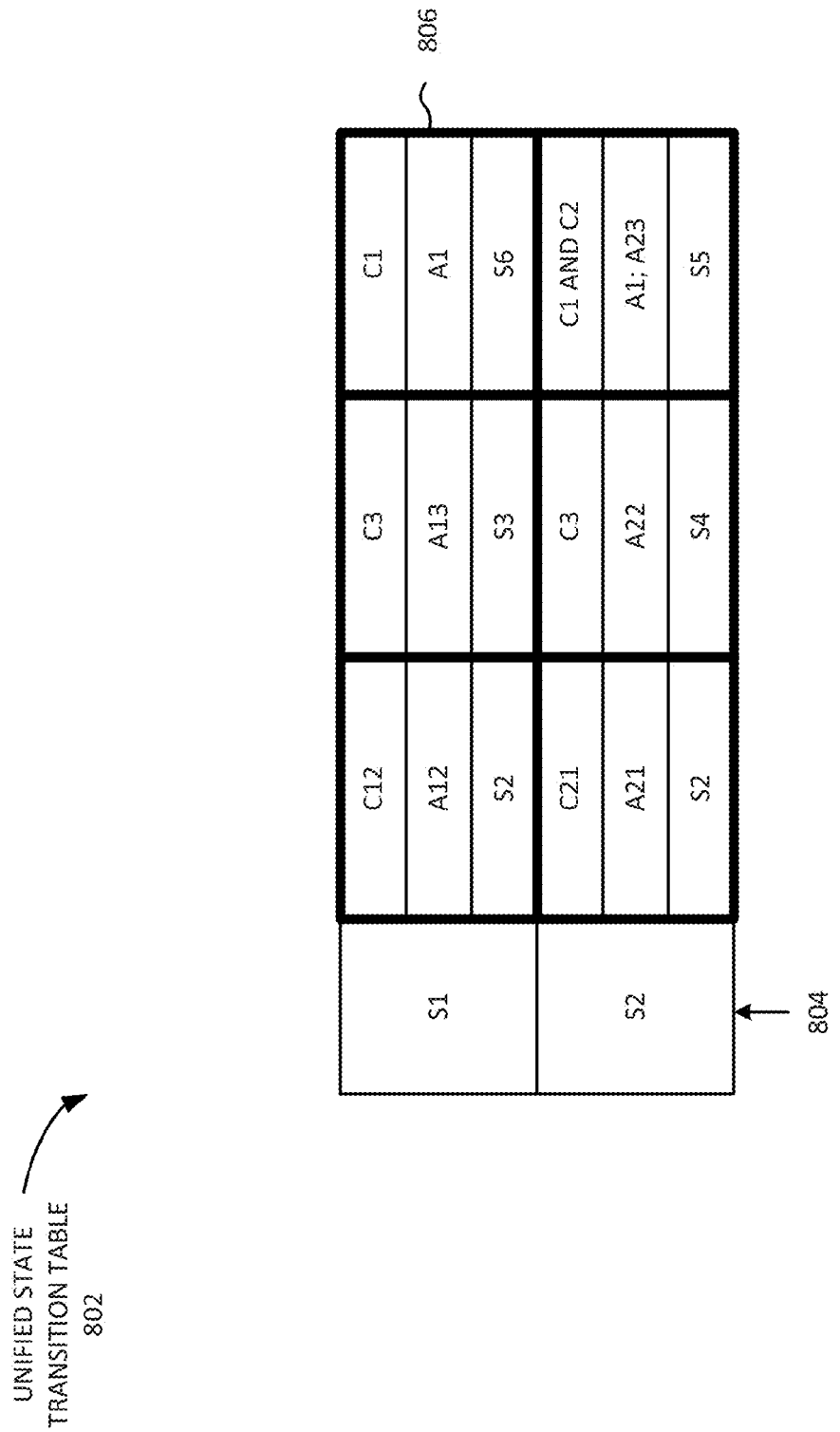
FIG. 8A illustrates a state transition table in another embodiment.

FIG. 8A illustrates a unified state transition table 802 in another embodiment. Like table 402, table 802 includes a vertical column of fields 804 that stores the names of the source states of the state machine model. For one or more source state fields, table 802 may also include one or more cells 806. Cell 806 may include a condition field identifying a condition upon which, when satisfied, the state machine model transitions from the corresponding source state to a destination state; a destination field identifying the destination state for the state machine model to transition to when the corresponding condition is satisfied; and an action field identifying an action to be taken by the state machine model when the corresponding condition is satisfied.

Figure 8B:
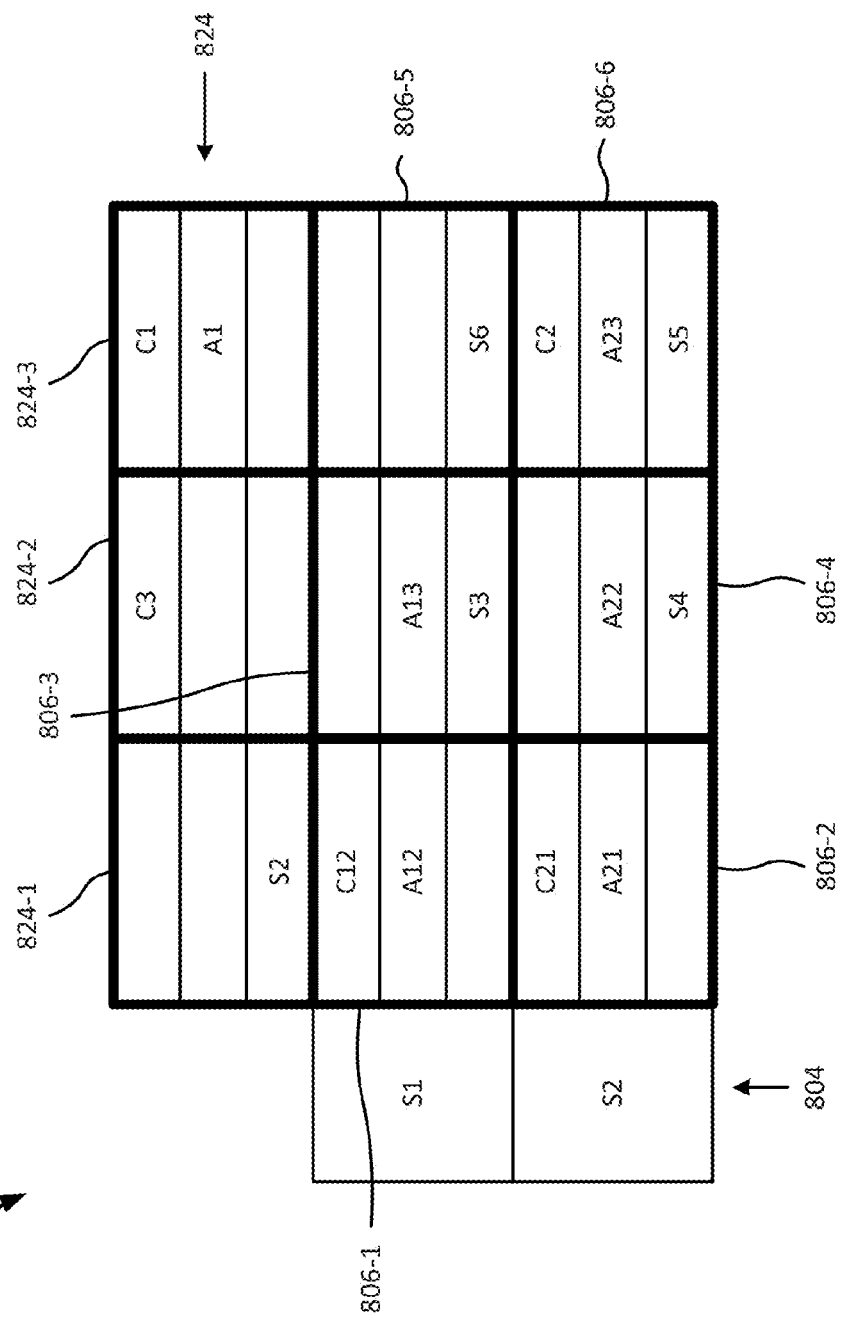
FIG. 8B illustrates a hybrid transition table displaying the information stored in the unified state transition table of FIG. 8A.

FIG. 8B illustrates another way of displaying the information stored in unified state transition table 802 in a hybrid transition table 822. Table 822 includes a row of cells 824 along the top of table 822. The cells in row of cells 824 may act as a template for fields stored in the cells that are in the columns beneath the cells. In the case of table 822, the top field in cell 806 specifies a condition, the middle field specifies an action, and the bottom field specifies a destination state. The fields in each of the cells in row 824 specify the commonalities of the fields below in the column. For example, cell 806-1 and cell 806-2 both specify a destination state S2 because state S2 is specified in cell 824-1. As a further example, cells 806-3 and 806-4 specify the condition C3 because condition C3 is specified in cell 824-2. As yet another example, cells 806-5 and 806-6 specify condition C1 and action A1 because cell 824-3 specifies condition C1 and action A1. In the case of cell 806-6, the resulting condition for the cell is (C1 and C2) and the resulting action is (A1 and A23). In other words, the cells in each row in the interior of table 822 may be arranged in any way and the common elements of any column may be displayed along the top of table 822 in row 824. The cells in row 824 have the same fields as cells 806.

Figure 8C:
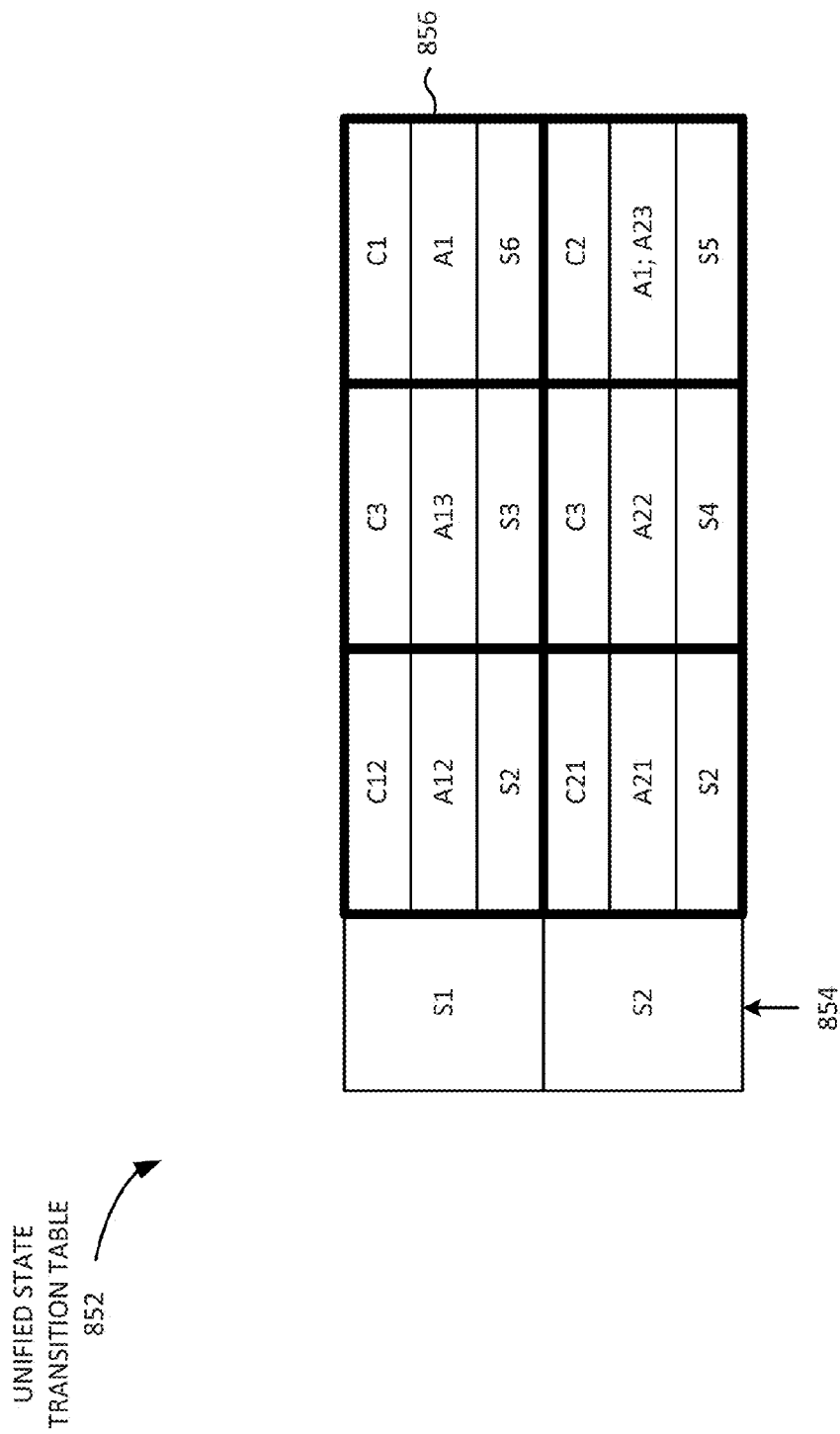
FIG. 8C illustrates a state transition table in another embodiment.

FIG. 8C illustrates a unified state transition table 852 in another embodiment. Like table 402, table 852 includes a vertical column of fields 854 that stores the names of the source states of the state machine model. For one or more source state fields, table 852 may also include one or more cells 856. Cell 856 may include a condition field identifying a condition upon which, when satisfied, the state machine model transitions from the corresponding source state to a destination state; a destination field identifying the destination state for the state machine model to transition to when the corresponding condition is satisfied; and an action field identifying an action to be taken by the state machine model when the corresponding condition is satisfied.

Figure 8D:
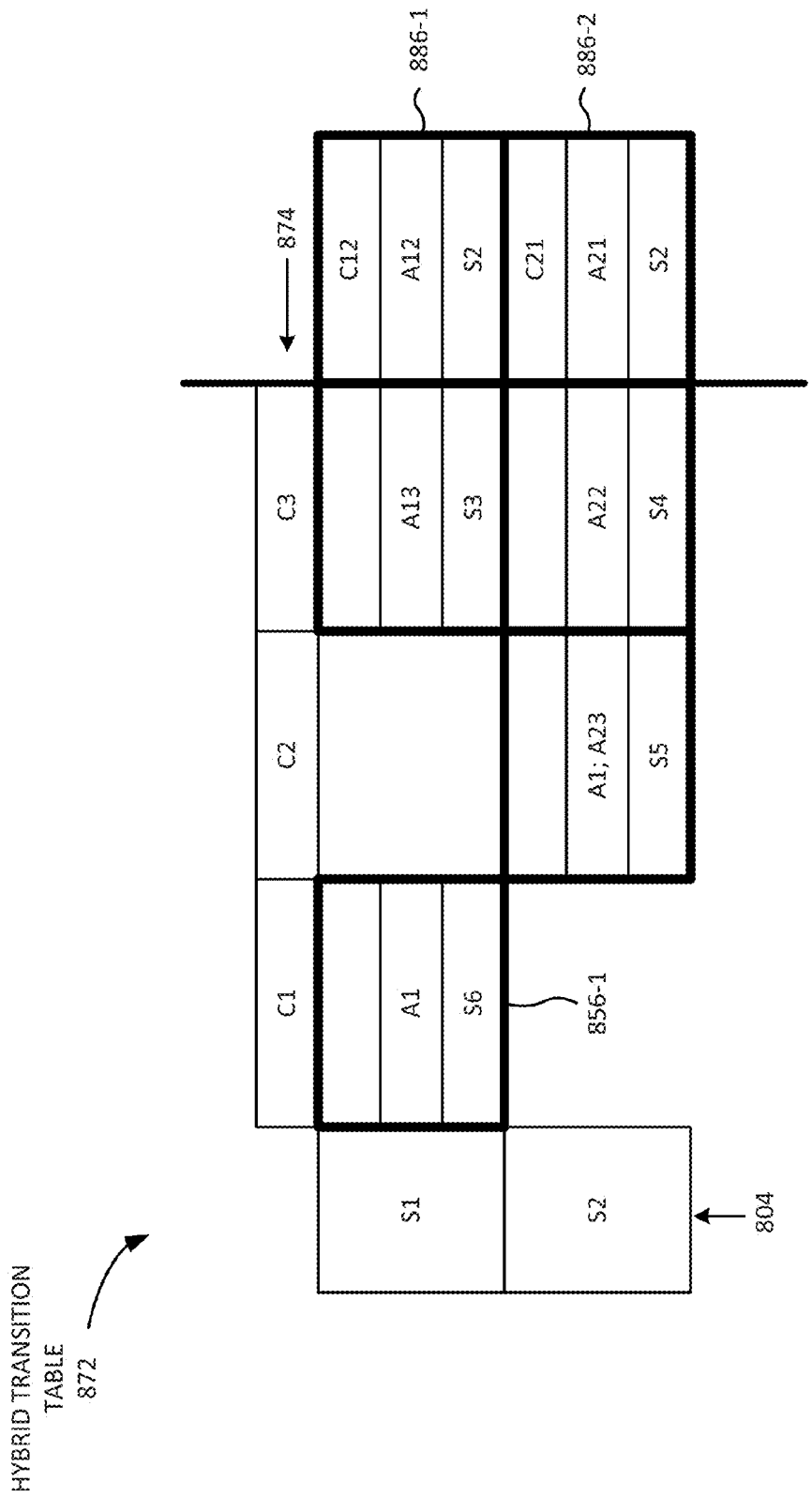
FIG. 8D illustrates a hybrid transition table displaying the information stored in the unified state transition table of FIG. 8C.

FIG. 8D illustrates another way of displaying the information stored in state transition table 852 in a hybrid transition table 872. Table 872 includes a row of condition fields 874 along the top of table 872. Cells in row 874 display condition fields. Condition fields in row 874 specify the common conditions of the fields below in the same column. For example, cell 856-1 specifies a condition C1 because condition C1 is specified in the condition field above it in row 874. Row 874 does not specify all the conditions in table 852, however. Instead, it only specifies some of the conditions. The conditions displayed in row 874 may be selected automatically or by the user. In the situation where the cells are selected automatically (e.g., by interface logic 330), the selection may be based on the number of cells 806 in table 852 (see FIG. 8C) that specify the common condition. That is, the more cells 806 in table 852 (see FIG. 8C)\ that specify the condition, the more likely it is to appear in row 874. For conditions that are not specified in row 874, those conditions may be specified in cells 886. For example, in one embodiment, cells 806 in table 852 (see FIG. 8C) that do not have a common property with any other cell may be listed with cells 886.

FIG. 8D displays conditions as the common property. In other embodiments, the common property may be destination states or actions, for example (or any combination of condition, action, and destination state).

Figure 9A:
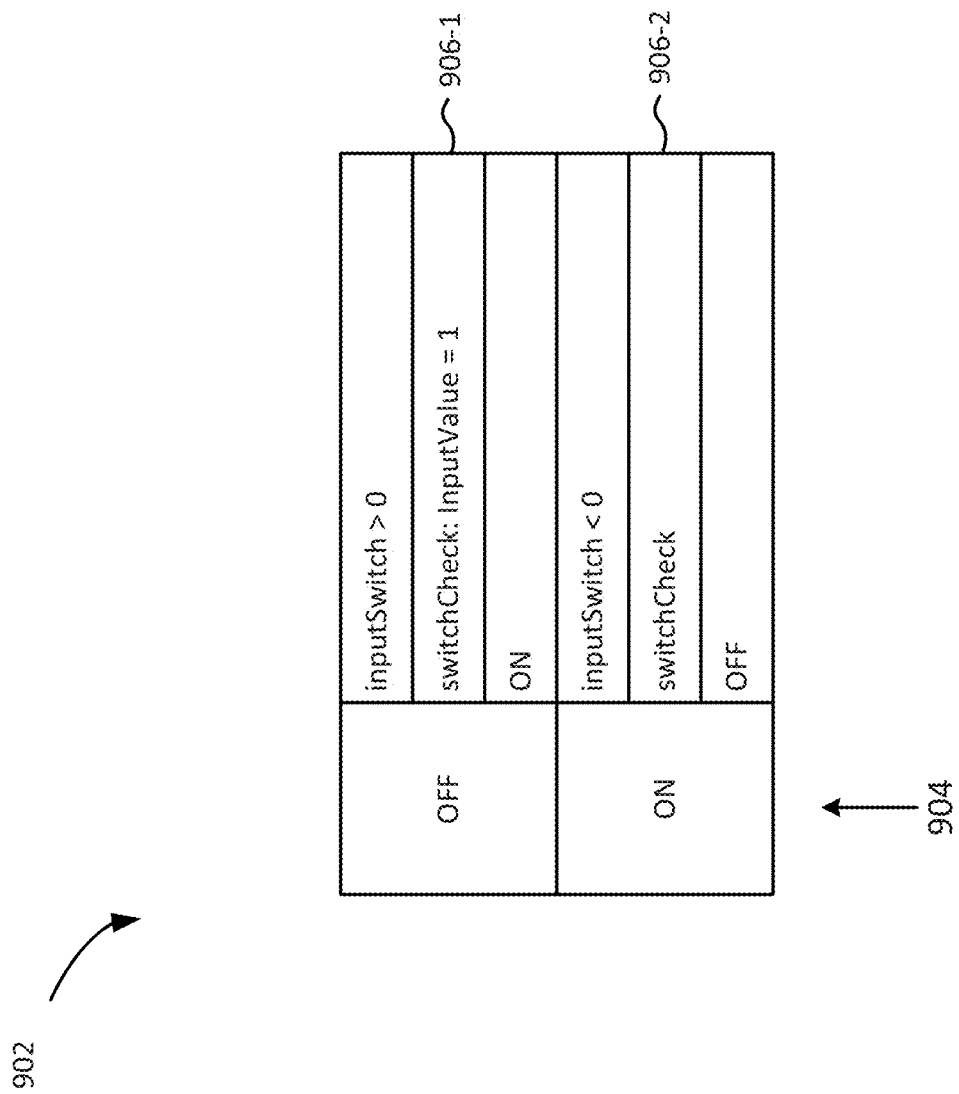
FIG. 9A illustrates a state transition table including a label for an action.

FIG. 9A illustrates a data structure, including labels for actions, for storing a state machine model. Table 902 is structured in a manner similar to unified state transition table 402 described above. Table 902 includes a vertical column of fields 904 (e.g., along the left side of table 902) that stores the source states (ON and OFF) of the state machine model. For each source state field, table 902 may also include one or more cells 906. Cell 906 may include a condition field identifying a condition upon which, when satisfied, the state machine model transitions from the corresponding source state to a destination state; a destination field identifying the destination state for the state machine model to transition to when the corresponding condition (e.g., in the same cell) is satisfied; and an action field identifying an action to be taken by the state machine model when the corresponding condition (e.g., in the same cell) is satisfied and the state machine model transitions to the corresponding destination state (e.g., in the same cell).

Cell 906-1 also includes a label for the identified action. For example, as described in table 902, cell 906-1 identifies (for the source state OFF) the condition "inputSwitch>0", the destination state of ON, and an action of "InputValue=1." Thus, when the state machine model is in source state OFF, and the condition "inputSwitch>0" is satisfied, then the state machine model may transition to the ON state, and the action "InputValue=1" may be taken. Cell 906-1 also associates a label "switchCheck" to the action "InputValue=1".

The syntax used in FIG. 9A is "label:action" for illustrative purposes; however, other syntaxes may be used. The definition of the label in cell 906-1 allows the label to be used for the action identified in the action field of cell 906-2 (e.g., as a shorthand identification of the action expression). That is, the action identified in the action field in cell 906-2 is "switchCheck," which is identified by reference to the label identified in the action field of cell 906-1. Thus, the action identified by the action field in cell 906-2 is identical to the action identified by the action field in cell 906-1. As described above, in one embodiment, the action specified in one cell (e.g., cell 906-2) may reference another cell (e.g., cell 906-1) (e.g., specifying $1$2 in cell 456-2 in the destination field).

Figure 9B:
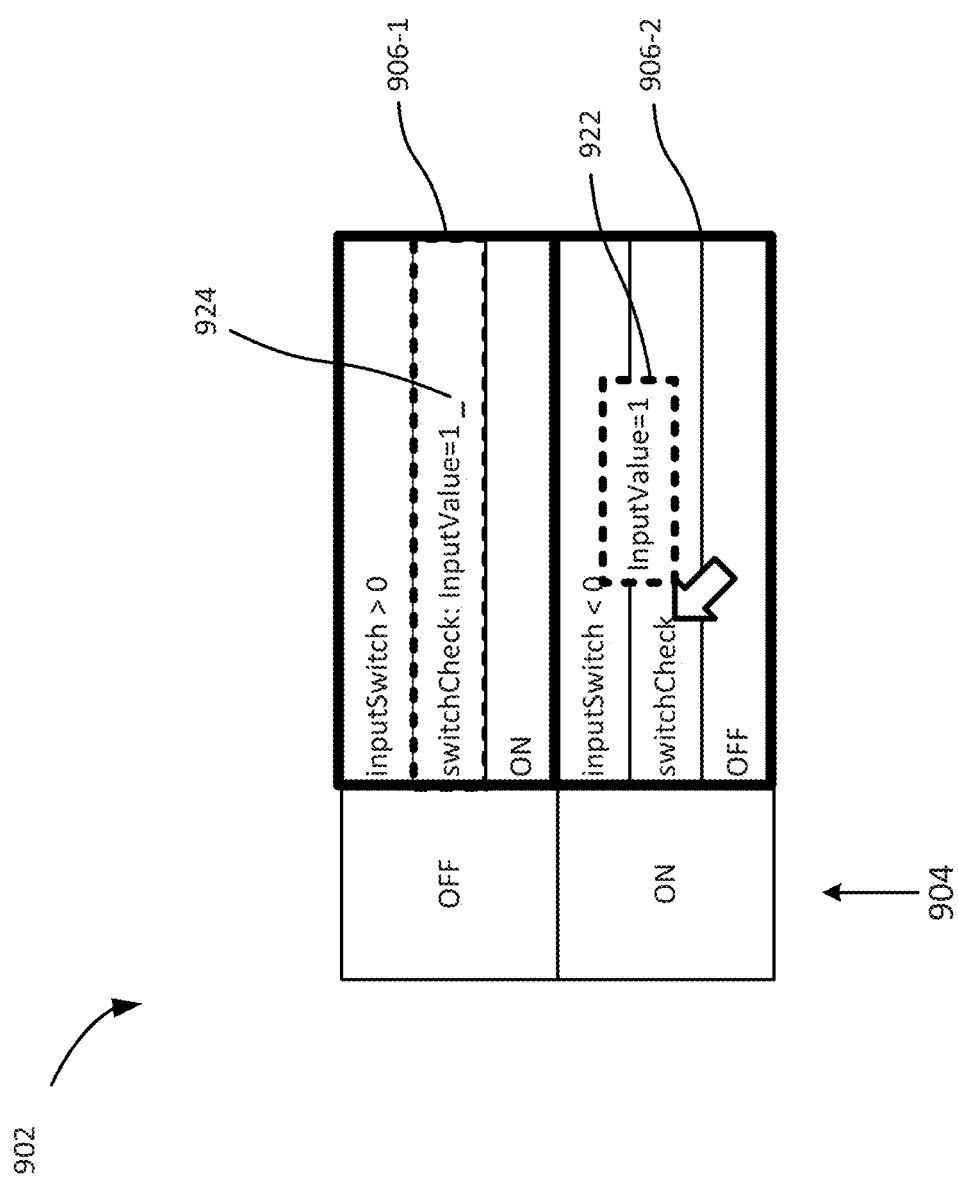
FIG. 9B illustrates the state transition table of FIG. 9A showing editing and a pop-up box with the label expression.

FIG. 9B illustrates a method of displaying the information stored in unified state transition table 902, including labels. As shown in FIG. 9B, the fields stored in table 902 are displayed on a display. The label "switchCheck" and the associated action "InputValue=1" are displayed in the action field of cell 906-1. Further, a cursor (e.g., an arrow) hovers over the action field displaying the label "switchCheck" in cell 906-2. In one embodiment, the label "switchCheck" is displayed in the action field of cell 906-2 without displaying the action. Rather, in this embodiment, the user understands that the action is defined elsewhere (e.g., in cell 906-2). In other embodiments, the associated action expression may also be shown next to the label in cell 906-2. Because cell 906-2 refers to a label only, in one embodiment, hovering the cursor proximate to (e.g., over) the action label causes the generation of a pop-up box 922 that displays the action associated with the label. The display of pop-up box 922 is particularly helpful when, for example, the action field that associates the label and the action are not displayed on the display at the same time.

In one embodiment, interface logic 330 may allow the user to select (e.g., "click" on) the action label displayed in cell 906-2 shown in FIG. 9B. For example, after hovering the cursor arrow over the action label in cell 906-2 by moving a mouse, the user may press a button on the mouse as a "click." In this case, the focus of display may move to the action field in cell 906-1 where the action expression is associated with the label. The focus in FIG. 9B is shown as a bold box around the displayed action field in cell 906-1. In this example, the user may edit the action expression, or the name of the label, for example. As shown in FIG. 9B, interface logic 330 may display another cursor 924 in the field displaying the action label and action expression (e.g., call 906-1) allowing the user to type (e.g., with a keyboard) to edit the action expression.

Interface logic 330 may receive the edited action expression and store the edited action expression in the appropriate field in table 902. Thus, in this embodiment, the user may edit an action expression once and the edited expression is associated with each occurrence of the action label stored in other action fields in other cells (e.g., the action field in cell 906-2). Simulation tool 310 may store the edited expression in table 902 in the action field of cell 906-1. In one embodiment, interface logic 330 allows the user to edit the action expression in any action field displaying the action label. In another embodiment, interface logic 330 allows the user to edit the action expression in a location separate from the displayed action field (e.g., a table that associates action labels with action expressions).

Figure 9C:
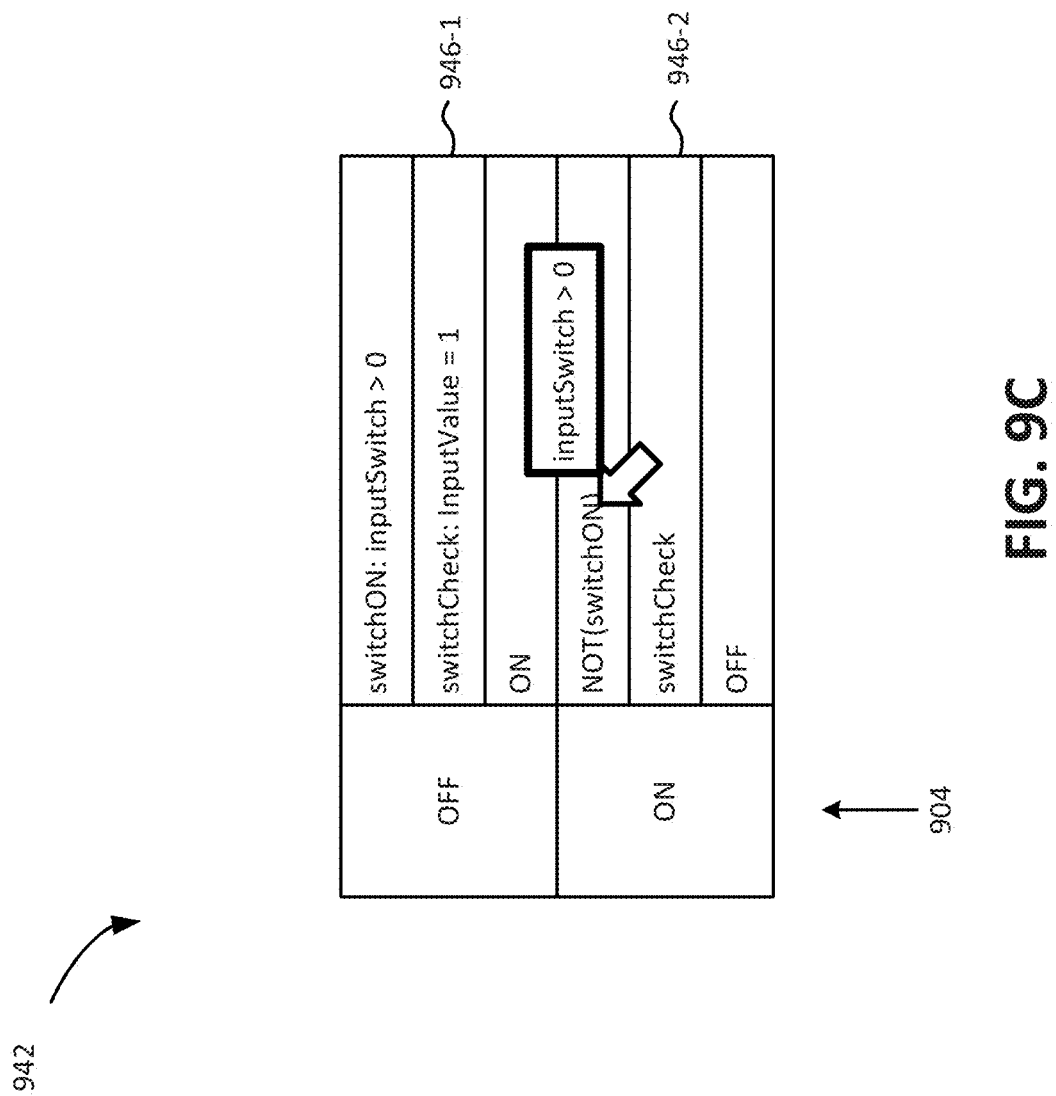
FIG. 9C illustrates a state transition table including a label for a condition.
Figure 9D:
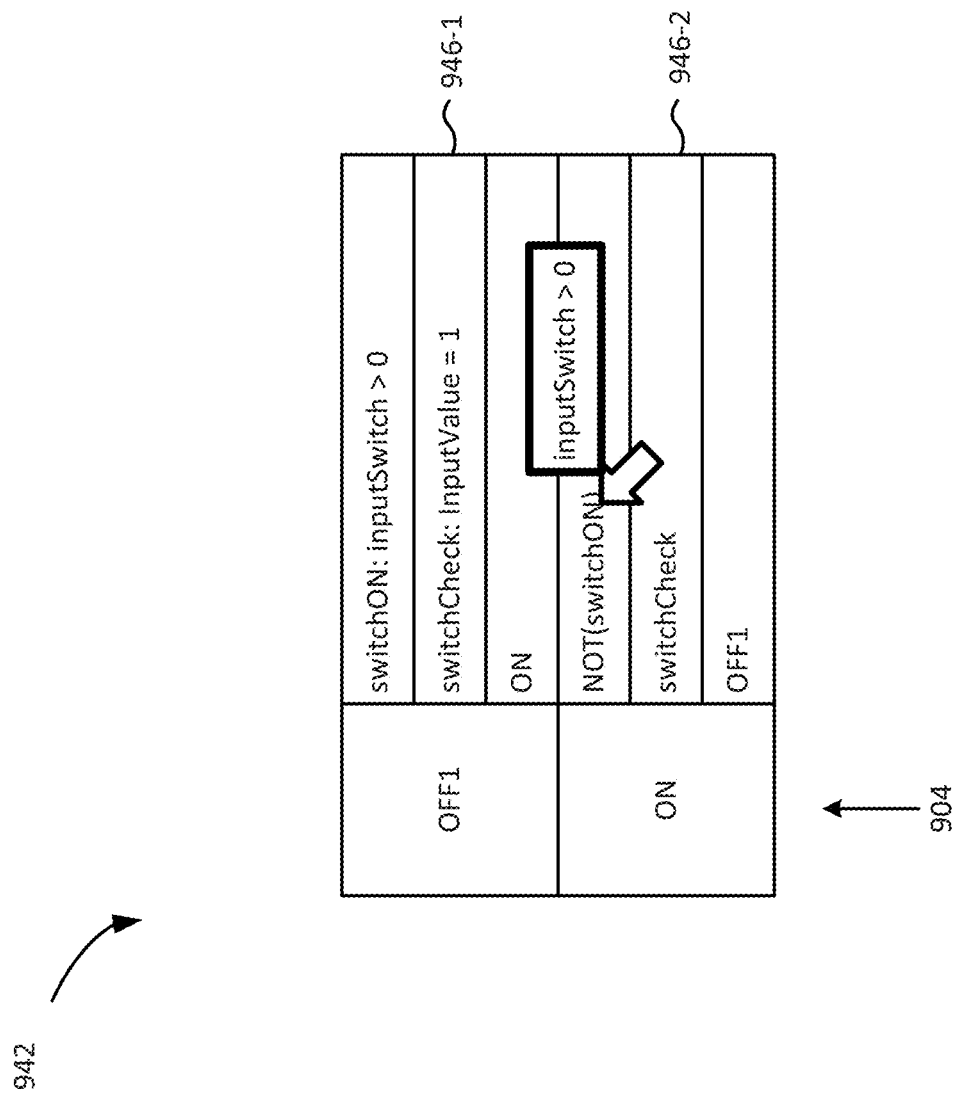
FIG. 9D illustrates the state transition table of FIG. 9C being displayed.

Labels may be used for fields other than action fields. For example, a label may be associated with a condition. FIG. 9C illustrates a data structure, including labels for conditions, for storing a state machine model. FIG. 9C shows a unified state transition table 942 that is similar to table 902. Cell 946-1 in table 942 includes a label "switchON" for the condition in the condition field. The label "switchON" is associated with the condition expression "inputSwitch>0". The label for the condition is also used in the condition field of cell 946-2, i.e., "NOT(switchON)". FIG. 9D illustrates table 942 being displayed on a display. As shown, a cursor (e.g., an arrow) hovers over the label "switchON" in the condition field of cell 946-2. In this case, interface logic 330 may have received commands from a user (e.g., using a mouse) to move the cursor over the label "switchON". In response, interface logic 330 may display the condition expression associated with the label (e.g., "inputSwitch>0"). In one embodiment, the user may press a button on the mouse (e.g., "click" the condition label) to change the focus to the condition field that associates the condition expression with the condition label (e.g., in cell 946-1).

As described above with respect to the action label, interface logic 330 may present the user with another cursor for editing the condition expression and/or the condition label. Interface logic 330 may receive the edited condition expression and store the edited condition expression in the appropriate field in table 942. Thus, in this embodiment, the user may edit a condition expression once and the edited condition expression is then associated with each occurrence of the action label stored in other action fields in other cells (e.g., the action field in cell 946-2). Interface logic 330 may store the edited expression in table 942 in the action field of cell 946-1. In one embodiment, interface logic 330 allows the user to edit the condition expression in any condition field displaying the action label. In another embodiment, interface logic 330 allows the user to edit the condition expression in a location separate from the displayed condition field (e.g., a table that associates condition labels with condition expressions).

In one embodiment, interface logic 330 may allow the user to change the label of a source state. For example, as shown in FIG. 9D, the label "OFF" has been edited to be "OFF1". That is, interface logic 330 received input from the user to edit the state label. In this case, interface logic 330 may also update (e.g., automatically) the references to that state. Thus, the destination state specified in cell 946-2 changes from "OFF" to become "OFF1". If more than one cell 946 includes a reference to the destination state labeled "OFF", in one embodiment, all the references in cells 946 may be changed from "OFF" to "OFF1". In another embodiment, the user may be warned or prompted before changing all the references in cells from "OFF" to "OFF1". In yet another embodiment, if more than one cell 946 includes a reference to the destination state labeled "OFF", the user may select which occurrences of the label "OFF" to change from "OFF" to "OFF1".

Figure 10:
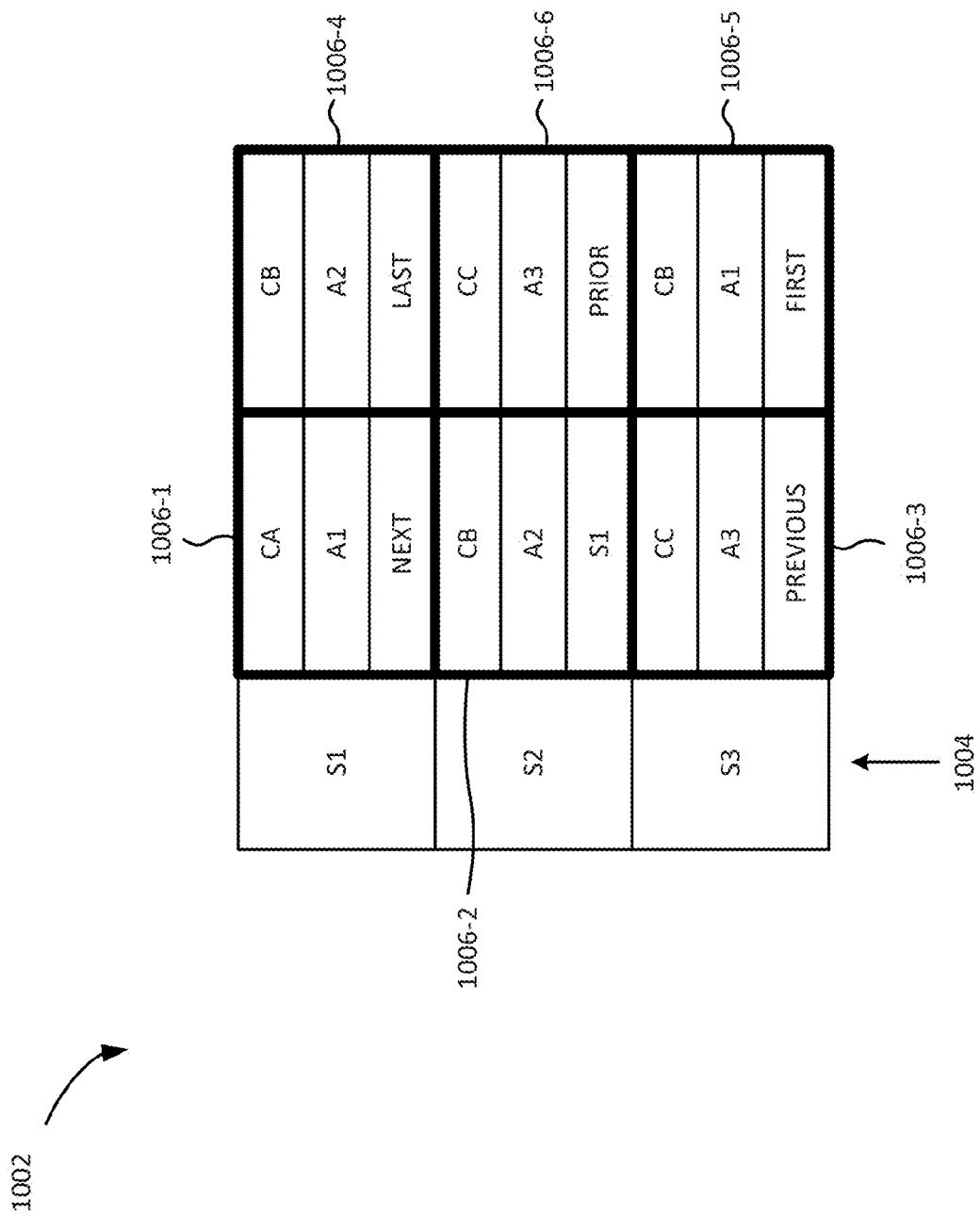
FIG. 10 illustrates a state transition table identifying destination states by relative positional and temporal cues.

FIG. 10 illustrates an exemplary data structure 1002 (e.g., a unified state transition table 1002) describing a state machine model in one embodiment. Table 1002 includes a vertical column of fields 1004 that stores the source states of the state machine model. For each source state field, table 1002 may also include one or more cells 1006. Cell 1006 may include a condition field identifying a condition upon which, when satisfied, the state machine model transitions from the corresponding source state to a destination state; a destination field identifying the destination state for the state machine model to transition to when the corresponding condition is satisfied; and an action field identifying an action to be taken by the state machine model when the corresponding condition is satisfied and the state machine model transitions to the corresponding destination state. In one embodiment, unified state transition table 1002 may exclude action fields in cells 1006, for example. FIG. 10 also represents a way in which the data in table 1002 may be displayed. That is, the data in table 1002 may be displayed as shown in FIG. 10.

In one embodiment, a cell 1006 may specify the destination state by specifying the relative position of the row identifying the corresponding source state. As shown in FIG. 10, for example, the destination field in cell 1006-1 is specified as "NEXT". In this case (as identified by cell 1006-1), when the state machine model is in source state S1 and the condition CA is satisfied, the state machine model transitions to the next state, i.e., the state that is identified by the adjacent row (e.g., below or in the downward direction) that occurs next in the data structure (e.g., the row including cell 1006-2). Because FIG. 10 also represents a way in which the data may be displayed, a destination field specifying "NEXT" may also specify the state that is identified by the adjacent row that occurs next on the display (e.g., below or in the downward direction). In one embodiment, the destination field in a cell 1006 may specify "NEXT(X)" (e.g., where X is an integer). In this case, when the state machine model is in the corresponding source state and the corresponding condition is satisfied, the state machine model transitions to the state X rows below the corresponding current source state. For example, "NEXT(3)" may specify three rows down in the data structure.

As another example, the destination field in cell 1006-3 specifies "PREVIOUS". In this case (as identified by cell 1006-3), when the state machine model is in source state S3 and the condition CC is satisfied, the state machine model transitions to the previous state, i.e., the state that is identified by the adjacent row (e.g., above or in the upward direction) that occurs previously in the data structure (e.g., the row including cell 1006-2). Because FIG. 10 also represents a way in which the data may be displayed, a destination field specifying "PREVIOUS" may also specify the state that is identified by the adjacent row that occurs previously on the display (e.g., above or in the upward direction). In one embodiment, the destination field in a cell 1006 may specify "PREVIOUS(Y)" (e.g., where Y is an integer). In this case, when the state machine model is in the corresponding source state and the corresponding condition is satisfied, the state machine model transitions to the state Y rows above the corresponding current source state. For example, "PREVIOUS(3)" may specify three rows above in the data structure.

Being able to specify destination states as "PREVIOUS" or "NEXT" is particularly useful for models of finite state machines with "train like" structure, in which discrete states generally move only to its neighboring state and transitions of far-apart states are the exception rather than the rule.

As yet another example, the destination field in cell 1006-4 specifies "LAST". In this case (as identified by cell 1006-4), when the state machine model is in state S1 and the condition CB is satisfied, the state machine model transitions to the last or end state, i.e., the state that is identified by the last row (e.g., the farthest below in the downward direction) that occurs last in the data structure (e.g., the row including cell 1006-3). Because FIG. 10 also represents a way in which the data may be displayed, a destination field that specifies "LAST" may also specify the state that is the last row as displayed (e.g., the last row if the user scrolls to the bottom of the displayed table).

As yet another example, the destination field in cell 1006-5 specifies "FIRST". In this case (as identified by cell 1006-5), when the state machine model is in state S3 and the condition CB is satisfied, the state machine model transitions to the first or start state, i.e., the state that is identified by the first row (e.g., the farthest above in the upward direction) that occurs first in the data structure (e.g., the row including cell 1006-1). Because FIG. 10 also represents a way in which the data may be displayed, a destination field that specifies "FIRST" may also specify the state that is identified by the first row as displayed (e.g., the first row if the user scrolls to the top of the displayed table).

Being able to specify destination states as "NEXT", "PREVIOUS", "LAST", and "FIRST" also may allow state transition table (e.g., table 1002) to be less susceptible to errors introduce by state name changes or the rearrangement of states. That is, the user may be saved from performing the extra data entry that would be necessary without the positional indicators (e.g., NEXT, PREVIOUS, LAST, or FIRST).

In one embodiment, a state transition table, such as table 1002 may include a destination field that specifies the destination state behaviorally (e.g., the behavior of the state machine model as executed or simulated in time), during execution of the state machine model, relative to a behavioral position of the corresponding source state. For example, cell 1006-6 identifies the destination state as "PRIOR". In this case, during execution of the state machine model, when the state machine model is in state S2 and condition CC is satisfied, the state machine model may transition to the prior state in the state activity behavior. In this embodiment, the state machine model may store the previous state in the state activity behavior, or the previous number of states in the state activity behavior so that the state machine model may return to a previous state during execution.

Figure 11A:
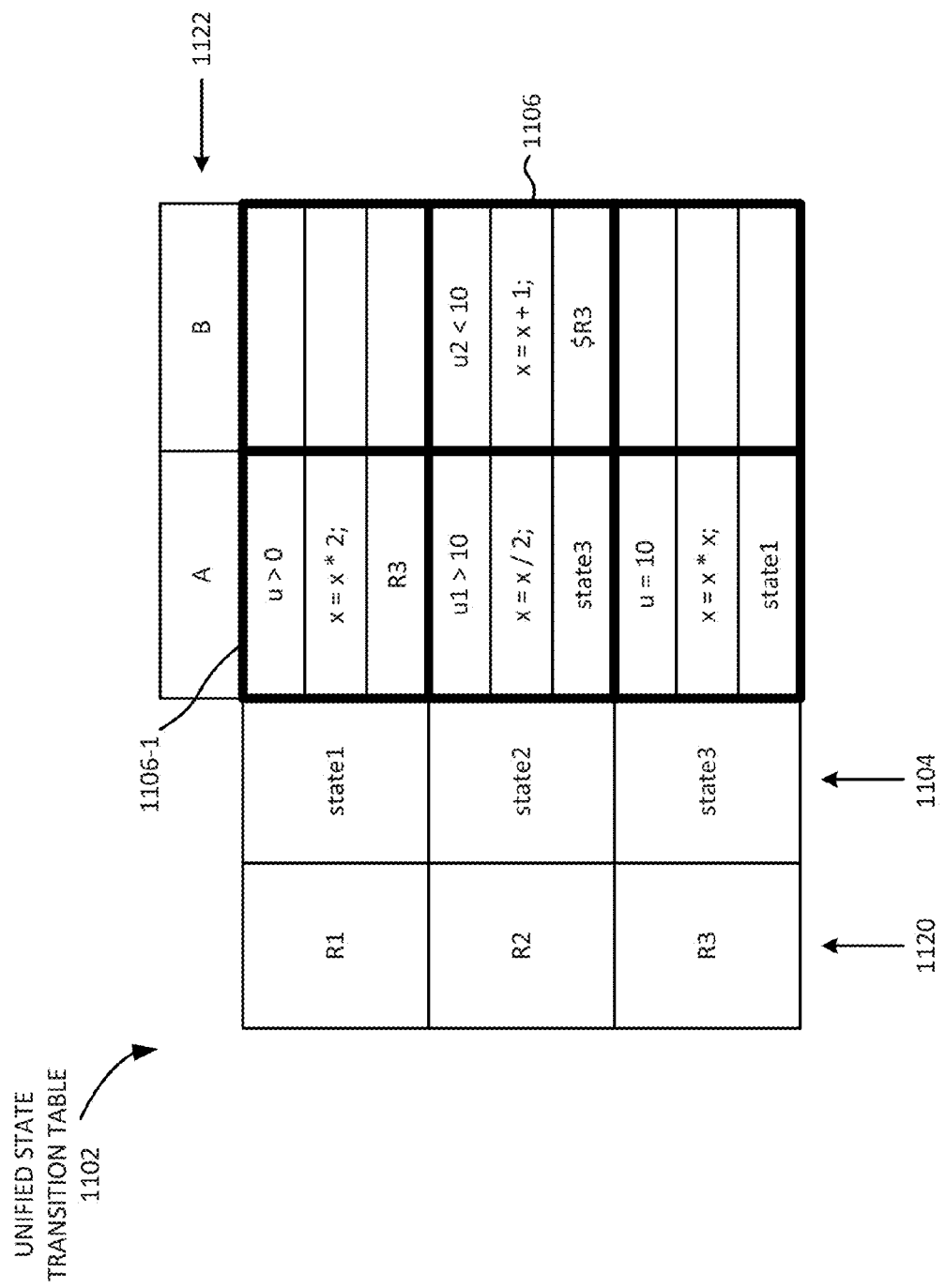
FIG. 11A illustrates a state transition table identifying destination states by relative positional cues and absolute positional cues.

FIG. 11A illustrates the display of a unified state transition table 1102 (e.g., the display of a data structure 1102) in one embodiment. Table 1102 includes a vertical column of fields 1104 that stores the names of source states of the state machine model. For each source state field, table 1102 may also include one or more cells 1106. As with table 402 described above, cell 1106 may include a condition field identifying a condition upon which, when satisfied, the state machine model transitions from the corresponding source state to a destination state; a destination field identifying the destination state for the state machine model to transition to when the corresponding condition is satisfied; and an action field identifying an action to be taken by the state machine model when the corresponding condition is satisfied. In one embodiment, unified state transition table 1102 may exclude action fields in cells 1106, for example.

The display of table 1102 includes a column 1120 of row indexes (e.g., R1-R3). Each row of table 1102 is associated with a different row index and the row index may start with 1 and increment by one with every row. For example, if there were 10 rows instead of three, then the row indexes may start at R1 and continue to R10. Other row indexes may be used, such as S1 through Sx, where x is the number of rows.

The display of table 1102 includes a row 1122 of column indexes (A-B). Each column of table 1102 is associated with a different column index and the column index may start with A while incrementing the alphabetic index by one with every column. For example, if there were 10 columns instead of two, then the column indexes may start with A and continue to J (the 10th letter). Other column indexes may be used, such as C1 through Cy, where y is the number of columns.

As shown in FIG. 11A, cell 1106-1, a destination may be specified by reference to the row index (e.g., "R3") rather than or in addition to the name of the destination state (e.g., "state 3"). In this embodiment, the row index specifies an address in the data structure of table 1102. In one embodiment, the destination state may be identified by an absolute position of the cell in table 1102 (e.g., by specifying an absolute row index). For example, cell 1106-2 specifies the destination state as "$R3". In this embodiment too, the absolute row index specifies an address in the data structure of table 1102.

Figure 11B:
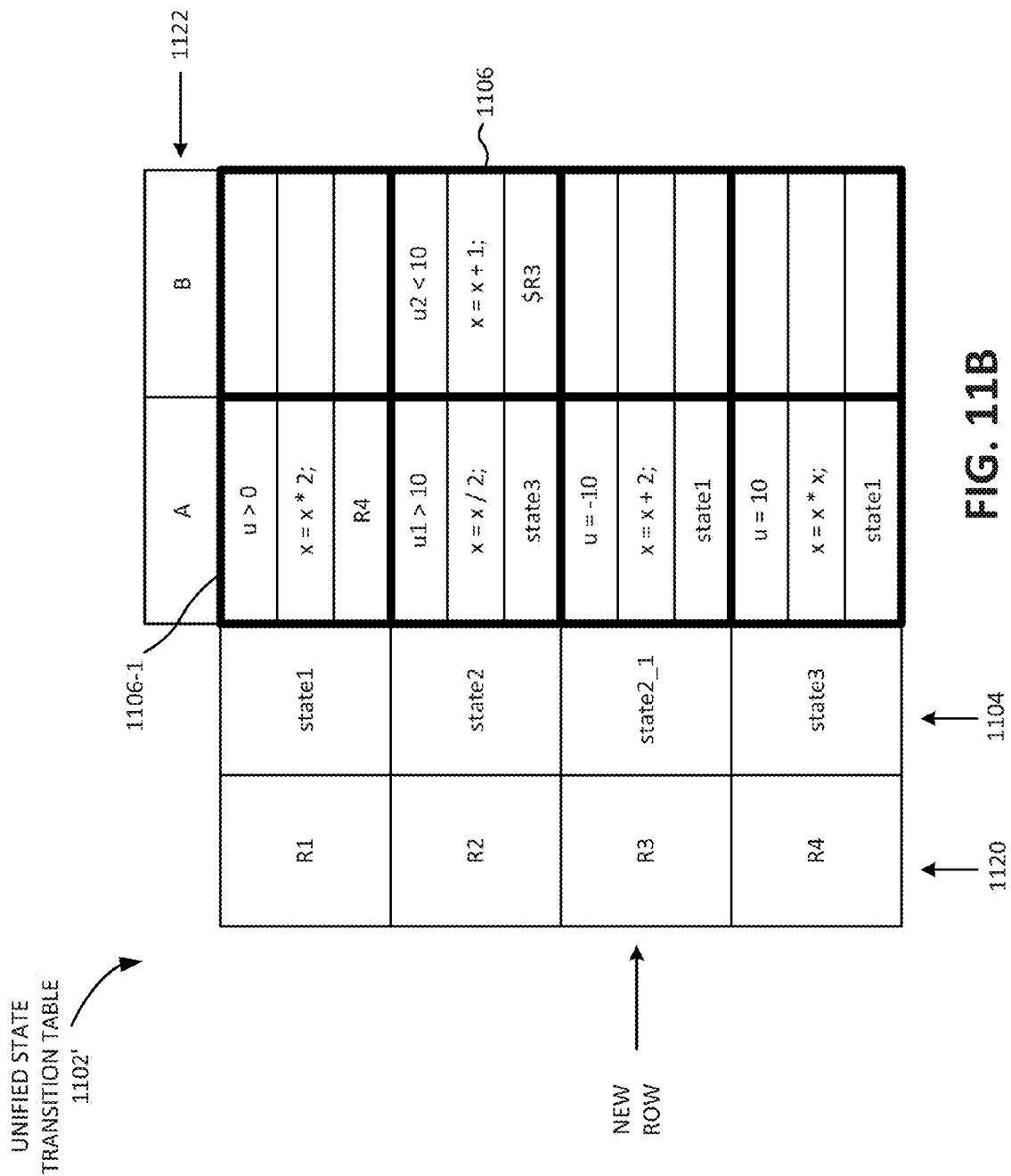
FIG. 11B illustrates the state transition table of FIG. 11A after editing.

The difference between an absolute row index and a non-absolute row index is that an absolute row index may not be updated automatically when rows are inserted or deleted from the table 1102. On the other hand, non-absolute row indexes may automatically be updated when rows are inserted or deleted from table 1102. For example, FIG. 11B illustrates table 1102' (which is table 1102 with edited information). Interface logic 330 may receive input from the user to input a state between the destination state named "state2" (associated with row index R2 in FIG. 11A) and the destination state named "state3" (associated with row index R3 in FIG. 11A). In this case, a new source state is added with the name "state2_1". The row index for the new state is R3, as state2_1 is the third row in table 1102'. The source state with the name "state3" (in FIG. 11B) becomes associated with the row index of R4, as it becomes the fourth row in table 1102'. Because of the change of row index associated with the state named state3, the destination state identified in cell 1106-1 is updated to be "R4" rather than "R3." The destination state identified in cell 1106-2, however, is not updated and remains $R3, wherein the "$" indicates that the row index should not be updated. Indicators other than "$" may be used to indicate an absolute address in table 1102.

In one embodiment, the row indexes (and column indexes) may not be stored in data structure 1102 (table 1102) itself. For example, a reference to $R3 may describe the third row without table 1102 storing a label "R3" in table 1102. Likewise, a reference to column "A" may describe the first column (other than column 1120) without table 1102 storing a label "A".

Figure 12A:
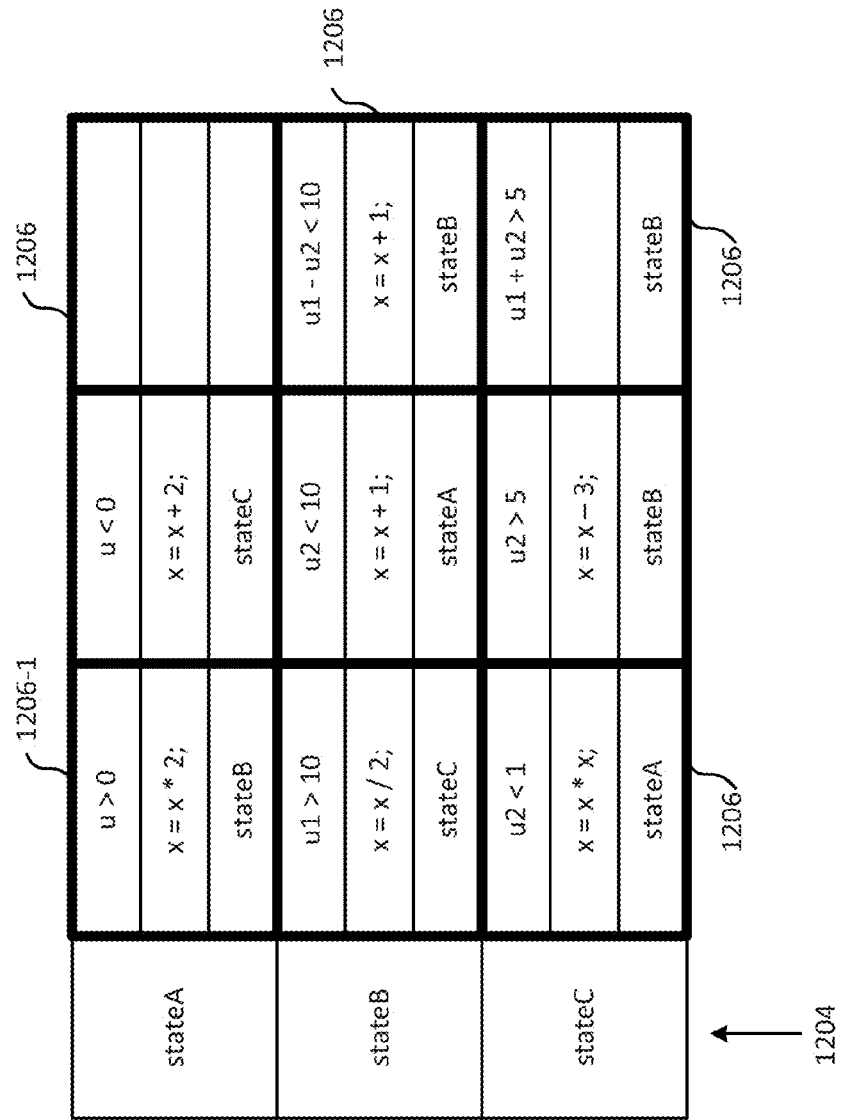
FIG. 12A illustrates a state transition table that highlights never-executed or never-satisfied conditions.

FIG. 12A illustrates the display of another unified state transition table 1202 in one embodiment. As described in more detail below, table 1202 may be displayed in such a way as to convey to the user the portions of the described state machine model that are not executed during execution of the model, for example. Like table 402, table 1202 includes a vertical column of fields 1204 that stores the source states of the state machine model. For each source state field, table 1202 may also include one or more cells 1206. Cell 1206 may include a condition field identifying a condition upon which, when satisfied, the state machine model transitions from the corresponding source state to a destination state; a destination field identifying the destination state for the state machine model to transition to when the corresponding condition is satisfied; and an action field identifying an action to be taken by the state machine model when the corresponding condition is satisfied.

Simulation engine 370 may execute the state machine model described by table 1202. In one embodiment, as described above, the information in table 1202 may be converted into executable code. During the execution of the code, simulation engine 370 may simulate different input variables, for example, so as to simulate every possible state or outcome of the state machine model described by table 1202. Further, during the execution of the code, simulation engine 370 may determine what portions of the code (e.g., what conditions) are not executed or never satisfied. These results may be displayed to the user in numerous different ways. For example, if a condition identified by cell 1206-1 is never satisfied and/or action never executed, then this may be highlighted as shown in FIG. 12A. In other words, the display of table 1202 may show the "coverage" of the execution of the model. The display of coverage may help the user debug the state machine model described by table 1202. Although FIG. 12A illustrates a unified state transition table, the coverage may be displayed in other tabular formats, such as with a state-state transition table (e.g., as shown in FIG. 1A) or a state-condition transition table (e.g., as shown in FIG. 1B). Thus, the condition fields identifying never executed actions or never-satisfied conditions may be displayed as shown in FIG. 12A.

Figure 12B:
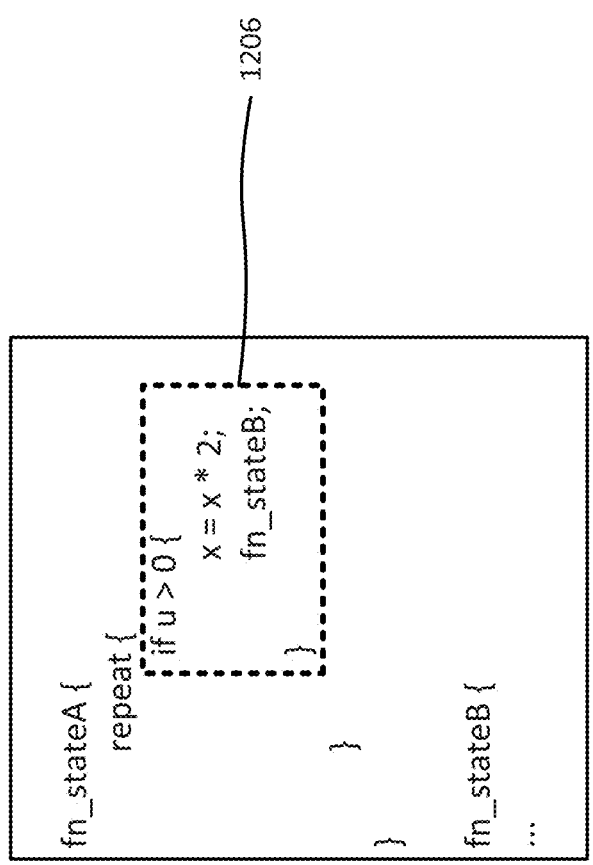
FIG. 12B illustrate a state transition table that highlights never-executed code.
Figure 12C:
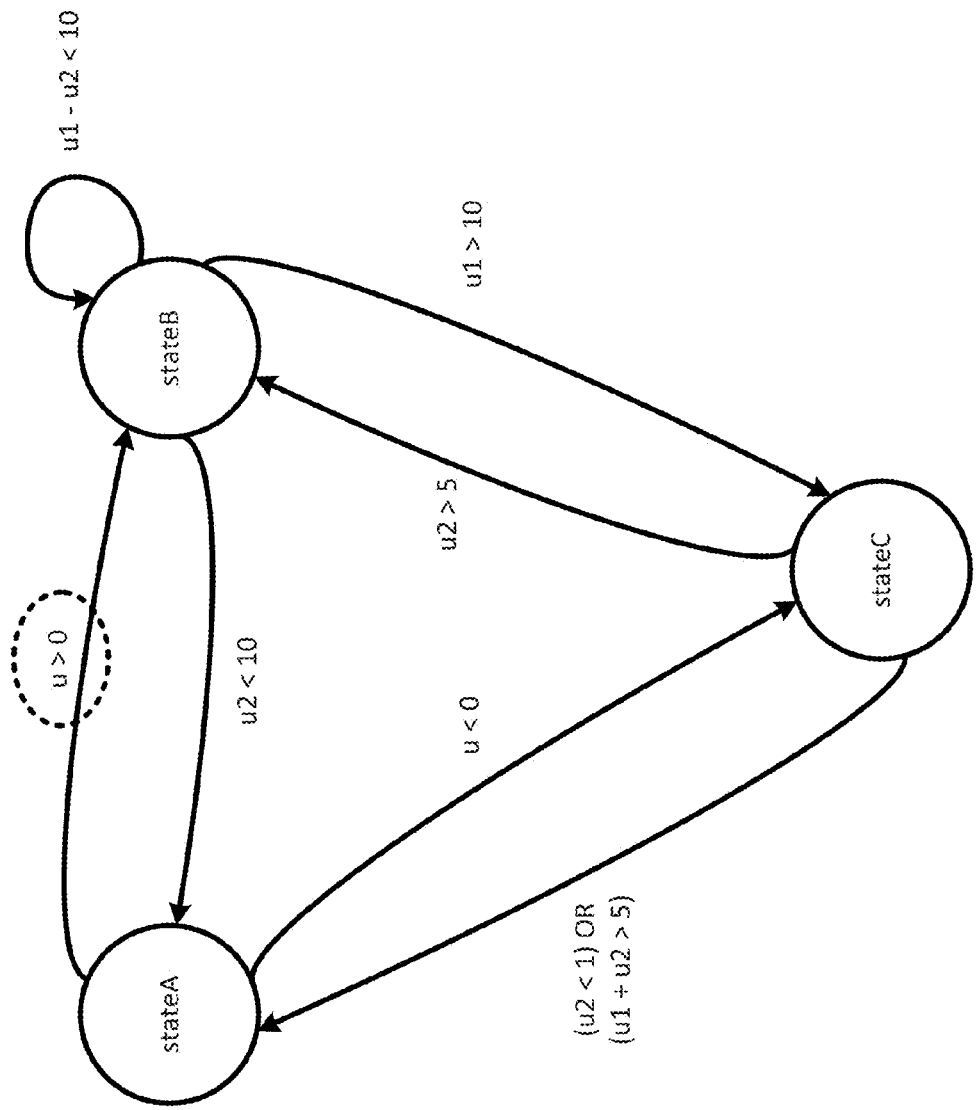
FIG. 12C illustrates a state diagram that highlights never executed or never satisfied conditions.

Further, as shown in FIG. 12B, coverage may be displayed in the computer code generated by code generator 390. FIG. 12B identifies (e.g., highlights]) never executed code (e.g., identifying conditions) or a condition that is never satisfied. Further, as shown in FIG. 12C, coverage may be displayed in a state diagram generated from the information stored in table 1202. FIG. 12C highlights never executed code or conditions that were never satisfied in the state machine model. The coverage may be displayed for any code (e.g., code entered directly by a user rather than generated by code generator 390).

In FIGS. 12A, 12B, and 12C, the never-executed code or conditions that were never satisfied may be identified using a technique, such as highlighting. Highlighting may include highlighting the condition with a predetermined graphical shape or color (e.g., red). Alternatively or additionally, rather than highlighting never-executed or never-satisfied conditions, the code that is actually executed and conditions that are satisfied during execution may be highlighted. Again, the code that is executed (e.g., the conditions that are satisfied) may be highlighted with a predetermined graphical shape or color (e.g., green). Information regarding never-executed code or never-satisfied conditions may also be recorded as a report in text format, for example.

Figure 12D:
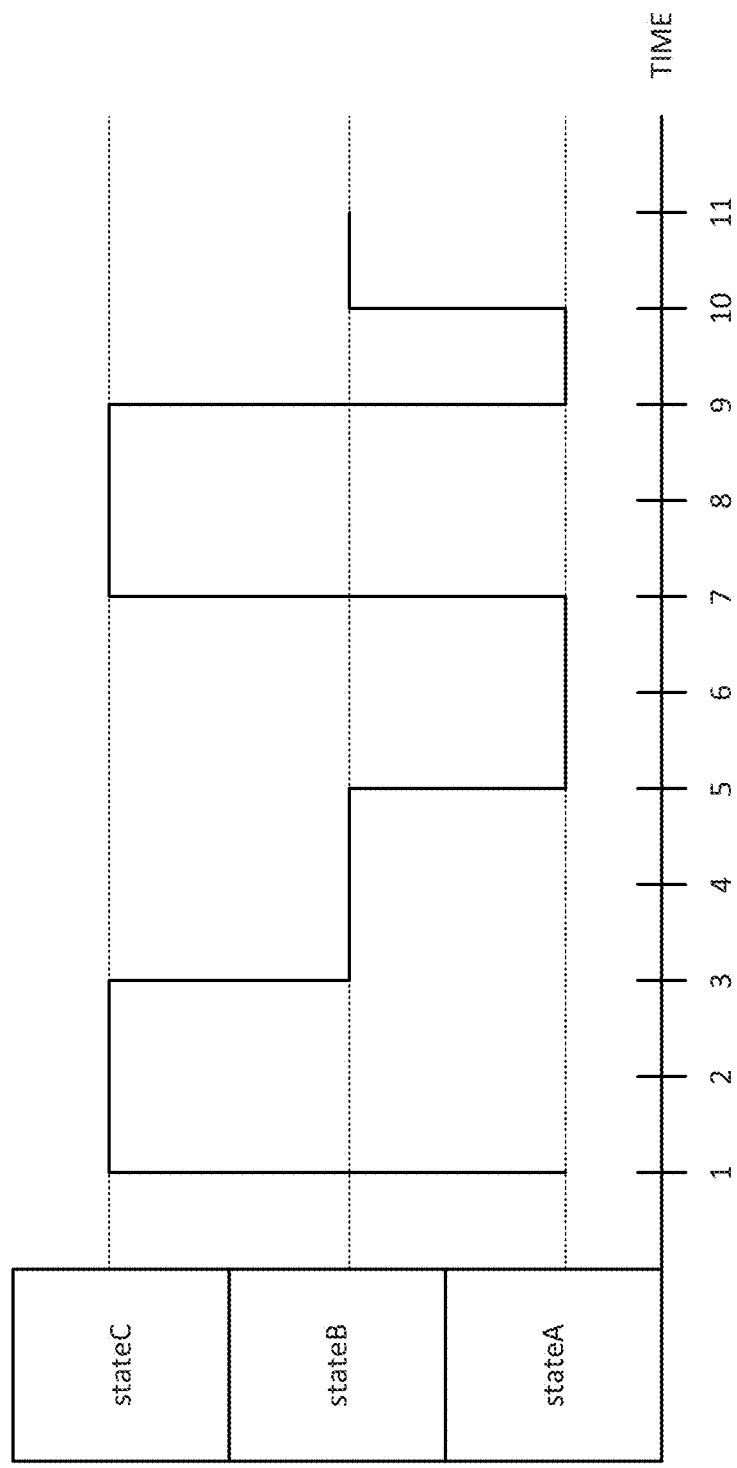
FIG. 12D is a graph depicting the state of a state machine as a function of time during execution of the state machine model.

In another embodiment, action fields identifying never-executed actions may also be highlighted. In another embodiment, the state machine model may be displayed during the execution of the state machine model as shown in FIG. 12A as a table with rows and columns of cells. In this embodiment, the cell that is currently being executed may be highlighted. In another embodiment, the current state may be displayed as a function of time. For example, FIG. 12D illustrates the current state as a function of time (e.g., in a line chart) during the execution of the state machine model described by table 1202. In one embodiment, the execution of the state machine model may be stopped at any point identified by the user. When stopped, the current state and values of variables may be indicated to the user when the execution of the state machine is stopped at the point identified by the user. In this embodiment, the user may debug a transition table by placing breakpoints directly in the table cells along the lines of code that are of interest. The user may specify a breakpoint at the entry of a particular state, at the exit from a particular state, when an action is taken, and/or when a transition condition is satisfied.

Figure 12E:
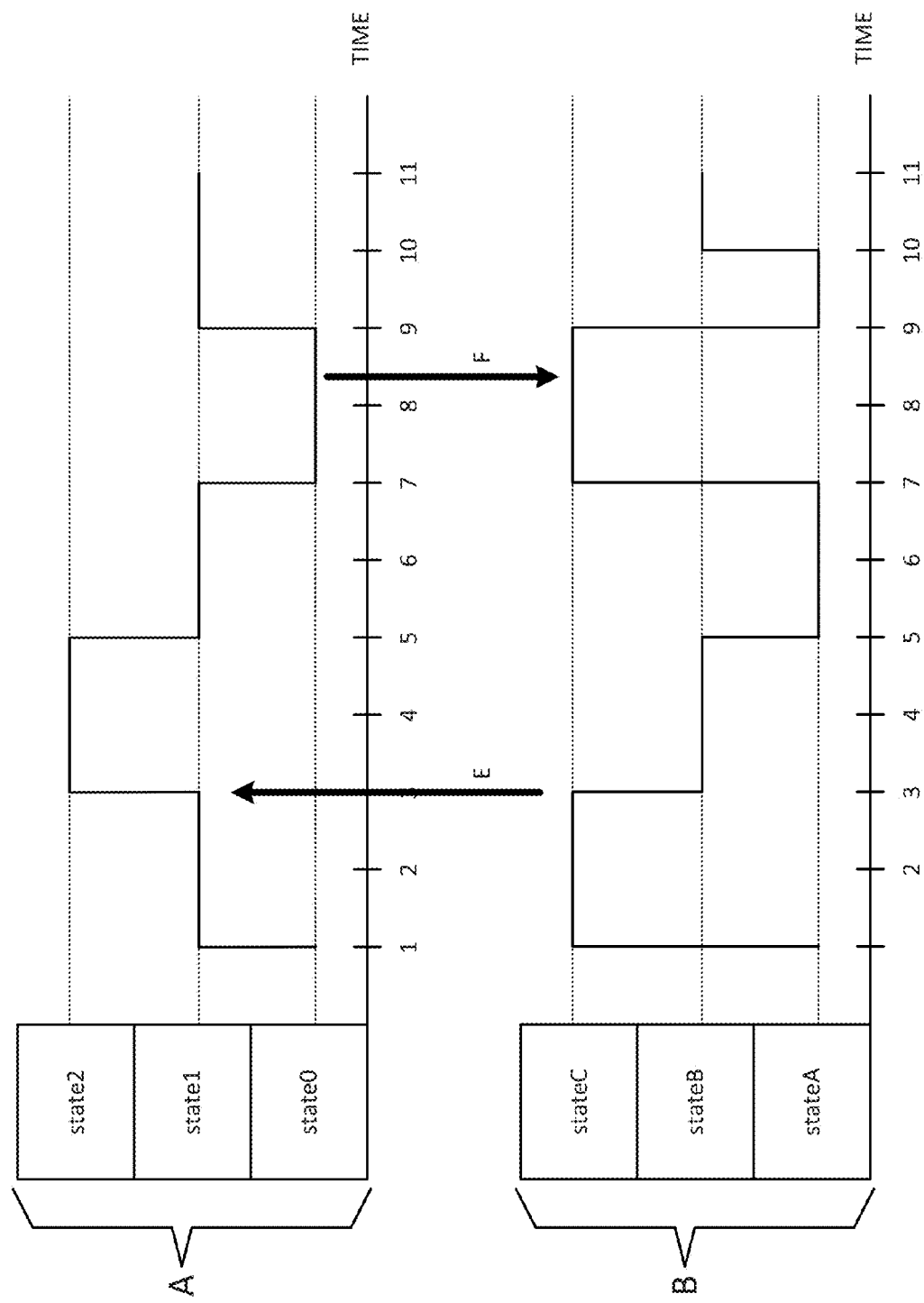
FIG. 12E is a graph depicting the child state of two parallel states as a function of time with the passing of messages.

In one embodiment, more than one (e.g., parallel states) state machine model may execute at a time. In this case, the different parallel states (e.g., state A and state B) may send messages to each other. FIG. 12E illustrates the current state as a function of time (e.g., in a line chart) during the execution of the state machine model (identified as state A) and a state machine model (identified as state B). In this case, state A includes the following child states: state0, state1, and state2. State B includes the following child states: stateA, stateB, and stateC. A plot for state A shows the child state as a function of time. A plot for state B shows the child state as a function of time. Further, messages sent between state A and state B (the parent states) are shown and/or recorded as E and F.

Rather than display the current state in a line chart, such as the chart shown in FIG. 12D, the current state may be animated by showing a color next to the state name. For example, FIG. 12F illustrates an animation during the execution of a state machine model. FIG. 12F includes a column 1204 listing the states. During execution of the state machine model, the cell next to the current state may be highlighted. For example, the current state shown in FIG. 12F is state 2 (highlighted with dark grey in FIG. 12F). The previous state (e.g., state3) may be shown in a different color or a different shade (highlighted with medium grey in FIG. 12F). The previous, previous state (e.g., state1) may be shown in a different color or a different shade (highlighted with light grey in FIG. 12F).

As discussed above, simulation engine 370 may execute the model to determine, record, and highlight the condition fields that identify a never-executed condition or a never-satisfied condition. In one embodiment, code generator 390 does not generate code in order for never-executed actions, conditions that were never satisfied, and/or states that were never reached to be identified. In this embodiment, for example, the state machine model may be interpreted (e.g., an interpreted execution and/or simulation) without generating code. In another embodiment, unreachable states (which may include never-executed conditions or conditions that were never satisfied) may be determined based on parsing the information describing the state machine model (e.g., a parsing engine) rather than executing the state machine model. For example, parsing logic may determine that the conditions to reach a state will never be true or that an identified state will never be reached. In this case, these states may be highlighted as described above in FIGS. 12A through 12F.

In one embodiment, based on the parsing of the state machine model, condition fields that include conditions that cannot be satisfied may be recorded or displayed. In another embodiment, based on the parsing of the state machine model, it may be determined that a particular destination state is unreachable by determining that no source state specifies the particular destination state as a destination state. Further, the parsing engine may determine that a particular destination state is unreachable by determining that each source state that specifies the particular destination state includes a condition, for transitioning to the particular state, that cannot be satisfied. In yet another embodiment, the parsing engine may determine that a source state includes two conditions, which may be true simultaneously, for transitioning to two different states. Such a situation may be displayed or recorded.

In one embodiment, the condition fields shown in table 1202 (e.g., and other tables, such as table 402) may include variables. The type and size of each variable may be inferred (e.g., integer, matrix, matrix size, etc.). As discussed above, computer code may be generated based on the state machine model, for execution of the state machine model. Further, the generated code may be formatted automatically in a human-readable manner as identified by a user. The computer code may include be in computer languages such as C, C++, C#, a programmable logic controller (PLC) language, HDL, Ada, Java, and/or MATLAB®.

Figure 13A:
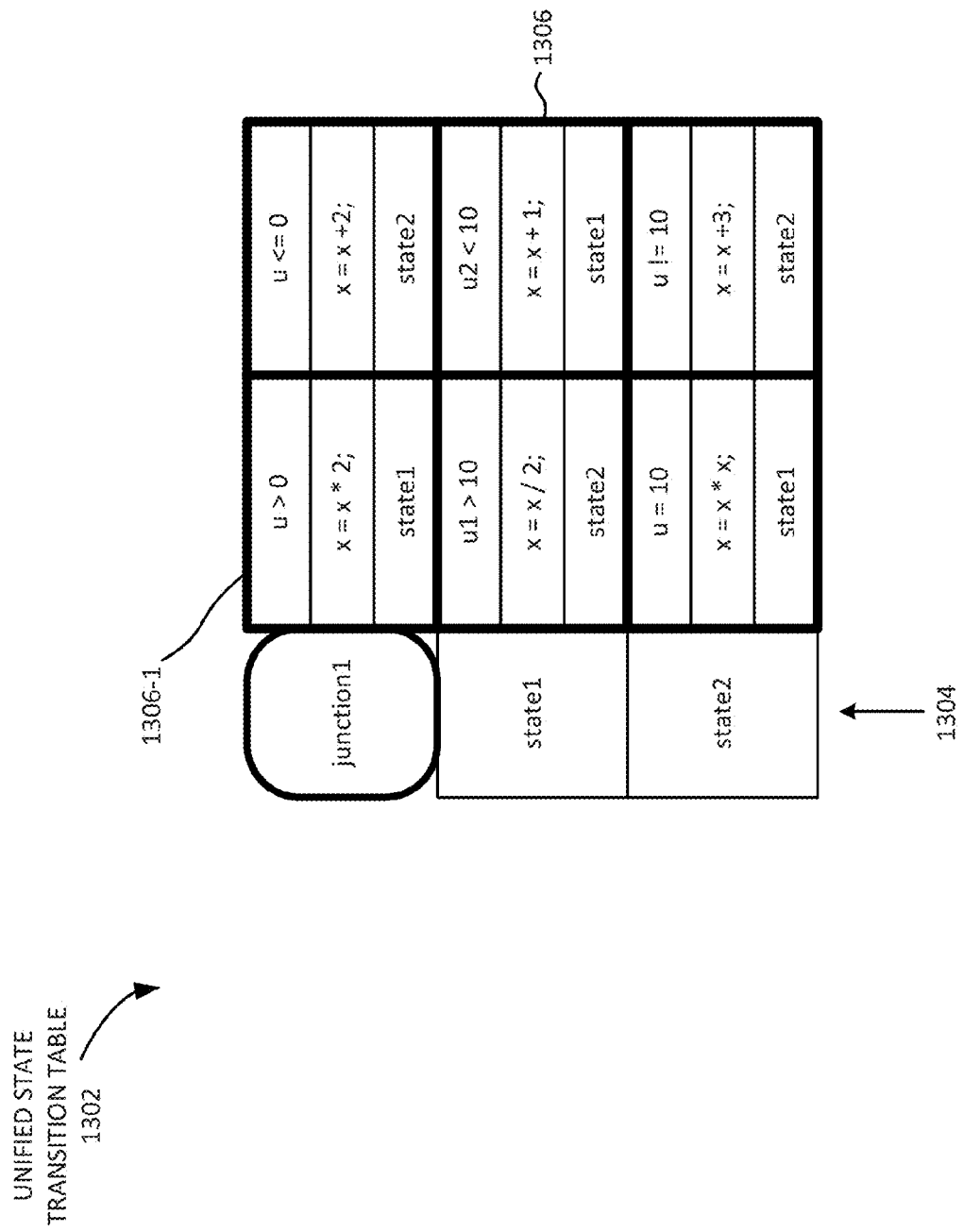
FIG. 13A illustrates a transition table including a junction.

FIG. 13A illustrates the display of an exemplary unified state transition table 1302 describing a state machine model in one embodiment. Table 1302 includes a vertical column of fields 1304 that stores the source states of the state machine model. For each source state field, table 1302 may also include one or more cells 1306. Cell 1306 may include a condition field describing a condition upon which, when satisfied, the state machine model transitions from the corresponding source state to a destination state; a destination field identifying the destination state for the state machine model to transition to when the corresponding condition is satisfied; and an action field describing an action to be taken by the state machine model when the corresponding condition is satisfied. In one embodiment, unified state transition table 1302 may exclude action fields, condition fields, and/or destination fields, for example. Further, in one embodiment, one or more cells 1306 in table 1302 may exclude an action field, a condition field, and/or a destination field. For example, table 1302 may specify an action that is taken when a condition is satisfied but the state machine model does not transition to a different state (e.g., does not specify a destination in a destination field). In an embodiment, an action may be taken by the state machine model when the corresponding condition is satisfied and the transition is taken.

As shown in FIG. 13A, table 1302 identifies one state as "junction1". The junction is distinguished from the other states by, for example, displaying rounded corners surrounding the field identifying the junction name. A junction may be considered a particular type of state in which the state machine model does not rest but immediately transitions to another state. In other words, a junction identifies one or more conditions, for exit to another state. For example, junction1 in table 1302 identifies two conditions: u>0 and u<=0. One of the two conditions for junction1 is always satisfied and the state machine model transitions to either state1 or state2 as described in table 1302. In other words, the junction state is associated with one or more conditions that ensure that the state machine model transitions to one of the destination states and does not rest in the junction state.

Figure 13B:
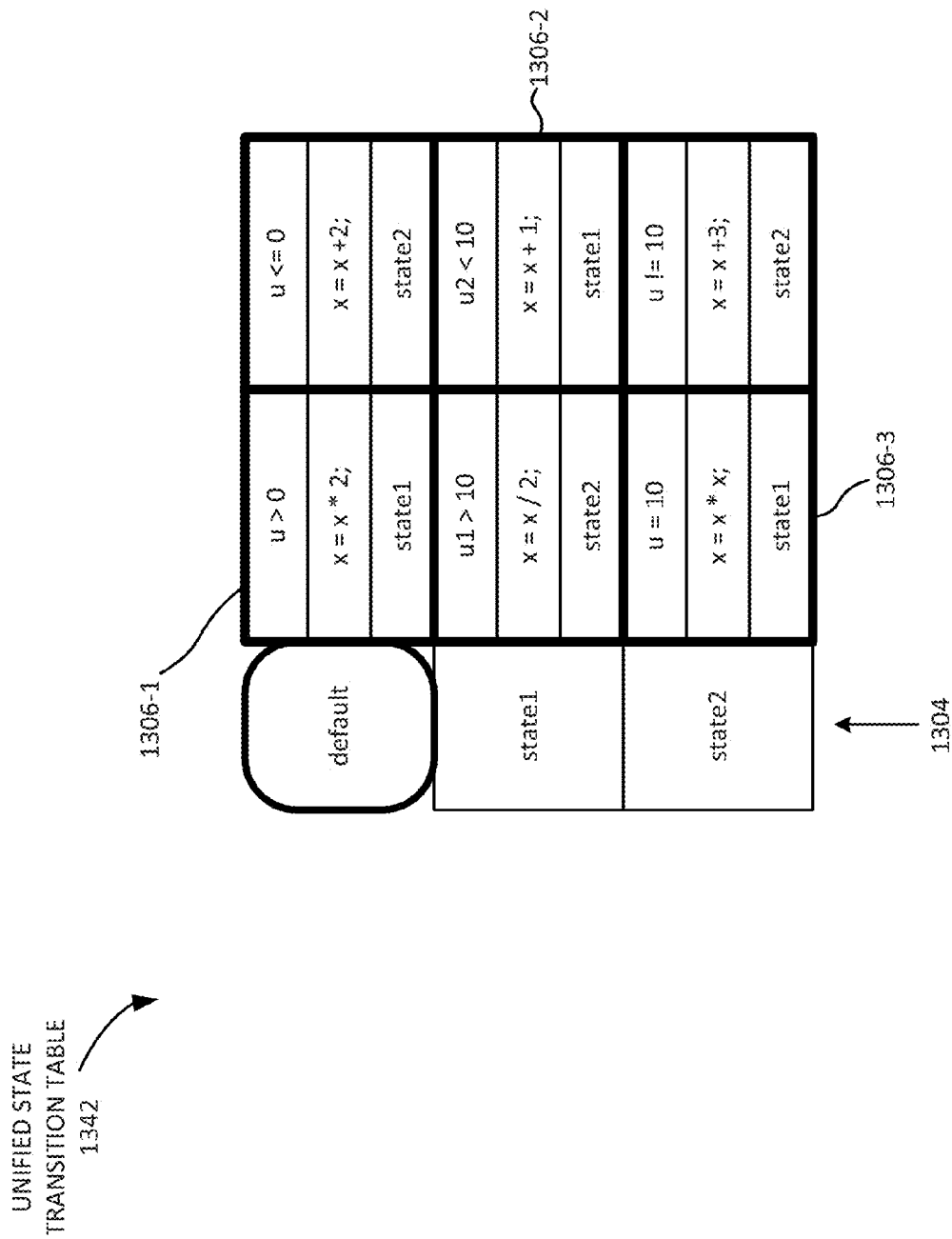
FIG. 13B illustrates a transition table including a default state that is a junction state.
Figure 13C:
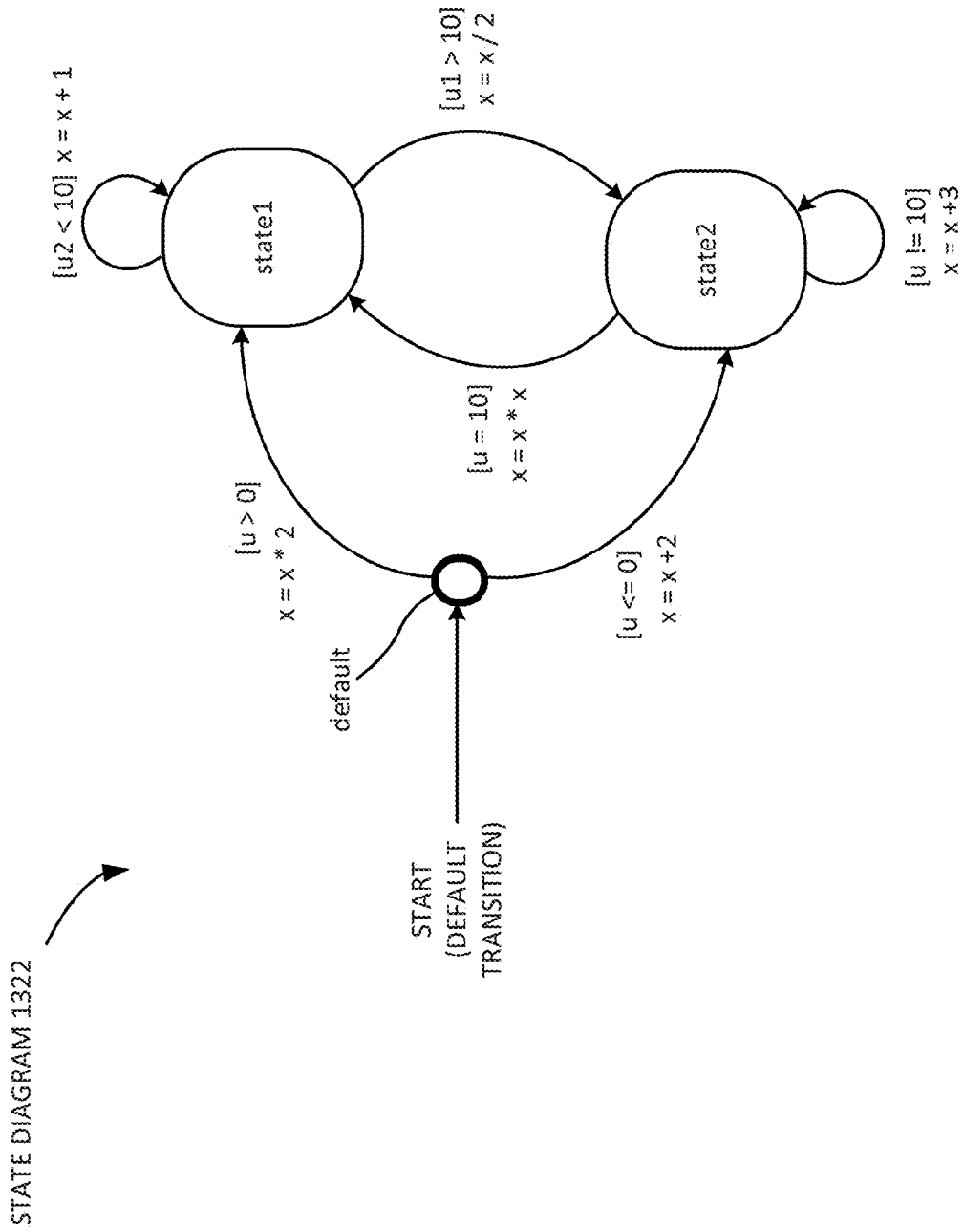
FIG. 13C illustrates a state diagram including a junction.

In one embodiment, a state transition table may include a default state that is the state in which the state machine model is to start. In this embodiment, the default state may be a junction state. FIG. 13B illustrates a unified state transition table 1342 that includes a default state ("a default transition row") that is executed first when the state machine model is executed. In this example, the first state listed in the column of the transition table that lists the source states 1304 (e.g., the top state) may be a junction state. A parsing engine may ensure that one of the conditions is always satisfied such that the state machine model does not rest in the junction state. In this example, simulation engine 370 may execute the state machine model, wherein the junction state is the first state executed. FIG. 13C illustrates a state diagram corresponding to transition table 1342 with the junction state named "defaultIn FIG. 13C, states are shown with ovals and transitions are shown with arrows between states. Conditions are shown near the associated arrow representing the transition. Conditions are shown in brackets near the corresponding action and transaction. In this case, the state machine model may start execution by entering the default state (e.g., the first listed state listed in transition table 1342). The state machine model may then immediately transition to either state state1 or state state2. Thus, in this embodiment, the user may conditionally choose which state (e.g., state1 or state2) should be entered as soon as the state machine model begins execution. In this embodiment, conditions may be executed from left to right as specified in transition table 1342.

As discussed above, simulation engine 370 may execute a state machine model described by a state transition table, such as a unified state transition table. Simulation engine 370 may measure the degree of connectivity between two different states. For example, if during execution of the state machine model, when in a state S1, the likelihood of transitioning to state S3 is very likely, then there would be a high degree of connectivity between state S1 and state S3. If, on the other hand, the state machine model never actually transitioned from state S2 to state S1, then the degree of connectivity between state S2 and state S1 would be very low, for example. In these examples the degree of connectivity may have directions. That is, the connectivity between state S3 and state S2 may not be the same as the degree of connectivity between state S2 and state S3 (e.g., the opposite direction). The degree of connectivity between states may be recorded.

In one embodiment, the user may switch between state diagram view 1322 and state transition table 1342 view. In one embodiment, interface logic 330 may automatically generate (e.g., as a background process) state diagram 1322 from unified state transition table 1302 as table 1302 is being edited and generated. Further, the user may also view the information stored in state transition table 1342 as a state-state transition table (e.g., such as shown and described above in FIG. 5A), as a state-condition transition table (e.g., such as shown and described above in FIG. 6A), as a state-action transition table (e.g., such as shown and described above in FIG. 7A), etc.

The user may edit information in any view (e.g., state diagram 1322) and the edited information may be recorded in a unified state transition table (e.g., such as unified state transition table 1302). For example, the user may edit the name of a state in state diagram 1322 and the edit may be reflected in table 1342. For example, if the user changed the name of state "state1" in the oval in state diagram 1322 to "stateA", then it would be changed in table 1342 in column 1304, cell 1306-1, cell 1306-2, and cell 1306-3. The user may also edit conditions shown in state diagram 1322 and actions shown in state diagram 1322, and such edits will also be reflected in table 1342. The user may also change destination states by moving the arrows from one oval to another. Again, such edits may be reflected in table 1342.

FIG. 13A identifies a junction state as the first state executed in a state machine model. In other embodiments, a junction state may occur in other parts of a state machine model other than the first state.

As shown in FIG. 14, the degree of connectivity between states may be displayed in a connectivity table 1402. In one embodiment, different colors or shades may be used to indicate different degrees of connectivity. The degree of connectivity may also be expressed as a number, for example, between 0 and 10. Table 1402 includes a vertical column 1404 listing the source states and a horizontal row 1406 listing destination states. The degree of connectivity between any given source state and any given destination state may be shown at the intersection of the source state and the destination state (e.g., in the corresponding cell). The degree of connectivity may be displayed or recorded, for example.

In one embodiment, the degree of connectivity may be based on the number of different paths, during the execution of the state machine model, between the corresponding source state and the corresponding destination state. In another embodiment, the degree of connectivity may be based on a number of states along each path, during execution of the state machine model, between the corresponding source state and the corresponding destination state.

Figure 15A:
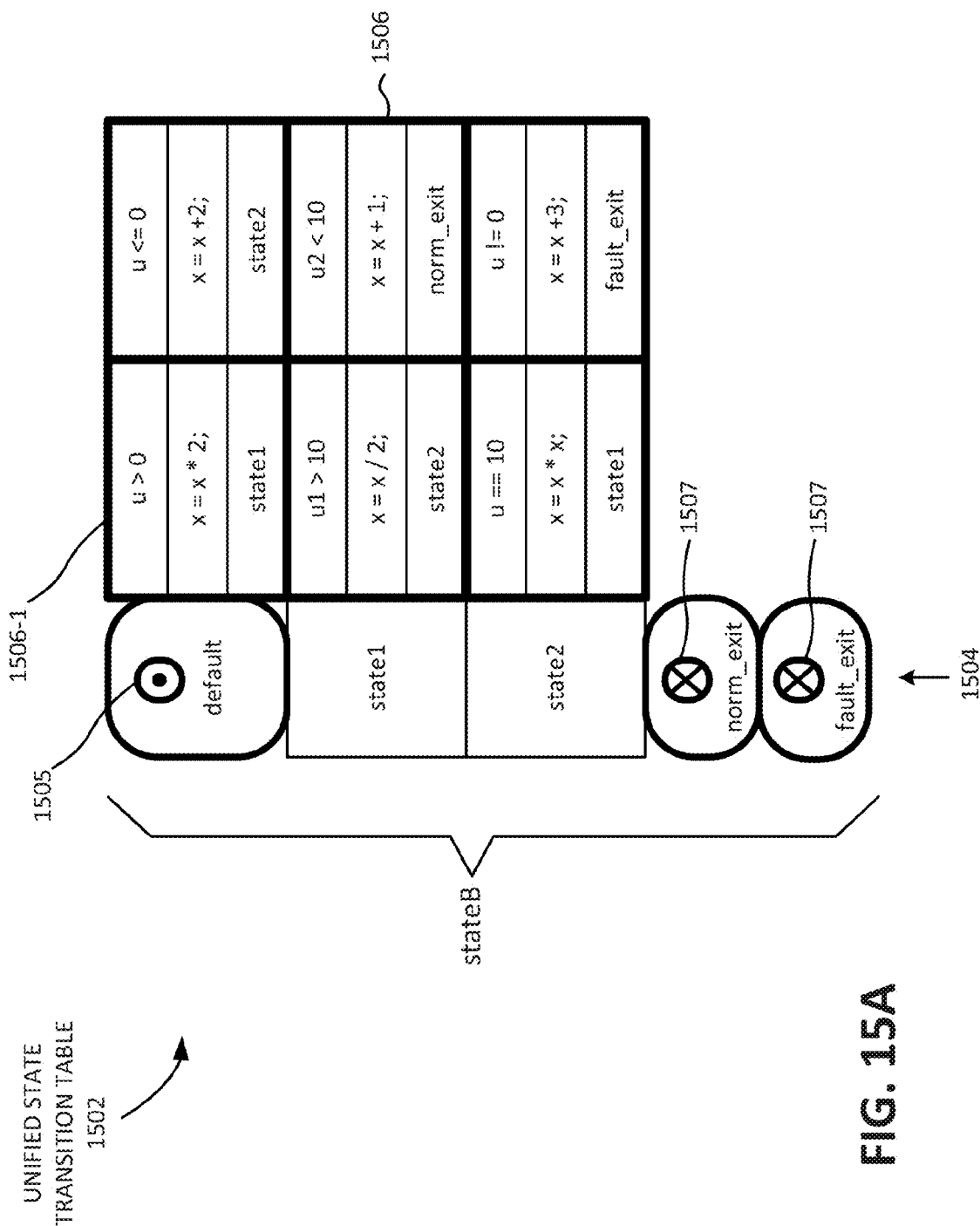
FIG. 15A illustrates a unified state transition table in another embodiment with an exit junction.
Figure 15B:
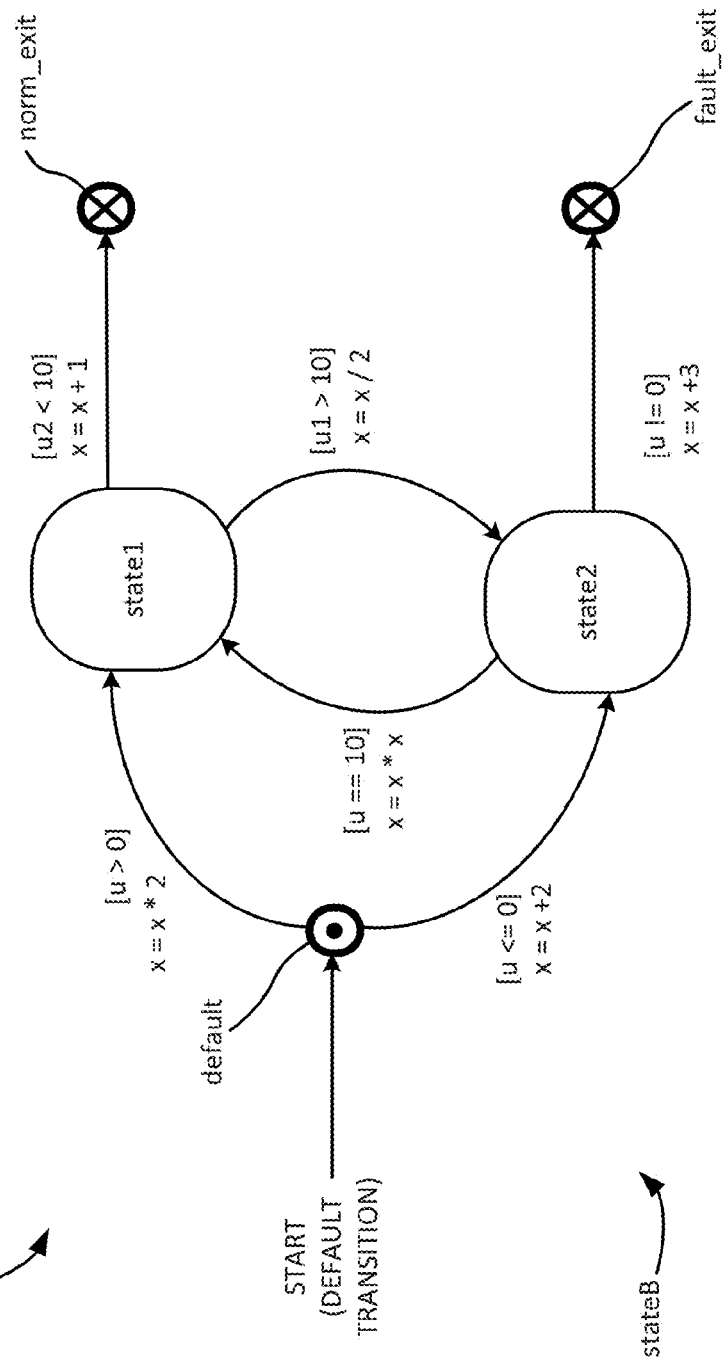
FIG. 15B illustrates a state diagram associated with the state transition table of FIG. 15A with an exit junction.

FIG. 15A illustrates a unified state transition table 1502 describing a state machine model with two exit junctions. In particular, table 1502 describes a state machine model called "stateB". Table 1502 includes a vertical column of fields 1504 that stores the source states of the state machine model. For each source state field, table 1502 may also include one or more cells 1506. Cell 1506 may include a condition field that identifies a condition upon which, when satisfied, the state machine model transitions from the corresponding source state to a destination state; a destination field identifying the destination state for the state machine model to transition to when the corresponding condition; when satisfied, and an action field identifying an action to be taken by the state machine model when the corresponding condition is satisfied. Table 1502 may be displayed as a state diagram 1522 shown in FIG. 15B.

In one embodiment, unified state transition table 1502 may exclude action fields, condition fields, and/or destination fields, for example. Further, in one embodiment, one or more cells 1506 in table 1502 may exclude an action field, a condition field, and/or a destination field. In one embodiment, a condition field may specify an event (upon which the condition is evaluated). In this embodiment, the action field may identify the action to be taken by the state machine model when the corresponding event occurs and the corresponding condition is satisfied. For convenience and ease of understanding, in the example embodiment of FIG. 15A, condition fields in transition table 1502 are considered not to include events. In the case where a destination field is omitted, a default transition may occur (e.g., the destination state of an adjacent cell, the destination state of a cell in a template row, etc.).

As shown in FIG. 15A, table 1502 identifies one state as "default". This default junction may operate as described above with respect to FIGS. 13A-13C. The default junction in table 1502 may also be designated by a graphical symbol 1505, such as a circle enclosing a dot. Table 1502 also identifies two states as exit states. One exit state is labeled "norm_exit" and designates an exit from stateB without error, for example. The other exit state is labeled "fault_exit" and designates an exit from stateB in error. The exit states in table 1502 may also be designated by a graphical symbol 1507, such as a circle enclosing an "X."

As described further below, the exit junctions may allow an instance of the state machine model called "stateB" (described by table 1502) to be embedded into another state machine model. An exit junction may be distinguished from the other states by, for example, displaying rounded corners surrounding the field identifying the junction name. An exit junction may be considered a particular type of state in which the state machine model does not rest but immediately transitions, in this case, out of the state machine model described by table 1502. When exiting the state machine model described by table 1502, the name (e.g., label name) of the exit state (e.g., norm_exit or fault_exit) is passed to its parent state for evaluation as, for example, a condition.

Figure 15C:
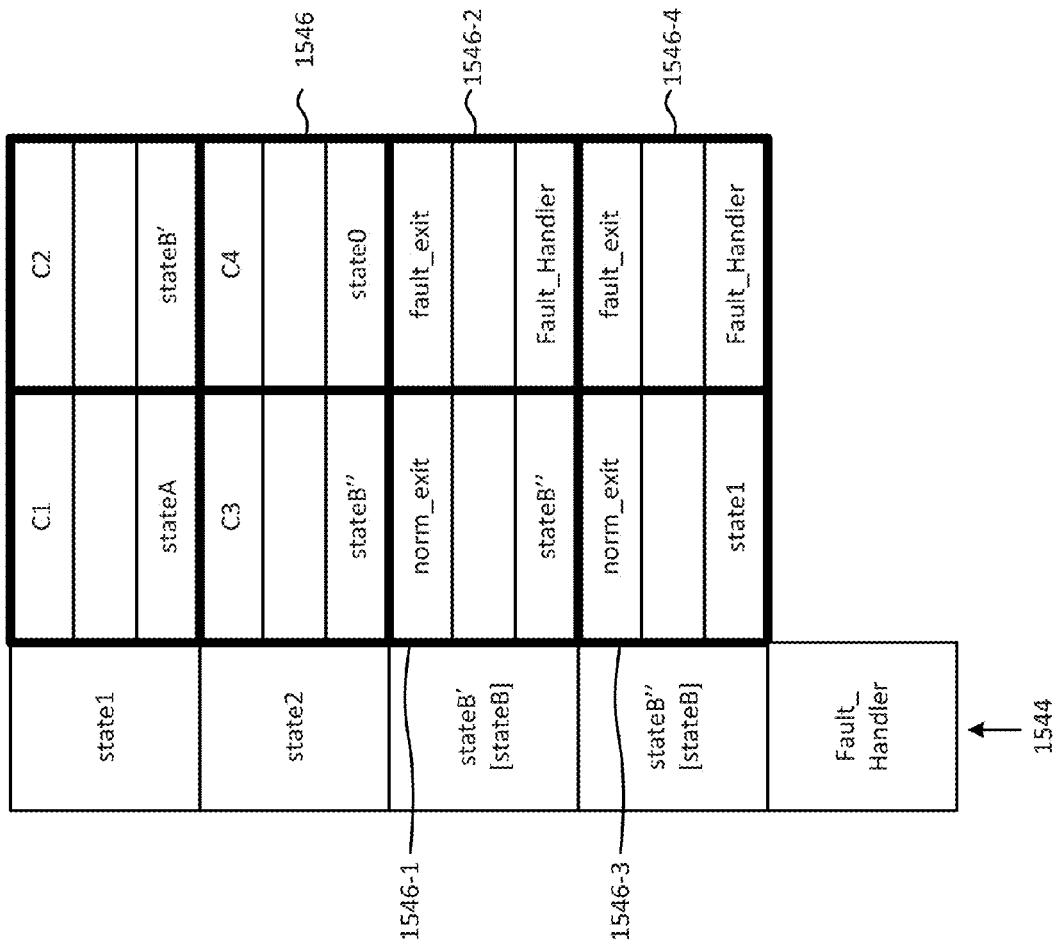
FIG. 15C illustrates a unified state transition table in another embodiment with a child transition table.

FIG. 15C illustrates a unified state transition table 1542 describing a state machine model that calls an instance of another state machine model. In particular, table 1502 describes and calls a state machine model called "stateB". Table 1542 includes a vertical column of fields 1544 that stores the names of the source states of the state machine model. For each source state field, table 1542 may also include one or more cells 1546. Cell 1546 may include a condition field identifying a condition upon which, when satisfied, the state machine model transitions from the corresponding source state to a destination state; a destination field identifying the destination state for the state machine model to transition to when the corresponding condition is satisfied; and an action field identifying an action to be taken by the state machine model when the corresponding condition is satisfied.

In one embodiment, unified state transition table 1542 may exclude action fields, condition fields, and/or destination fields, for example. Further, in one embodiment, one or more cells 1546 in table 1542 may exclude an action field, a condition field, and/or a destination field. In one embodiment, a condition field may specify an event upon which a condition is evaluated. In this embodiment, the action field may identify the action to be taken by the state machine model when the corresponding event occurs and the corresponding condition is satisfied. For convenience and ease of understanding, in the example embodiment of FIG. 15A, condition fields in transition table 1542 are considered not to include events. In the case where a destination field is omitted, a default transition may occur (e.g., the destination state of an adjacent cell, the destination state of a cell in a template row, etc.).

Figure 15D:
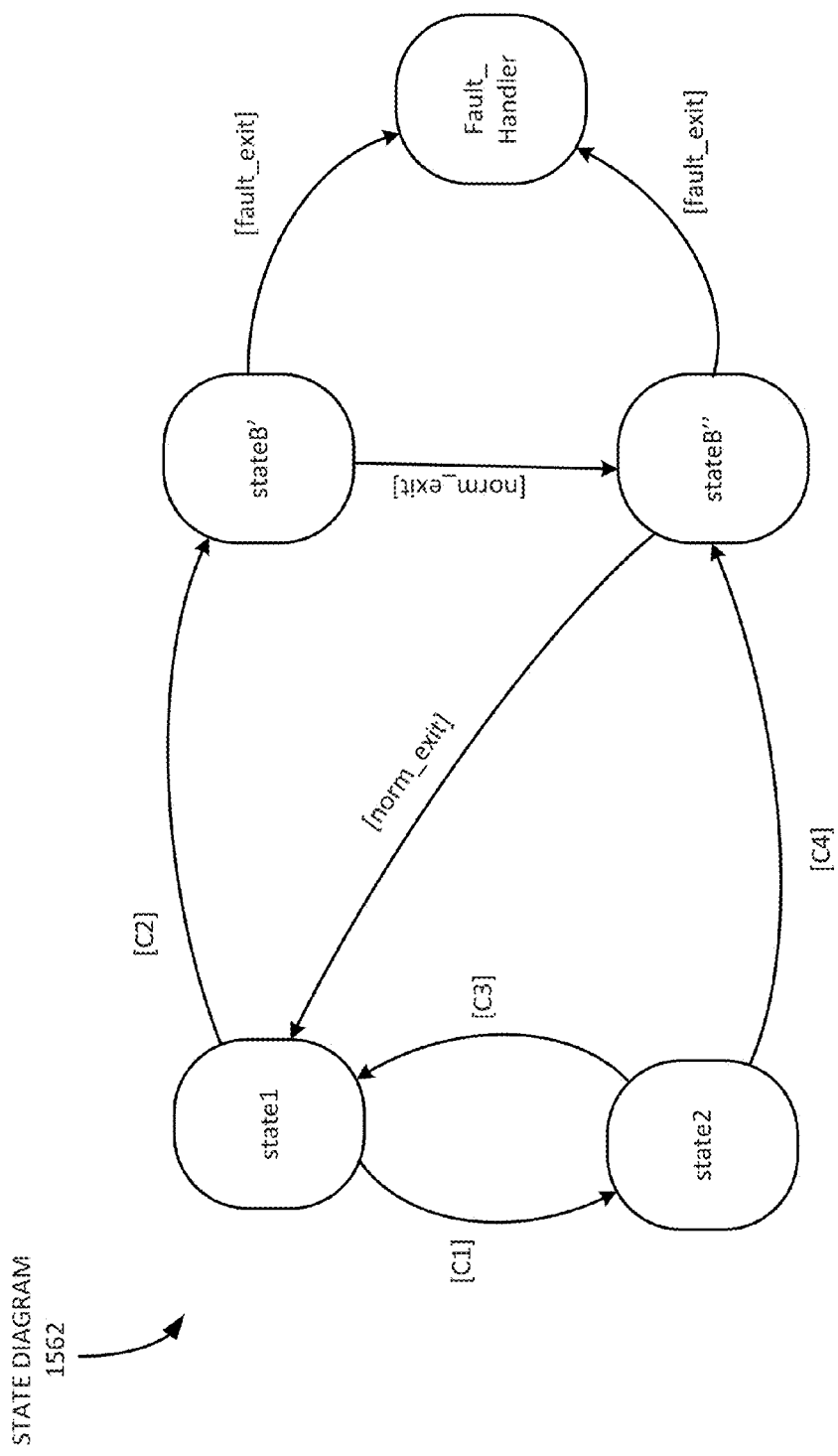
FIG. 15D illustrates a unified state diagram with child states.

Table 1542 describes a source state stateB' that is an instance of stateB described by table 1502. Table 1542 also identifies a source state stateB" that is also an instance of stateB identified by table 1502. State stateB' and state stateB" may each be considered a "parent" state, each with its own "child transition table.". As a result, a state diagram 1562, as shown in FIG. 15D has a state stateB' and a state stateB".

Figure 15E:
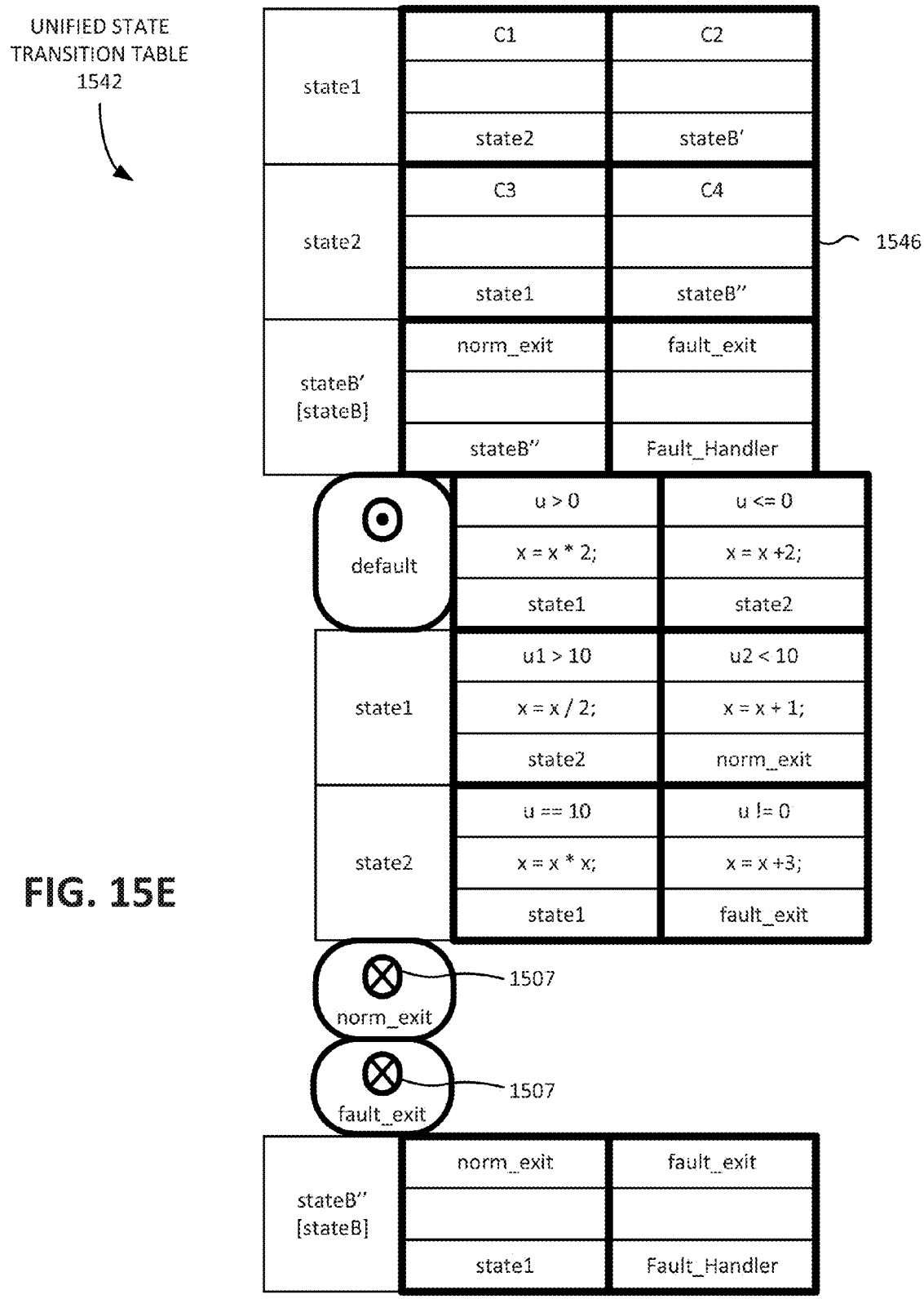
FIG. 15E illustrates the unified state transition table of FIG. 15C including the unified state transition table of the child state of FIG. 15A.

Each instance of state stateB, however, may be initiated with different variables to affect the default transition state. Further, each instance of state stateB may end and transition to a different state in its "parent." For example, the instance of state stateB called stateB' transitions to state state1 when the exit junction state from the child state is norm_exit (cell 1546-1). Further, the instance of stateB called stateB' transitions to state Fault Handler when the exit junction state from the child state is fault_exit (cell 1546-2). The instance of state stateB called stateB" transitions to state state1 when the exit junction state from the child state is norm_exit (cell 1546-3). Further, the instance of stateB called stateB" transitions to state Fault Handler when the exit junction state from the child state is fault_exit (cell 1546-4). The ability to identify different transitions when exiting a "child" results from cells 1546-1 and 1546-2. Cell 1546-1, for example, identifies destination state state0, while cell 1546-2 identifies destination state stateA. FIG. 15E illustrates one way of displaying table 1542 with table 1502 embedded in table 1542. The bottom portion of table 1542 is not shown for convenience.

During execution, when the state machine model is in state state0, the transition to state stateB' (e.g., to either state state1 or state state2) may be considered an "inner transition" because the state machine model transitions from a parent state to a child state (e.g., to inner state state1 or to inner state state2). In this example, states state1 and state2 may be considered "inner states" or "sub-states," and state stateB' and stateB" may be considered "super states." The hierarchy of state transition tables is shown in FIGS. 15D and 15E in which states stateB' and stateB" are state machine models at a lower hierarchy than the state machine model including states state0 and stateA.

In one embodiment, instead of an exit junction, for example, the last state in a "child" state machine model described by a transition table may specify "NEXT" as its destination state. In this case, the next state may be the next state in the "parent" state machine model, or the "uncle" of the child state machine model. States are sometimes described as "source states" or "destination states." As noted in FIG. 13C, for example, a "destination state" may also be a "source state."

In one embodiment, the multi-reference states or redundant information may appear graphically as a state diagram. In this embodiment, the multi-reference state may be displayed multiple times or redundantly.

This application incorporates by reference U.S. patent application Ser. No. 13/768,541, filed Feb. 15, 2013, titled "Generating a State Diagram,".

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIG. 2A, 2B, 2C, or 3 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, or a combination of hardware and software. No element, act, or instruction used in the description of the invention should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining features of the invention.

What is claimed is:

1. A method comprising:
accessing, by a computer device, an executable graphical model,
wherein the executable graphical model includes a state machine model described by a state transition table, wherein the state transition table includes source states and condition fields and destination state fields associated with the source states, the source states associated with particular condition fields identifying conditions upon which the state machine model transitions from the source states to destination states, the source states associated with particular destination state fields identifying the destination states, where
at least two of the source states are associated with destination states, as identified in the corresponding destination state fields of the state transition table, where the at least two of the source states are identical, or
at least two of the source states are associated with conditions, as identified in the corresponding condition fields of the state transition table, that are identical;
displaying a table representing the state machine model; and
grouping the condition fields associated with the destination states that are identical, wherein the source states are displayed in a column or in a row of the table, the destination states are displayed in a row of the table, when the source states are displayed in the column, or in a column of the table, when the source states are displayed in the row, and the conditions are displayed, based on the grouping of the condition fields, such that the destination states are not repeated in the row or in the column including the destination states, or grouping the destination state fields associated with the conditions that are identical, wherein the source states are displayed in a column or in a row of the table, the conditions are displayed in a row of the table, when the source states are displayed in the column, or in a column of the table, when the source states are displayed in the row, and the destination states are displayed, based on the grouping of the destination state fields, such that the conditions are not repeated in the row or in the column displaying the conditions.

2. The method of claim 1 wherein the executable graphical model further includes graphical entities with relationships between the graphical entities, the method further comprising:

inputting an input variable from one of the graphical entities and evaluating the state machine model based on the input variable, or outputting an output variable to one of the graphical entities and evaluating the executable graphical model based on the output variable.

3. The method of claim 1, further comprising:

receiving input from a user to edit one of the destination states displayed in the row of the table, when the source states are displayed in the column, or in the column of the table, when the source states are displayed in the row, wherein the one of the destination states is associated with two of the condition fields, wherein each of the two condition fields correspond to a different source state; and storing the edited destination state in the two of the destination state fields associated with the two conditions and corresponding to the two of the source states.

4. The method of claim 1, further comprising:

receiving input from a user to edit one of the conditions displayed in the row of the table, when the source states are displayed in the column, or in the column of the table, when the source states are displayed in the row, wherein the one of the conditions is associated with two destination state fields, wherein each of the two destination state fields corresponds to a different source state; and storing the edited condition in the two condition fields associated with the destination state fields and corresponding to the two source states.

5. The method of claim 1 wherein the state machine model is displayed as a state-state table, a state-condition table, or a state-action table.

6. The method of claim 1 wherein the source states are displayed in the column and the condition fields and the destination state fields are displayed in rows.

7. The method of claim 6 wherein the condition fields and the destination state fields are free from having column identifiers.

8. The method of claim 1 wherein the state transition table further includes actions associated with the source states.

9. The method of claim 1 wherein one or more of the conditions of the state transition table are associated with one or more events.

10. The method of claim 9 further comprising:

evaluating the one or more of the conditions in response to an occurrence of the one or more events.

11. The method of claim 1 wherein two or more cells of the state transition table are associated with a first source state, and the two or more cells identify different destination states.

12. The method of claim 1 further comprising:

generating code for the executable graphical model.

13. The method of claim 1 further comprising:

evaluating, by the computer device, the executable graphical model, wherein evaluating the executable graphical model includes evaluating the state machine model, and wherein the evaluating the state machine model includes:

evaluating whether to transition from a given source state to a given destination state at points in time, wherein the points in time occur:

at periodic times, when a value of an expression changes, when an event occurs, or when a condition is satisfied.

14. A computer device comprising:

a processor configured to:

access an executable graphical model, wherein the executable graphical model includes a state machine model described by a state transition table, wherein the state transition table includes source states and condition fields and destination state fields associated with the source states, the source states associated with particular condition fields identifying conditions upon which the state machine model transitions from the sources states to destination states, the source states associated with particular destination state fields identifying the destination states, where at least two of the source states included in the state transition table are associated with destination states, as identified in the corresponding destination state fields of the state transition table, where the at least two of the source states are identical, or at least two of the source states are associated with conditions, as identified in the corresponding condition fields of the state transition table, that are identical display a table representing the state machine model, and group the condition fields associated with the destination states that are identical, wherein the source states are displayed in a column or in a row of the table, the destination states are displayed in a row of the table, when the source states are displayed in the column, or in a column of the table, when the source states are displayed in the row, and the conditions are displayed, based on the grouping of the condition fields, such that the destination states are not repeated in the row or in the column including the destination states, or group the destination state fields associated with the conditions that are identical, wherein the source states are displayed in a column or in a row of the table, the conditions are displayed in a row of the table, when the source states are displayed in the column, or in a column of the table, when the source states are displayed in the row, and the destination states are displayed, based on the grouping of the destination state fields, such that the conditions are not repeated in the row or in the column displaying the conditions; and a memory to store the executable graphical model including the state machine model described by the state transition table.

15. The computer device of claim 14, wherein the executable graphical model includes graphical entities with relationships between the graphical entities, wherein the processor is further configured to:
input an input variable from one of the graphical entities and evaluate the state machine model based on the input variable, or
output an output variable to one of the graphical entities and evaluate the executable graphical model based on the output variable.

16. The computer device of claim 14, further comprising:
a receiver to receive input from a user to edit one of the destination states displayed in the row of the table, when the source states are displayed in the column, or in the column of the table, when the source states are displayed in the row, wherein the one of the destinations states is associated with two of the condition fields, wherein each of the two condition fields correspond to a different source state; and wherein the memory is configured to store the edited destination state in the two of the destination state fields associated with the two conditions and corresponding to the two of the source states.

17. The computer device of claim 14, further comprising:
a display to display the table representing the state machine model, wherein the conditions are displayed in the row of the table, when the source states are displayed in the column, or in the column of the table, when the source states are displayed in the row, and the destination states are displayed, based on the grouping of the destination state fields, such that the conditions are not repeated in the row displaying the conditions.

18. The computer device of claim 17, further comprising:
a receiver to receive input from a user to edit one of the conditions displayed in the row of the table, when the source states are displayed in the column, or in the column of the table, when the source states are displayed in the row, wherein the one of the conditions is associated with two destination state fields, wherein each of the two destination state fields corresponds to a different source state;
wherein the memory is configured to store the edited condition in the two condition fields associated with the destination state fields and corresponding to the two source states.

19. The computer device of claim 14 wherein the state machine model is displayed as
a state-state table,
a state-condition table, or
a state-action table.

20. The computer device of claim 14 wherein the source states are displayed in the column and the condition fields and the destination state fields are displayed in rows.

21. The computer device of claim 14 wherein the processor generates code for the executable graphical model.

22. The computer device of claim 14 wherein the processor is further configured to:
evaluate the executable graphical model, wherein the evaluate includes evaluating the state machine model, and wherein the evaluating the state machine model includes:
evaluating whether to transition from a given source state to a given destination state at points in time, wherein the points in time occur:
at periodic times,
when a value of an expression changes,
when an event occurs, or
when a condition is satisfied.

23. One or more non-transitory computer-readable media comprising program instructions, the program instructions when executed by one or more processors cause the one or more processors to:
access an executable graphical model,
wherein the executable graphical model includes a state machine model described by a state transition table, wherein the state transition table includes source states and condition fields and destination state fields associated with the source states, the source states associated with particular condition fields identifying conditions upon which the state machine model transitions from the source states to destination states, the source states associated with particular destination state fields identifying the destination states, where
at least two of the source states are associated with destination states, as identified in the corresponding destination state fields of the state transition table that are identical, or
at least two of the source states are associated with conditions, as identified in the corresponding condition fields of the state transition table, that are identical;
display a table representing the state machine model; and
grouping the condition fields associated with the destination states that are identical, wherein the source states are displayed in a column or in a row of the table, the destination states are displayed in a row of the table, when the source states are displayed in the column, or in a column of the table, when the source states are displayed in the row, and the conditions are displayed, based on the grouping of the condition fields, such that the destination states are not repeated in the row or in the column including the destination states, or
grouping the destination state fields associated with the conditions that are identical, wherein the source states are displayed in a column or in a row of the table, the conditions are displayed in a row of the table, when the source states are displayed in the column, or in a column of the table, when the source states are displayed in the row, and the destination states are displayed, based on the grouping of the destination state fields, such that the conditions are not repeated in the row or in the column displaying the conditions.

24. The one or more non-transitory computer-readable media of claim 23 wherein the executable graphical model further includes graphical entities with relationships between the graphical entities, and the one or more computer-readable media further comprise additional program instructions that when executed by the one or more processors cause the one or more processors to:
input an input variable from one of the graphical entities and evaluate the state machine model based on the input variable, or
output an output variable to one of the graphical entities and evaluate the executable graphical model based on the output variable.

25. The one or more non-transitory computer-readable media of claim 23 further comprise additional program instructions that when executed by the one or more processors cause the one or more processors to:
receive input from a user to edit one of the destination states displayed in the row of the table, when the source states are displayed in the column, or in the column of the table, when the source states are displayed in the row, wherein the one of the destination states is associated with two of the condition fields, wherein each of the two condition fields correspond to a different source state; and store the edited destination state in the two of the destination state fields associated with the two conditions and corresponding to the two of the source states.

26. The one or more non-transitory computer-readable media of claim 23 further comprise additional program instructions that when executed by the one or more processors cause the one or more processors to:

receive input from a user to edit one of the conditions displayed in the row of the table, when the source states are displayed in the column, or in the column of the table, when the source states are displayed in the row, wherein the one of the conditions is associated with two destination state fields, wherein each of the two destination state fields corresponds to a different source state; and store the edited condition in the two condition fields associated with the destination state fields and corresponding to the two source states.

27. The one or more non-transitory computer-readable media of claim 23 wherein the source states are displayed in the column and the condition fields and destination state fields are displayed in rows.

28. The one or more non-transitory computer-readable media of claim 27 wherein the condition fields and the destination state fields are free from having column identifiers.

29. The one or more non-transitory computer-readable media of claim 23 wherein the state transition table further includes actions associated with the source states.

30. The one or more non-transitory computer-readable media of claim 23 wherein one or more of the conditions of the state transition table are associated with one or more events.

31. The one or more non-transitory computer-readable media of claim 30 further comprising additional program instructions that when executed by the one or more processors cause the one or more processors to:

evaluate the one or more of the conditions in response to an occurrence of the one or more events.

32. The one or more non-transitory computer-readable media of claim 23 further comprising additional program instructions that when executed by the one or more processors cause the one or more processors to:

generate code for the executable graphical model.

33. A method comprising:

generating, by a computer device, an executable graphical model representing a time-based dynamic system, wherein the graphical model includes graphical entities with relationships between the graphical entities, and wherein the graphical model includes a state machine model described by a state transition table, wherein the state machine model includes a time-based executable state machine model having a plurality of discrete states; and evaluating, by the computer device, the executable graphical model, wherein evaluating the executable graphical model includes evaluating the state machine model, and wherein evaluating the state machine model includes:

evaluating whether to transition between states of the plurality of states at points in time, wherein the points in time occur at periodic times, when a value of an expression changes, when an event occurs, or when a condition is satisfied, wherein evaluating whether to transition between states includes evaluating the state transition table identifying an identical destination state from a plurality of different source states, or evaluating the state transition table identifying an identical condition from a plurality of different source states, wherein each of the source states is associated with a condition field identifying a condition upon which the state machine model transitions from the source state to one of the destination states, wherein each of the source states is associated with a destination field identifying the one of the destination states, and wherein at least two of the source states are associated with destination states, as identified in the corresponding destination fields, that are identical.

34. The method of claim 33 further comprising:

inputting an input variable from one of the graphical entities and evaluating the state machine model based on the input variable, or outputting an output variable to one of the graphical entities and evaluating the executable graphical model based on the output variable.

35. The method of claim 33, further comprising:

grouping the condition fields associated with the destination states that are identical, and displaying a table representing the state machine model, wherein the source states are displayed in a column of the table, the destination states are displayed in a row of the table, and the conditions are displayed, based on the grouping of condition fields, such that the destination states are not repeated in the row containing the destination states.

36. The method of claim 35, further comprising:

receiving input from a user to edit one of the destination states displayed in the row, wherein the one of the destination states is associated with two of the condition fields, wherein each of the two condition fields correspond to a different source state; and storing the edited destination state in the two of the destination fields associated with the two conditions and corresponding to the two of the source states.

37. The method of claim 35, further comprising:

grouping the destination fields associated with identical conditions.

38. The method of claim 37, further comprising:

displaying a table representing the state machine model, wherein the source states are displayed in a column of the table, the conditions are displayed in a row of the table, and the destination states are displayed, based on the grouping of the destination fields, such that the conditions are not repeated in the row displaying the conditions.

39. The method of claim 38, further comprising:

receiving input from a user to edit one of the conditions displayed in the row, wherein the one of the conditions is associated with two destination state fields, wherein each of the two destination state fields corresponds to a different source state; and storing the edited condition in the two condition fields associated with the destination fields and corresponding to the two source states, such that the conditions are not repeated in the row displaying the conditions.

* * * * *

UNITED STATES PATENT AND TRADEMARK OFFICE
CERTIFICATE OF CORRECTION

PATENT NO. : 9,600,241 B2
APPLICATION NO. : 13/768565
DATED : March 21, 2017
INVENTOR(S) : Siddhartha Shankar et al.

Page 1 of 1

It is certified that error appears in the above-identified patent and that said Letters Patent is hereby corrected as shown below:

In the Claims

Claim 16, Column 39, Line 19 reads:
wherein the one of the destinations states is associated with
Should read:
wherein the one of the destination states is associated with Signed and Sealed this
Fourth Day of September, 2018

Andrei Iancu
*Director of the United States Patent and Trademark Office*